(12) United States Patent
Hirai

(10) Patent No.: US 7,274,646 B2
(45) Date of Patent: Sep. 25, 2007

(54) OBJECT LENS FOR AN INFINITE-TYPE OPTICAL PICKUP, OPTICAL PICKUP AND OPTICAL INFORMATION PROCESSING DEVICE

(75) Inventor: Hideaki Hirai, Kanagawa (JP)

(73) Assignee: Ricoh Company, Ltd. (JP)

( * ) Notice: Subject to any disclaimer, the term of this patent is extended or adjusted under 35 U.S.C. 154(b) by 435 days.

(21) Appl. No.: 10/263,056

(22) Filed: Oct. 3, 2002

(65) Prior Publication Data

US 2003/0072247 A1    Apr. 17, 2003

(30) Foreign Application Priority Data

| Oct. 4, 2001 | (JP) | ............................ 2001-308716 |
| Oct. 16, 2001 | (JP) | ............................ 2001-317913 |
| Feb. 27, 2002 | (JP) | ............................ 2002-051697 |

(51) Int. Cl.
   *G11B 7/135* (2006.01)
   *G02B 13/18* (2006.01)

(52) U.S. Cl. .................. 369/112.26; 359/719

(58) Field of Classification Search .......... 369/112.26; 359/719; G11B 7/135; G02B 13/18
   See application file for complete search history.

(56) References Cited

U.S. PATENT DOCUMENTS

| 6,430,137 | B1 | 8/2002 | Saimi et al. |
| 6,545,958 | B1 | 4/2003 | Hirai et al. |
| 6,590,717 | B2 * | 7/2003 | Sasano et al. ............... 359/717 |
| 6,636,366 | B1 * | 10/2003 | Itonaga ........................ 359/719 |
| 6,661,750 | B2 | 12/2003 | Saimi et al. |
| 6,690,500 | B2 * | 2/2004 | Ogasawara et al. ......... 359/245 |
| 6,744,568 | B2 * | 6/2004 | Kitamura et al. ........... 359/719 |
| 6,856,584 | B2 | 2/2005 | Saimi et al. |
| 6,876,501 | B2 * | 4/2005 | Kimura et al. .............. 359/719 |
| 2001/0015939 | A1 | 8/2001 | Kubo |
| 2002/0012313 | A1 | 1/2002 | Kimura et al. |
| 2002/0093902 | A1 | 7/2002 | Hirai et al. |
| 2002/0176332 | A1 | 11/2002 | Saimi et al. |
| 2003/0086353 | A1 * | 5/2003 | Chung et al. .......... 369/112.02 |
| 2004/0090882 | A1 | 5/2004 | Saimi et al. |

FOREIGN PATENT DOCUMENTS

| JP | 10-123410 | 10/1996 |
| JP | 11202149 A | 1/1998 |
| JP | 11203711 A | 8/1998 |
| JP | 2001083410 A | 9/1999 |
| JP | 2000-155979 | 6/2000 |
| JP | 2001324673 A | 8/2000 |
| JP | 2001-297471 | 10/2001 |
| JP | 2001-324673 | 11/2001 |

\* cited by examiner

*Primary Examiner*—A M Psitos
(74) *Attorney, Agent, or Firm*—Dickstein Shapiro LLP

(57) ABSTRACT

As an object lens for an optical pickup, applied is a single-lens and both-side-convex configuration is applied. Further, specific conditional formulas are created with respect to a particular numerical aperture NA, for a paraxial curvature radius R1 on the surface on the light source side; the working distance WD, the refractive index nd with respect to the d-line, and the focal length f. Furthermore, specific conditional formulas are created for the refractive index nd with respect to the d-line and the Abbe's number vd.

10 Claims, 61 Drawing Sheets

LIGHT SOURCE SIDE

LIGHT SOURCE SIDE

RS

LIGHT SOURCE SIDE

RS (mm)

(mm)

LIGHT SOURCE SIDE

LIGHT SOURCE SIDE

RS

LIGHT SOURCE SIDE

FIG.14

| SURFACE | RDY | THI | GLA |
|---|---|---|---|
| OBJ | INFINITY | INFINITY | |
| STO | INFINITY | 0.0 | |
| S1 | 1.68376 | 2.0000 | MNBF1_HOYA |
| | K : -0.646170 <br> A :0.565261E-02  B :0.756529E-03  C :0.251682E-03  D :-.625230E-04 <br> E :0  F :0  G :0  H :0  J :0 | | |
| S2 | 69.01541 | 0.831223 | |
| | K :-5087.976968 <br> A :0.274119E-01  B :-.942227E-02  C :-.453159E-02  D :0.311982E-02 <br> E :0  F :0  G :0  H :0  J :0 | | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 650 | |

FIG.15

| SURFACE | RDY | THI | GLA |
|---|---|---|---|
| OBJ | INFINITY | INFINITY | |
| STO | INFINITY | 0.0 | |
| S1 | 1.47611 | 2.0000 | MBaCD12_HOYA |
| | K : −0.673940 | | |
| | A :0.747397E-02  B :0.134738E-02  C :0.501419E-03  D :0.906564E-04 | | |
| | E :−.433341E-04  F :−.100054E-05  G :0.101452E-04  H :0.448335E-05 | | |
| | J :−.171453E-05 | | |
| S2 | −7.26169 | 1.096024 | |
| | K : 33.294570 | | |
| | A :0.734587E-01  B :−.205746E-01  C :0.490640E-02  D :0.559675E-02 | | |
| | E :0.175430E-02  F :−.116212E-02  G :−.178214E-02  H :−.759357E-03 | | |
| | J :0.134652E-02 | | |
| S3 | INFINITY | 0.1 | PC (n=1.58) |
| S4 | INFINITY | 0.0 | |
| IMG | INFINITY | 0.0 | |
| EPD (mm) | | 3.0 | |
| WL (nm) | | 650 | |

FIG.16

| SURFACE | RDY | THI | GLA |
|---|---|---|---|
| OBJ | INFINITY | INFINITY | |
| STO | INFINITY | 0.0 | |
| S1 | 1.45407 | 2.0000 | MNBF1_HOYA |
| | K : -0.7276684<br>A :0.126415E-01  B :0.314366E-02  C :0.157913E-03  D :0.359798E-03<br>E :0  F :0  G :0  H :0  J :0 | | |
| S2 | 38.73991 | 0.585206 | |
| | K :-3076.714512<br>A :0.699205E-01  B :-.800519E-02  C :-.263628E-01  D :0.119884E-01<br>E :0  F :0  G :0  H :0  J :0 | | |
| S3 | INFINITY | 0.1 | PC (n650=1.58) |
| S4 | INFINITY | 0.0 | |
| IMG | INFINITY | 0.0 | |
| EPD (mm) | 3.0 | | |
| WL (nm) | 650 | | |

FIG.17

| SURFACE | RDY | THI | GLA |
|---|---|---|---|
| OBJ | INFINITY | INFINITY | |
| STO | INFINITY | 0.0 | |
| S1 | 1.50153 | 2.0000 | MLAC130_HOYA |
| | K : -0.673940<br>A :0.599024E-02  B :0.640258E-03  C :-.494591E-03  D :0.194475E-03<br>E :-.125237E-03  F :-.632417E-04  G :0.462251E-06  H :0.660674E-05<br>J :-.372876E-05 | | |
| S2 | -7.75931 | 0.849168 | |
| | K : 33.294570<br>A :0.559583E-01  B :-.479070E-01  C :0.129905E-02  D :0.725733E-02<br>E :0.322894E-02  F :-.184115E-03  G :-.139762E-02  H :-.882062E-03<br>J :0.736232E-03 | | |
| S3 | INFINITY | 0.1 | PC (n650=1.58) |
| S4 | INFINITY | 0.0 | |
| IMG | INFINITY | 0.0 | |
| EPD (mm) | | | 3.0 |
| WL (nm) | | | 650 |

FIG.18

| SURFACE | RDY | THI | | GLA |
|---|---|---|---|---|
| OBJ | INFINITY | INFINITY | | |
| STO | INFINITY | 0.0 | | |
| S1 | 1.2997 | 2.0000 | | MNBF1_HOYA |
| | K : -0.674735<br>A :0.147567E-01  B :0.421030E-02  C :0.563093E-04  D :0.755173E-03<br>E :0  F :0  G :0  H :0  J :0 | | | |
| S2 | 160.23752 | 0.465294 | | |
| | K :-9981.687546<br>A :0.119746E+00  B :-.845875E-01  C :0.102806E-01  D :0.958951E-02<br>E :0  F :0  G :0  H :0  J :0 | | | |
| S3 | INFINITY | 0.1 | | PC (n650=1.58) |
| S4 | INFINITY | 0.0 | | |
| IMG | INFINITY | 0.0 | | |
| EPD (mm) | | 3.0 | | |
| WL (nm) | | 650 | | |

FIG.19

| SURFACE | RDY | THI | GLA |
|---|---|---|---|
| OBJ | INFINITY | INFINITY | |
| STO | INFINITY | 0.0 | |
| S1 | 1.2977 | 2.0000 | MLAC130_HOYA |
| | K : -0.673940<br>A :0.124286E-01  B :0.203651E-02  C :0.135115E-02  D :-.677367E-04<br>E :-.173209E-03  F :0.232372E-04  G :0.455845E-04  H :0.569043E-05<br>J :-.206739E-04 | | |
| S2 | -7.29409 | 0.591052 | |
| | K : 33.294570<br>A :0.158030E+00  B :-.117254E+00  C :-.227039E-02  D :0.197911E-01<br>E :0.992521E-02  F :-.804496E-03  G :-.484774E-02  H :-.287652E-02<br>J :0.257760E-02 | | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 650 | |

FIG.20

| SURFACE | RDY | THI | GLA |
|---|---|---|---|
| OBJ | INFINITY | INFINITY | |
| STO | INFINITY | 0.0 | |
| S1 | 1.71822 | 2.0000 | MNBF1_HOYA |
| | K : -0.649819<br>A : 0.552796E-02  B : 0.703439E-03  C : 0.241600E-03  D : -.758308E-04<br>E : 0  F : 0  G : 0  H : 0  J : 0 | | |
| S2 | 27.21545 | 0.831223 | |
| | K : -1348.132949<br>A : 0.552796E-02  B : 0.703439E-03  C : 0.241600E-03  D : -.758308E-04<br>E : 0  F : 0  G : 0  H : 0  J : 0 | | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 407 | |

FIG.21

| SURFACE | RDY | THI | GLA |
|---|---|---|---|
| OBJ | INFINITY | INFINITY | |
| STO | INFINITY | 0.0 | |
| S1 | 1.52938 | 2.0000 | MBaCD12_HOYA |
| | K : -0.673940 <br> A :0.674357E-02  B :0.109304E-02  C :0.221867E-03  D :0.121384E-04 <br> E :-.726237E-04  F :-.282277E-05  G :0.115913E-04  H :0.471700E-05 <br> J :-.263419E-05 | | |
| S2 | -7.36488 | 1.115081 | |
| | K : 33.294570 <br> A :0.704828E-01  B :-.300717E-01  C :0.393162E-02  D :0.732049E-02 <br> E :0.220296E-02  F :-.138790E-02  G :-.227421E-02  H :-.109458E-02 <br> J :0.162360E-02 | | |
| S3 | INFINITY | 0.1 | PC (n=1.58) |
| S4 | INFINITY | 0.0 | |
| IMG | INFINITY | 0.0 | |
| EPD (mm) | | | 3.0 |
| WL (nm) | | | 407 |

FIG.22

| SURFACE | RDY | THI | GLA |
|---|---|---|---|
| OBJ | INFINITY | INFINITY | |
| STO | INFINITY | 0.0 | |
| S1 | 1.48011<br>K : -0.726442<br>A :0.127982E-01  B :0.294910E-02  C :0.316384E-03  D :0.264462E-03<br>E :0  F :0  G:0  H:0  J:0 | 2.0000 | MNBF1_HOYA |
| S2 | 16.48335<br>K : -234.719839<br>A :0.717508E-01  B :-.140425E-01  C :-.274644E-01  D :0.148787E-01<br>E :0  F :0  G:0  H:0  J:0 | 0.583068 | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 407 | |

FIG.23

| SURFACE | RDY | THI | GLA |
|---|---|---|---|
| OBJ | INFINITY | INFINITY | |
| STO | INFINITY | 0.0 | |
| S1 | 1.56813 | 2.0000 | MLAC130_HOYA |
| | K : -0.673940<br>A :0.454237E-02  B :0.850105E-04  C :-.728523E-03  D :0.165139E-03<br>E :-.147585E-03  F :-.770331E-04  G :-.308946E-05  H :0.692761E-05<br>J :-.293871E-05 | | |
| S2 | -7.61814 | 0.874666 | |
| | K : 33.294570<br>A :0.559583E-01  B :-.479070E-01  C :0.129905E-02  D :0.725733E-02<br>E :0.322894E-02  F :-.184115E-03  G :-.139762E-02  H :-.882062E-03<br>J :0.736232E-03 | | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 407 | |

FIG.24

| SURFACE | RDY | THI | GLA |
|---|---|---|---|
| OBJ | INFINITY | INFINITY | |
| STO | INFINITY | 0.0 | |
| S1 | 1.33386 | 2.0000 | MNBF1_HOYA |
| | K : −0.677062<br>A :0.143892E-01  B :0.435753E-02  C :−.429857E-04  D :0.732593E-03<br>E :0  F :0  G :0  H :0  J :0 | | |
| S2 | 28.14715 | 0.468034 | |
| | K : 408.178331<br>A :0.123506E+00  B :−.905967E-01  C :0.627987E-02  D :0.135586E-01<br>E :0  F :0  G :0  H :0  J :0 | | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 407 | |

FIG.25

| SURFACE | RDY | THI | GLA |
|---|---|---|---|
| OBJ | INFINITY | INFINITY | |
| STO | INFINITY | 0.0 | |
|  | 1.35305 | 2.0000 | MLAC130_HOYA |
| S1 | K : -0.673940<br>A : 0.108064E-01  B : 0.142309E-02  C : 0.107976E-02  D : -.925977E-04<br>E : -.204146E-03  F : -.154520E-05  G : 0.338862E-04  H : 0.455172E-05<br>J : -.177097E-04 | | |
|  | -7.19665 | 0.615244 | |
| S2 | K : 33.294570<br>A : 0.151740E+00  B : -.123230E+00  C : 0.300668E-03  D : 0.220551E-01<br>E : 0.102931E-01  F : -.132959E-02  G : -.538826E-02  H : -.301263E-02<br>J : 0.292188E-02 | | |
| S3 | INFINITY | 0.1 | PC (n650=1.58) |
| S4 | INFINITY | 0.0 | |
| IMG | INFINITY | 0.0 | |
| EPD (mm) | | 3.0 | |
| WL (nm) | | 407 | |

WAVEFRONT ABERRATION

PHASE DIFFERENCE PROVIDED BY LCD

FIG.40

| SURFACE | RDY | THI | GLA(nd, νd) |
|---|---|---|---|
| OBJ | INFINITY | INFINITY | |
| STO | INFINITY | 0.0 | |
| S1 | 1.37595 | 2.381463 | 1.69350, 53.2 |
| | K : -0.671973 | | |
| | A : 0.108576E-01  B : 0.887024E-03  C : 0.615641E-03  D : 0.305477E-03 | | |
| | E : -.235521E-03  F : 0.854484E-05  G : 0.403964E-04  H : 0.589180E-05 | | |
| | J : -.871198E-05 | | |
| S2 | -4.24219 | 0.425496 | |
| | K : 15.973518 | | |
| | A : 0.265234E+00  B : -.165189E+00  C : -.762341E-01  D : 0.119223E+00 | | |
| | E : 0.102416E-01  F : -.146044E-02  G : -.528214E-02  H : -.300544E-02 | | |
| | J : 0.292188E-02 | | |
| S3 | INFINITY | 0.1 | 1.516330, 64.1 |
| S4 | INFINITY | 0.0 | |
| IMG | INFINITY | 0.0 | |
| EPD (mm) | | | 3.0 |
| WL (nm) | | | 407 |

FIG. 41

| SURFACE | RDY | THI | GLA(nd, νd) |
|---|---|---|---|
| OBJ | INFINITY | INFINITY | |
| STO | INFINITY | 0.0 | |
| S1 | 1.8331 | 3.174078 | 1.69350, 53.2 |
| | K : -0.673151 <br> A : 0.452775E-02  B : 0.2218④E-03  C : -0.744749E-04  D : 0.2147785E-04 <br> E : -.9861④9E-05  F : 0.3108 11E-06  G : 0.5537 5E-06  H : 0.4385 9E-07 <br> J : -.4007716E-07 | | |
| S2 | -5.70133 | 0.588459 | |
| | K : 16.284518 <br> A : 0.1115 2E+00  B : -.402812E-01  C : -.106 329E-01  D : 0.9334 2E-02 <br> E : 0.4325 5E-03  F : -.3469 60E-04  G : -.7058 77E-04  H : -.2259 17E-04 <br> J : -.1235 5E-04 | | |
| S3 | INFINITY | 0.1 | 1.516330, 64.1 |
| S4 | INFINITY | 0.0 | |
| IMG | INFINITY | 0.0 | |
| EPD (mm) | | | 4.0 |
| WL (nm) | | | 407 |

FIG.45

| SURFACE | RDY | THI | GLA(nd, νd) |
|---|---|---|---|
| OBJ | INFINITY | 0 | |
| S1 | INFINITY | 15.000000 | |
| S2 | -12.62829 | 2.000000 | 1.51680, 64.2 |
| S3 | -22.59482<br>K : -6059.176538<br>A : 0.111133E-01  B : -.307145E-01  C : -.160011E+00  D : 0.234471E+00<br>E : 0.000000E+00  F : 0.000000E+00  G : 0.000000E+00  H : 0.000000E+00<br>J : 0.000000E+00 | 20.000000 | |
| STO | INFINITY | 0.0 | |
| S5 | 1.8331<br>K : -0.673151<br>A : 0.452775E-02  B : 0.221894E-03  C : -.744749E-04  D : 0.214785E-04<br>E : 0.986149E-05  F : 0.310811E-06  G : 0.553785E-06  H : 0.438509E-07<br>J : -.400718E-07 | 3.174078 | 1.69350, 53.2 |
| | -5.70133 | 0.501457 | |
| S6 | 16.284518<br>K : 16.284518<br>A : 0.111552E+00  B : -.402812E-01  C : -.106329E-01  D : 0.933402E-02<br>E : 0.432555E-03  F : -.346960E-04  G : -.705877E-04  H : -.225917E-04<br>J : 0.123545E-04 | 0.6 | |
| S7 | INFINITY | 0.0 | 1.51630, 64.1 |
| S8 | INFINITY | 0.0 | |
| IMG | INFINITY | | |
| EPD (mm) | | | 3.24570 |
| WL (nm) | | | 660 |

FIG.46

| SURFACE | RDY | THI | GLA(nd, νd) |
|---|---|---|---|
| OBJ | INFINITY | 0 | |
| S1 | INFINITY | 15.000000 | |
| S2 | 860.81257 | 2.000000 | 1.51680, 64.2 |
| | -6067.79809 | 5.000000 | |
| S3 | K : -0.107791e-13<br>A : 0.344822E-02  B : -.158024E-02  C : -.181558E-02  D : 0.727909E-03<br>E : -0.332598E-03  F : -.247155E-03  G : 0.160591E-08  H : 0.374895E-09<br>J : 0.135988E-09 | | |
| STO | INFINITY | 0.0 | |
| S5 | 1.8331 | 3.174078 | 1.69350, 53.2 |
| | K : -0.673151<br>A : 0.452775E-02  B : 0.221894E-03  C : 0.744749E-04  D : 0.214785E-04<br>E : -.966149E-05  F : 0.310811E-06  G : 0.553785E-06  H : 0.438509E-07<br>J : -.400716E-07 | | |
| S6 | -5.70133 | 0.236004 | |
| | 16.284518 | | |
| | K : 0.111552E+00  B : -.402812E-01  C : -.106329E-01  D : 0.933402E-02<br>A : 0.432555E-03  F : -.348960E-04  G : -.705877E-04  H : -.225817E-04<br>E :<br>J : 0.125545E-04 | | |
| S7 | INFINITY | 1.2 | 1.516330, 64.1 |
| S8 | INFINITY | 0.0 | |
| IMG | INFINITY | 0.0 | |
| EPD (mm) | | 2.58870 | |
| WL (nm) | | 780 | |

FIG.55A
FIG.55B
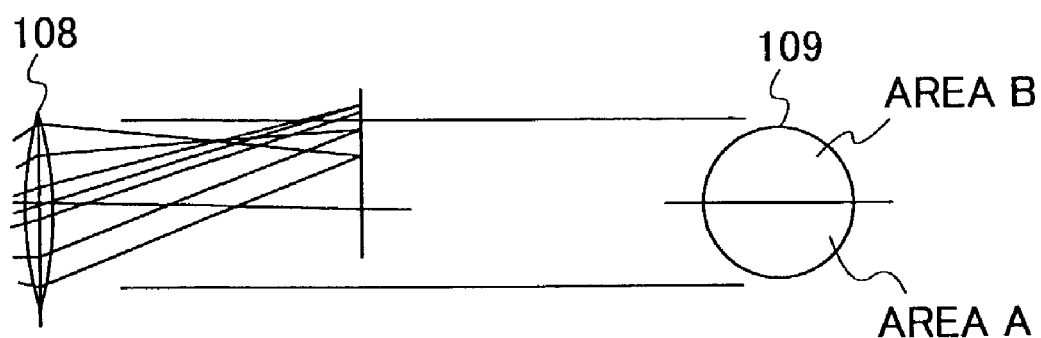
FIG.55C
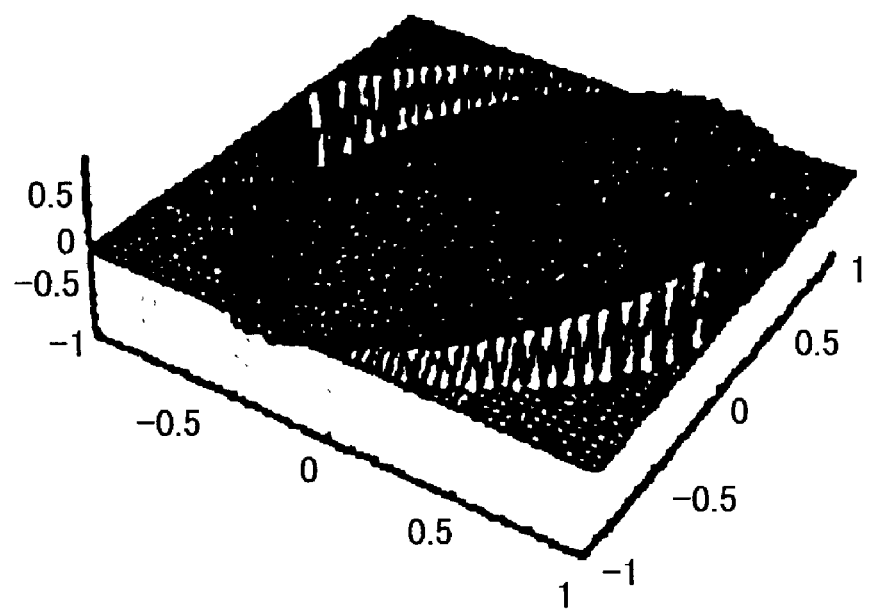

OBJECT LENS FOR AN INFINITE-TYPE OPTICAL PICKUP, OPTICAL PICKUP AND OPTICAL INFORMATION PROCESSING DEVICE

BACKGROUND OF THE INVENTION

1. Field of the Invention

The present invention relates to an object lens for an optical pickup, an optical pickup, and an optical information processing device.

2. The Description of the Related Art

For "an optical recording medium" such as a CD (compact disk) or a DVD (digital video disk), "an optical information processing device" which performs recording, reproduction, and deletion of information using an optical pickup has been spread widely. In this technical field, high-density recording onto the optical recording medium is demanded.

Since the light spot formed on the recording surface of the optical recording medium is formed of a beam waist of a laser beam which converges by means of the object lens of the optical pickup, and the diameter of the beam waist is proportional to the wavelength of laser beam, and, also, is inverse proportional to the numerical aperture (NA) of the object lens, increase in NA of the object lens in the optical pickup and shortening in the wavelength of laser beam are demanded accordingly.

As to the shortening of the wavelength of laser beam, a semiconductor laser having "the emission wavelength around 660 nm" for DVD is already put in practical use, and, these days, a laser light-source having the wavelength around 400 nm is also being put in practical use.

As the object lens having the large NA exceeding 0.7 has been proposed (for example, see Japanese laid-open patent application No. 10-123410). However, any of such object lenses having the large NA has a two-lens-combined configuration. Compared with a single-lens configuration, such a type of lens of two-lens-combined configuration requires complicated assembling process, high precision in assembling work, and, also, may not be driven at a high speed due to increase in the weight itself.

Moreover, as a working distance, i.e., the distance between the object lens and the optical recording medium surface is shortened in case of employing such a two-lens-combined configuration, there increases a risk of hitting of the object lens onto the recording medium surface, resulting in a series damage occurring thereon. As a result, it becomes difficult to achieve high reliability in this scheme.

Although such a problem does not occur in case of usage of a single lens configuration in the object lens, it may not be possible to achieve large NA. For example, around 6.5 is the maximum on those known.

Conventionally, an incident side substrate thickness, i.e., the distance between the surface of the recording medium on which the beam is incident and the recording surface thereof is prescribed as being 1.2 mm for CD while as being 0.6 mm for DVD. However, recently, a new trend occurs in which the incident side substrate thickness is to be standardized into as small as 0.1 mm.

There is a variation for every individual in the emission wavelength of the semiconductor laser generally used as the light source of the optical pickup, and there is also a phenomenon called mode hopping in which several nm change in the main wavelength occurs with temperature change etc. in the semiconductor laser.

In the optical pickup, when the wavelength emitted from the semiconductor laser changes from the original design value due to the variation for every individual, or due to the mode hopping, chromatic aberration arises in the optical pickup's optical system, the diameter of beam spot increases on the medium recording surface, and, thus, there is a possibility of causing a problem on recording/reproducing operation in the device.

Especially the chromatic aberration occurring in the object lens by the wavelength change when using the short wavelength semiconductor laser not more than the emission wavelength around 440 nm may causes a nonpermissible problem. Namely, the refractive-index change with respect to a minute wavelength change becomes large in such a short wavelength range, and also, the chromatic aberration becomes large and the amount of defocus which is the focal movement amount becomes large. Furthermore, the beam spot on the recording medium is shortened so as to achieve high density recording, and, also, the focal depth of the object lens is proportional to the wavelength and inverse proportional to the second power of NA. Accordingly, the focal depth becomes smaller as the wavelength is shorter, and, thus, the tolerance on the defocus becomes restricted.

On the other hand, manufacture error on the order of ±10 nm is not avoidable with respect to the incident side substrate thickness of 0.1 mm. Such a substrate thickness error may cause spherical aberration in imaging function of the object lens designed according to the standardized substrate thickness. Thereby, the beam spot diameter may be increased, and, thus, the proper operation may not be expected in the optical pickup. As well-known, the spherical aberration is proportional to the forth power of NA of the object lens, the substrate thickness error may cause a larger problem as NA of the object lens increases.

As the optical recording medium, recently, in order to achieve a large recording capacity, a so-called "multilayer optical recording medium" in which a plurality of recording layers are placed on each other in a single recording disk has been put in practical use. In such a multilayer optical recording medium, since the recording surface separation (space thickness) of several 10 micrometers or more is needed and the distance from the object lens is different for every recording surface when recording, reproduction, or deletion of information is performed independently onto the respective ones of the plurality of recording surfaces. Accordingly, the spherical aberration may occur on a recording surface thereof different from the optimum position.

In the semiconductor laser used as the light source, utilization of the semiconductor laser with an oscillation wavelength around 400 nm has been attained. As the high NA lens, the high NA lens for the pickup which includes an aspheric surface lens of two-lens-combined configuration is disclosed in Japanese laid-open patent applications Nos. 2001-83410, 11-202194, and 11-203711. However, as described above, such a two-lens-combined configuration object lens even having high NA may be problematic in comparison to a single lens configuration.

Japanese laid-open patent application No. 2001-324673 discloses an object lens beyond NA: 0.7 of single lens configuration solving the above-mentioned problem.

However, these conventional examples have a low implementability in terms of manufacture. In fact, in order for the object lens of single lens configuration to attain a raise in NA, and shortening the applicable wavelength, it is necessary to select such a type of glass material that press fabrication thereof can be made using a die having ultra-precision machining performed thereon, it is necessary to achieve satisfactory wavefront performance at a design median, and, also, it is necessary to make the manufacture tolerance to fall within a range of implementability. Specifically, first, as to the wavefront aberration in the design median, it should be controlled less than 0.01λ.

According to the inventor's calculation, the wavefront aberration of the object lens for an optical pickup disclosed by Japanese laid-open patent application No. 2001-324673, embodiment 3 should be 0.037λ, and thus, we could say that implementability is low, where this object lens is used for the wavelength of 400 nm, has NA: 0.85, and f (focal length): 1.765 mm, nd (refractive index in the lens material with respect to the d-line): 1.71667, and νd (number of Abbe in the lens material with respect to the d-line): 53. Moreover, actual utilization thereof is difficult when the implementability on the condition of the manufacture tolerance is low even when the wavefront performance in the design median is satisfied. For example, the wavefront aberration needs to fall on the order of not more than 0.015λ with respect to the deviation in the thickness more than ±1 μm. FIG. 1 shows a relationship between the thickness tolerance and wavefront aberration on the object lens for optical pickup used in the wavelength: 650 nm, having NA: 0.75, f: 2.00 mm, nd: 1.69330, and νd: 53, as another example. As can be seen therefrom, the above-mentioned conditions cannot be actually satisfied.

Therefore, it is demanded to provide a lens with a reduced amount in wavefront performance degradation with respect to the manufacture tolerance, or to provide an optical pickup which can control the amount in wavefront performance degradation with respect to the manufacture tolerance.

Moreover, while the new standard of increasing NA and shortening the applied wavelength will be issued near future, there exist the conventional CD and DVD. It is preferable that these conventional optical recording media and the optical recording media according to the above-mentioned new standard can both be dealt with by a common optical information processing device. As an easier method therefor, a conventional optical pickup and an optical pickup according to the new standard are both mounted in one information processing device. However, it is difficult to attain a miniaturization and cost reduction of the device according to such a scheme.

SUMMARY OF THE INVENTION

In view of the above-described situation, the present invention has an object of achieving the object lens of a single lens configuration, which is advantageous for forming a small-sized beam spot and, also, having a large NA, which object lens is also advantageous in application into the optical pickup and the optical information processing device.

Another object of the present invention is to well control the chromatic aberration caused by the operating wavelength change/variation, and to raise accuracy in operation of the optical pickup which uses this object lens.

Another object of the present invention is to well correct the spherical aberration caused by the substrate thickness error, so as to raise the reliability of the optical pickup.

Another object of the present invention is to achieve satisfactory recording, reproduction, or deletion onto each recording surface of the multilayer optical recording medium in the optical pickup which uses the above-mentioned object lens.

According to the present invention, as the object lens for the optical pickup, a single-lens and both-side-convex configuration is applied. Further, a number of specific conditional formulas are created with respect to a particular numerical aperture NA, for a paraxial curvature radius R1 on the surface of the lens on the light source side; the working distance WD, the refractive index nd with respect to the d-line, and the focal length f. Furthermore, specific conditional formulas are created for the refractive index nd with respect to the d-line and the Abbe's number νd with respect to the d-line.

Thereby, as the single-lens configuration is applied, it is possible to avoid increase in the number of components, increase in the total weight, difficulty in achievement of required assembling accuracy, and so forth in the pickup applying the object lens. Furthermore, it becomes possible to achieve the numerical aperture of 6.5 or more, and also, to employ the short operating wavelength of 650±20 nm or 407±10 nm, and, thereby, to achieve an advantageous small light spot or beam spot on the recording surface, positively.

By applying such a high-performance object lens for the optical pickup, the pickup can be suitably supplied for high-density information recording. Accordingly, by applying the optical pickup in an optical information processing device, it is possible to perform recording, reproducing and deleting of information on each type of optical recording medium required, with a satisfactory recording condition/performance.

Another object of the present invention is to solve the above-mentioned problems, and, to provide an object lens for an optical pickup having a large NA thereby advantageous in effective reduction in the light spot diameter, and, also, has a large manufacture tolerance, wherein, without mounting a plurality of optical pickups, it is possible to deal with not only an optical recording media according to the new standard but also conventional CD and DVD, and also, to well correct aberration even increased due to a possible manufacture error, so as to improve the reliability in the optical pickup.

According to another aspect of the present invention, as the object lens for the optical pickup, a single-lens and both-side-convex and also both-side aspherical configuration formed in a glass-mode manner is applied. Also in this case, a number of specific conditional formulas are created with respect to a particular numerical aperture NA, for a paraxial curvature radius R1 on the surface of the lens on the light source side, the working distance WD, the refractive index nd with respect to the d-line, and the focal length f. Furthermore, specific conditional formulas are created for the refractive index nd with respect to the d-line and the Abbe's number νd with respect to the d-line.

Other objects and further features of the present invention will become more apparent from the following detailed description when read in conjunction with the accompanying drawings.

BRIEF DESCRIPTION OF THE DRAWINGS

FIG. 14 shows a specification of the embodiment 1;
FIG. 15 shows a specification of the embodiment 2;
FIG. 16 shows a specification of the embodiment 3;
FIG. 17 shows a specification of the embodiment 4;
FIG. 18 shows a specification of the embodiment 5;
FIG. 19 shows a specification of the embodiment 6;
FIG. 20 shows a specification of the embodiment 7;
FIG. 21 shows a specification of the embodiment 8;
FIG. 22 shows a specification of the embodiment 9;
FIG. 23 shows a specification of the embodiment 10;
FIG. 24 shows a specification of the embodiment 11;
FIG. 25 shows a specification of the embodiment 12.

FIG. 40 shows a specification of the embodiment 13;
FIG. 41 shows a specification of the embodiment 14;

FIG. 45 shows a specification of the embodiment 15;
FIG. 46 shows a specification of the embodiment 16.

FIGS. 55A through 55E illustrate a state of wavefront aberration correction according to the embodiment 22;

DETAILED DESCRIPTION OF THE PREFERRED EMBODIMENTS

Figure 1:
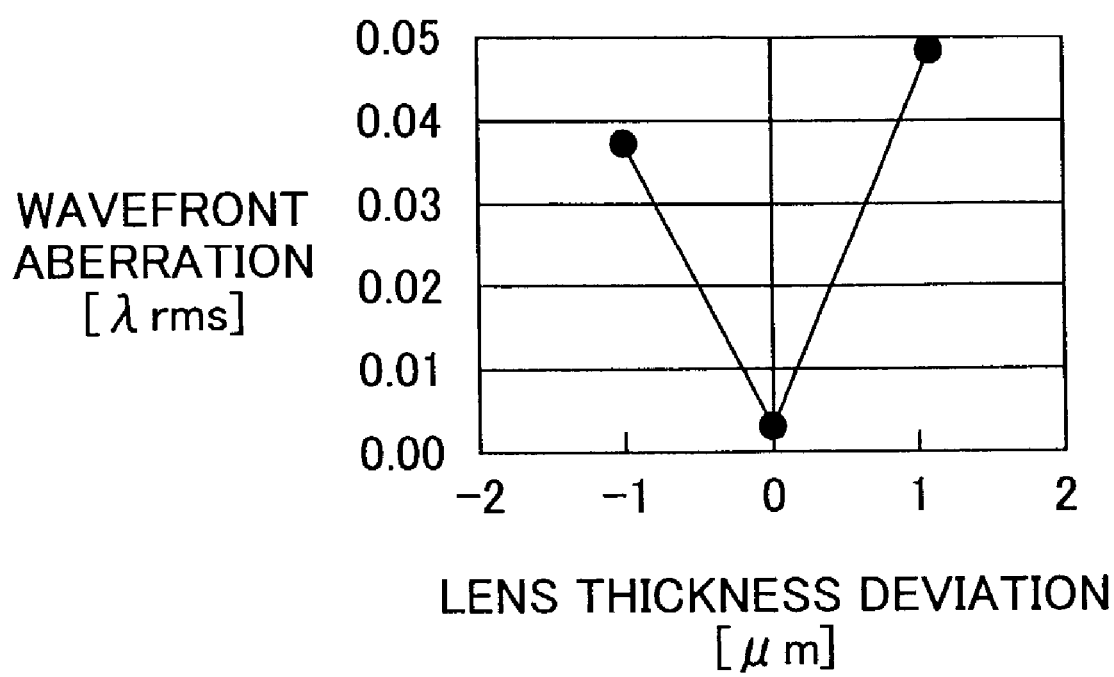
FIG. 1 shows a relation between lens thickness error and wavefront aberration in an object lens in the related art.

Specific embodiments of an object lens for an optical pickup according to the present invention will now be described. In each of FIGS. 2A, 3A, . . . , 13A, a reference numeral "1" stands for an aperture, "2" stands for the object lens for an optical pickup according to the present invention, and "3" stands for an incident side substrate of an optical recording medium (having the thickness of 0.1 mm).

A laser beam emitted from a light source passes through an opening (having a diameter of 3 mm) of the aperture 1, is incident on the object lens 2, the beam becomes a condensing beam by means of this lens 2, the incident side substrate 3 of the optical recording medium is passed through by the condensing beam, and then, a light spot is formed on a recording surface RS of the optical recording medium.

Twelve embodiments of the present invention, i.e., embodiments 1 through 12 will now be described. in each of the embodiments 1, 3, 5, 7, 9, and 11, the object lens for the optical pickups is a meniscus lens having a convex surface facing the light source side, while, in each of the embodiments 2, 4, 6, 8, 10, and 12, the object lens for the optical pickup is both-side-convex lens with a surface having a radius of curvature smaller (sharper curvature) facing the light source side.

For each embodiment, the refractive index with respect to the d-line and the number of Abbe with respect to the d-line of the lens material are referred to as nd and vd, respectively, the numerical aperture is referred to as NA, and the focal length is referred to as f.

The aspherical shape on the lens surface is expressed by the following well-known formula:

$$X=(Y^2/R)/[1+\sqrt{1-(1+K)(Y/R)^2}]+AY^4+BY^6+CY^8+DY^{10}+EY^{12}+FY^{14}+GY^{16}+HY^{18}+JY^{20}+\ldots$$

where X stands for the coordinates along the optical axis, Y stands for the coordinates along a direction perpendicular to the optical axis, R denotes the paraxial curvature radius, K denotes a cone constant, A, B, C, D, E, F, . . . stand for high-order coefficients, and R, K, A, B, C, D, . . . are given so as to express the particular aspherical surface.

Embodiment 1

The object lens for the optical pickup in the embodiment 1 is used with the operating wavelength of 650 nm. Further, this lens has the following specification:

NA: 0.65, f: 2.31 mm, nd=1.74330, and vd=49.36. The other specific data is show in FIG. 14.

In the table shown in FIG. 14, "OBJ" stands for an object point (a semiconductor laser as a light source). The object lens for the optical pickup is according to "infinite system". Accordingly, "INFINITY" mentioned in the item of each of the curvature radius RDY and thickness THI means that the light source is located at the infinite distant point. "STO" stands for a surface of the aperture 1, and, the curvature radius RDY is set to "INFINITY", and the thickness thereof is set to "0" on the design. In the description of the embodiments, the unit of amount having a dimension of length is "mm", hereinafter.

"S1" stands for the "light-source-side surface" of the object lens for the optical pickup, and "S2" means the "optical-recording-medium-side surface" of the same. The thickness of the lens (THI) in the embodiment 1 is 2.0000 mm, and the name of glass material (GLA) thereof is NMBF1_HOYA as shown in FIG. 14. Further, 0.831223 mm shown in the figure in the field for S2 at the right hand of the curvature radius indicates the working distance, i.e., the distance between the optical-recording-medium side surface of the object lens and the object-lens side surface of the incident side substrate of the optical recording medium.

"S3" stands for the light-source-side surface of the incident-side substrate 3 of the optical recording medium, while "S4" stands for the surface corresponding to the recording surface RS of the optical recording medium. The distance between S3 and S4, i.e., the thickness of the incident-side substrate is 0.1 mm, and, the material thereof is polycarbonate having the refractive index: n=1.58, as shown. "EPD" (entrance pupil diameter) shown expresses the diameter (3 mm) of the opening of the aperture 1, and "WL" (wavelength) expresses the operating wavelength (650 nm), in FIG. 14.

In the fields of S1 and S2, for example, "D: −0.625230E-04" means "D=−0.625230×10$^{-4}$", indicating the coefficient D of the formula for the aspherical surface. The same manner is also applied in the description of every embodiment.

Figure 2A:
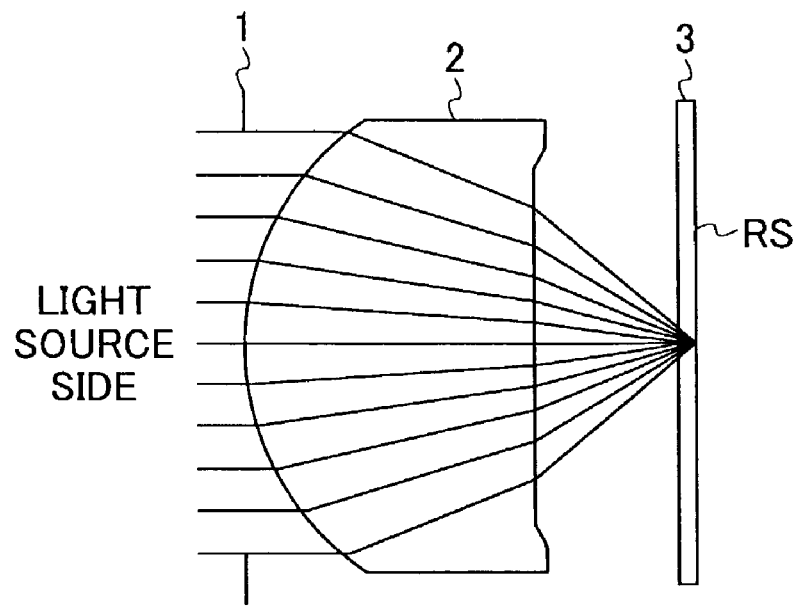
FIGS. 2A, 2B and 2C show a shape, astigmatism and spherical aberration of an embodiment 1 of the present invention.
Figure 2B:
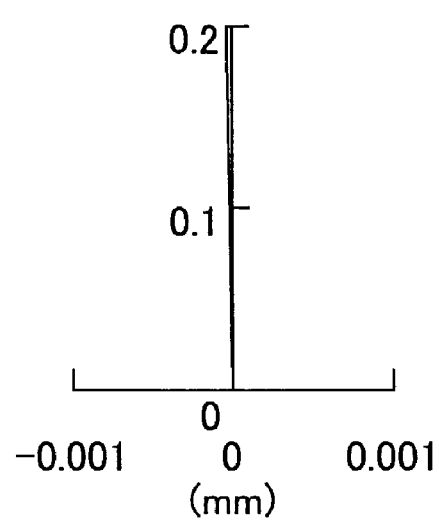
Figure 2C:
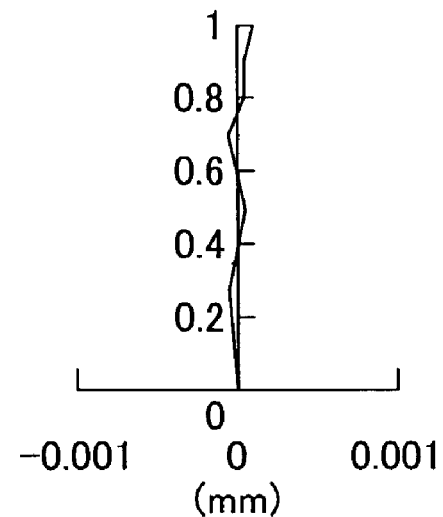

FIG. 2A shows an arrangement of the aperture 1, the object lens 2, and the incident side substrate 3 in the embodiment 1. FIGS. 2B and 2C show the astigmatism and the spherical aberration of the object lens in the embodiment 1, where the scale on the vertical axis indicates the value normalized in a manner such that the entrance pupil radius is made to be 1). As can be seen there, both the aberrations are corrected very satisfactorily. In fact, "wavefront aberration" is less than 0.01λ.

As mentioned above, according to the embodiment 1, R1=1.68376 mm, f=2.31 mm, nd=1.74330, and the number of Abbe vd=49.36 and the working distance (WD)=0.831223 mm. Accordingly, R1, f, and nd satisfy the conditions of the following formulas (1) and (2), and, also, both the refractive index and the number of Abbe satisfy the conditions of the following formulas (3) and (4):

$$1.2\ nd-1.1 < R1/f \leq 1.3\ nd-1.2 \tag{1}$$

$$0.37\ nd-0.14 < WD/f \leq 0.39\ nd-0.04 \tag{2}$$

$$vd \leq 60 \tag{3}$$

$$1.5 \leq nd \tag{4}$$

Embodiment 2

An object lens for an optical pickup according to the embodiment 2 of the present invention is an example used with the operating wavelength: 650 nm. Further, NA: 0.65, f: 2.31 mm, nd=1.58313, and vd=59.46. The other specific data is shown in FIG. 15 in the manner same as that of FIG. 14.

Figure 3A:
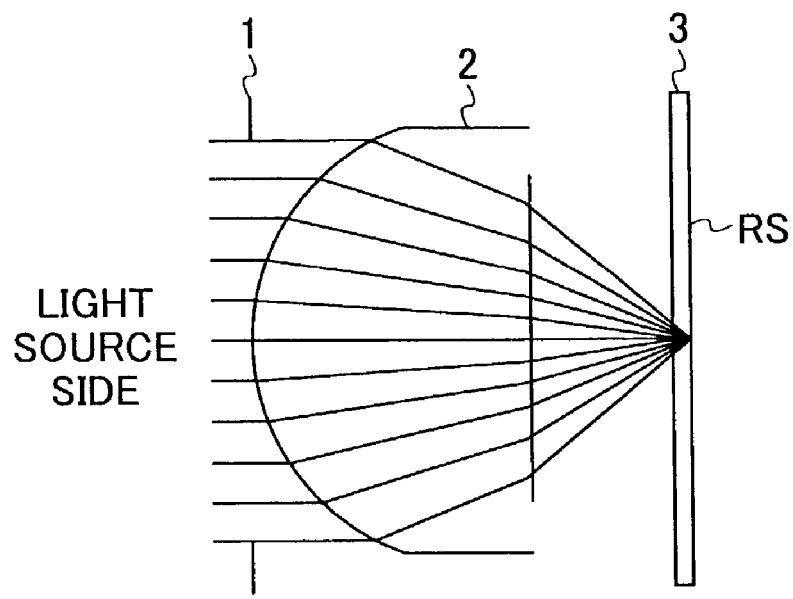
FIGS. 3A, 3B and 3C show a shape, astigmatism and spherical aberration of an embodiment 2 of the present invention.
Figure 3B:
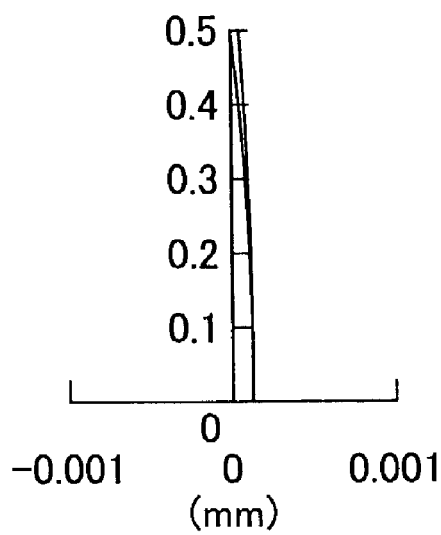
Figure 3C:
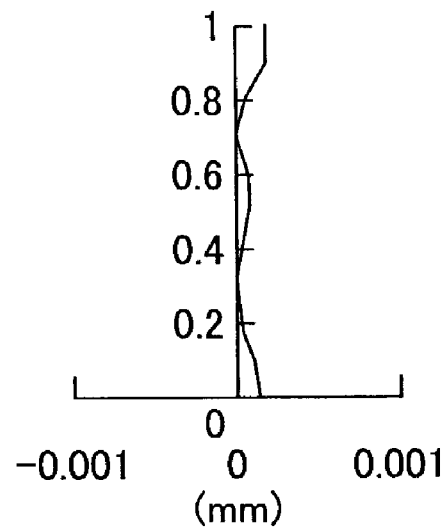

FIG. 3A shows an arrangement of the aperture 1, the object lens 2, and the incident side substrate 3 in the embodiment 2. FIGS. 3B and 3C show the astigmatism and the spherical aberration of the object lens in the embodiment 2, respectively, where the scale on the vertical axis indicates the value normalized in a manner such that the entrance pupil radius is made to be 1. As can be seen there, both the aberrations are corrected very satisfactorily. In fact, "wavefront aberration" is less than 0.01λ.

As mentioned above, according to the embodiment 2, R1=1.47611 mm, f=2.31 mm, nd=1.58313, and the number of Abbe vd=59.46 and working distance (WD)=1.096024 mm. Accordingly, R1, f, and nd satisfy the conditions of the above-mentioned formulas (1) and (2), and, also, both the refractive index and the number of Abbe vd satisfy the conditions of the above-mentioned formulas (3) and (4).

Embodiment 3

An object lens for an optical pickup according to the embodiment 3 of the present invention is an example to be used with the operating wavelength: 650 nm. Further, NA: 0.74, f: 2.00 mm, nd=1.74330, and vd=49.36. The other specification is shown in FIG. 16.

Figure 4A:
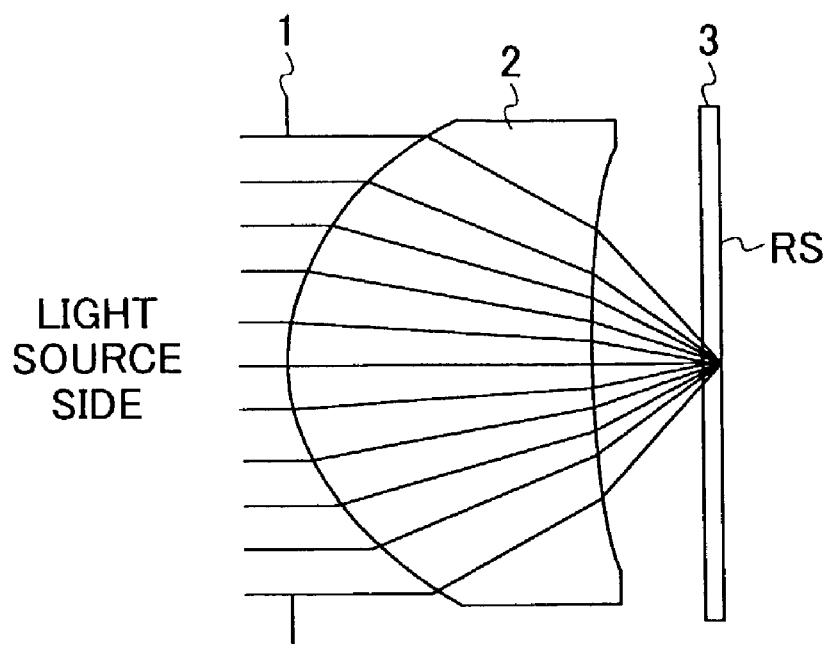
FIGS. 4A, 4B and 4C show a shape, astigmatism and spherical aberration of an embodiment 3 of the present invention.
Figure 4B:
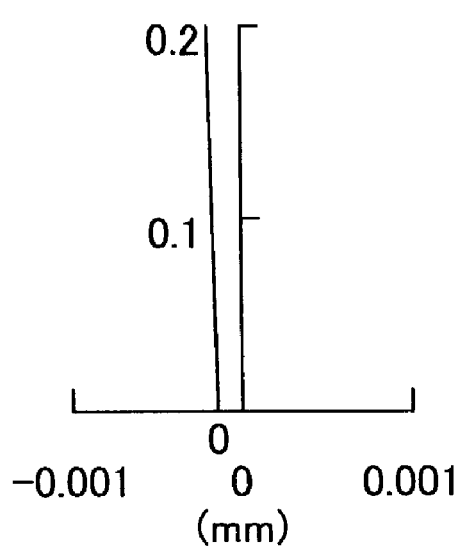
Figure 4C:
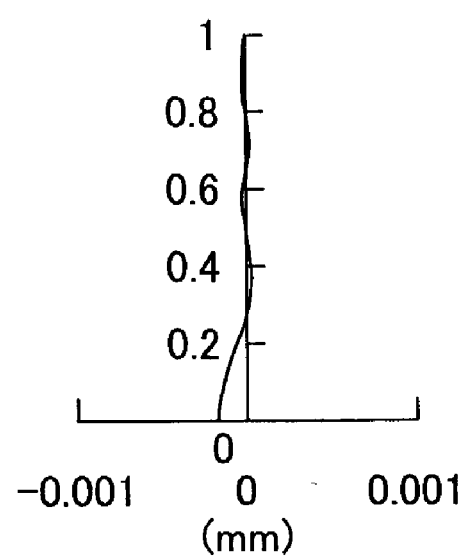

FIG. 4A shows an arrangement of the aperture 1, the object lens 2, and the incident side substrate 3 in the embodiment 3. FIGS. 4B and 4C show the astigmatism and the spherical aberration of the object lens in the embodiment 3, respectively, where the scale on the vertical axis indicates the value normalized in a manner such that the entrance pupil radius is made to be 1. As can be seen there, both the aberrations are corrected very satisfactorily. In fact, "wavefront aberration" is less than 0.01λ.

According to the embodiment 3, R1=1.45407 mm, f=2.00 mm, and nd=1.74330, the number of Abbe: vd=49.36 and working distance (WD)=0.585206 mm. Accordingly, R1, f, and nd satisfy the conditions expressed by the following formulas (5) and (6), and both the refractive index and the number of Abbe satisfy the conditions of the following formulas (7) and (8):

$$1.0\ nd-0.7 < R1/f \leq 1.2\ nd-1.1 \tag{5}$$

$$0.33\ nd-0.18 < WD/f \leq 0.37\ nd-0.14 \tag{6}$$

$$vd \leq 60 \quad (7)$$

$$1.6 \leq nd \quad (8)$$

Embodiment 4

An object lens for an optical pickup according to the embodiment 4 of the present invention is an example used with the operating wavelength: 650 nm, and has the following specification: NA: 0.74, f: 2.00 mm, nd=1.69330, and vd=53.17. The other data is shown in FIG. 17, in the same manner as that on FIG. 14.

Figure 5A:
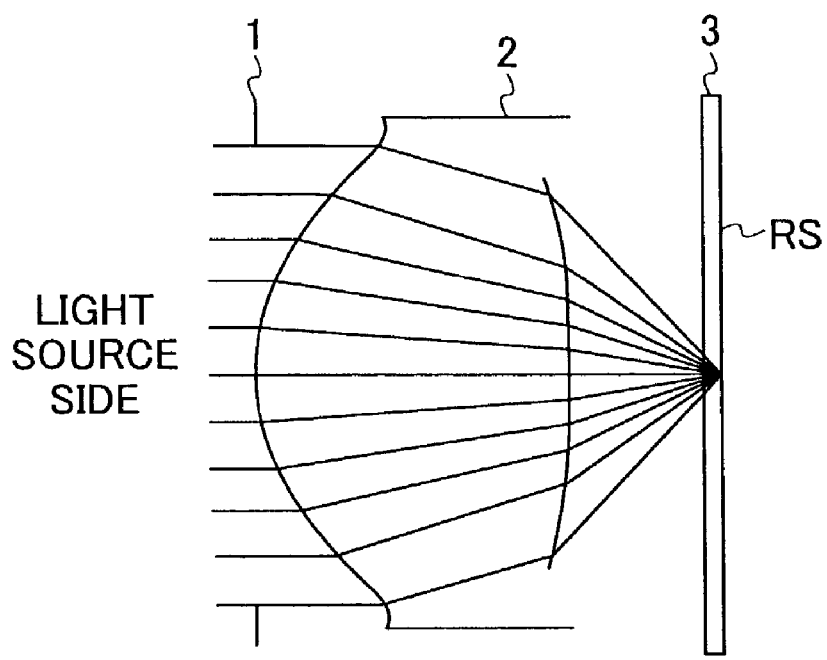
FIGS. 5A, 5B and 5C show a shape, astigmatism and spherical aberration of an embodiment 4 of the present invention.
Figure 5B:
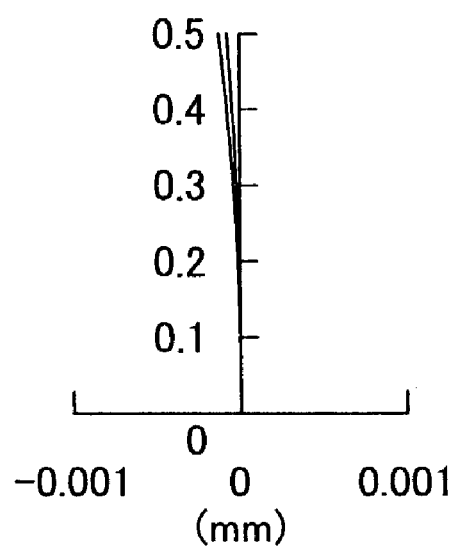
Figure 5C:
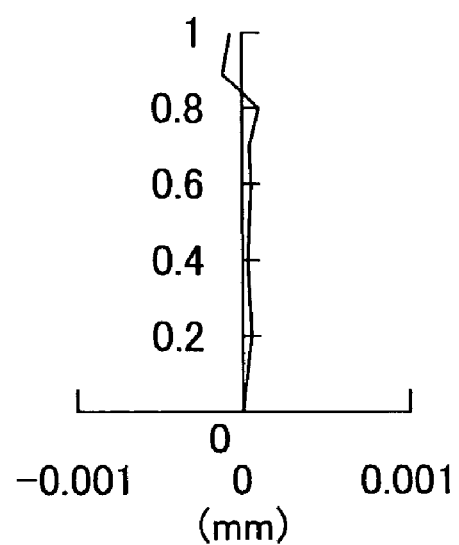

FIG. 5A shows an arrangement of the aperture 1, the object lens 2, and the incident side substrate 3 in the embodiment 4. FIGS. 5B and 5C show the astigmatism and the spherical aberration of the object lens in the embodiment 4, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 4, R1=1.50153 mm, f=2.00 mm, nd=1.69330, the Abbe number: vd=53.17 and the working distance (WD)=0.849168 mm. Accordingly, R1, f, and nd satisfy the conditions of the above-mentioned formulas (5) and (6), and both the refractive index and the Abbe number satisfy the conditions shown in the above mentioned formulas (7) and (8).

Embodiment 5

An object lens for an optical pickup according to the embodiment 5 is an example also used with the operating wavelength: 650 nm, and has the following specification: NA: 0.85, f: 1.76 mm, nd=1.74330, and vd=49.36. The other specification is shown in FIG. 18 in the same manner as that in FIG. 14.

Figure 6A:
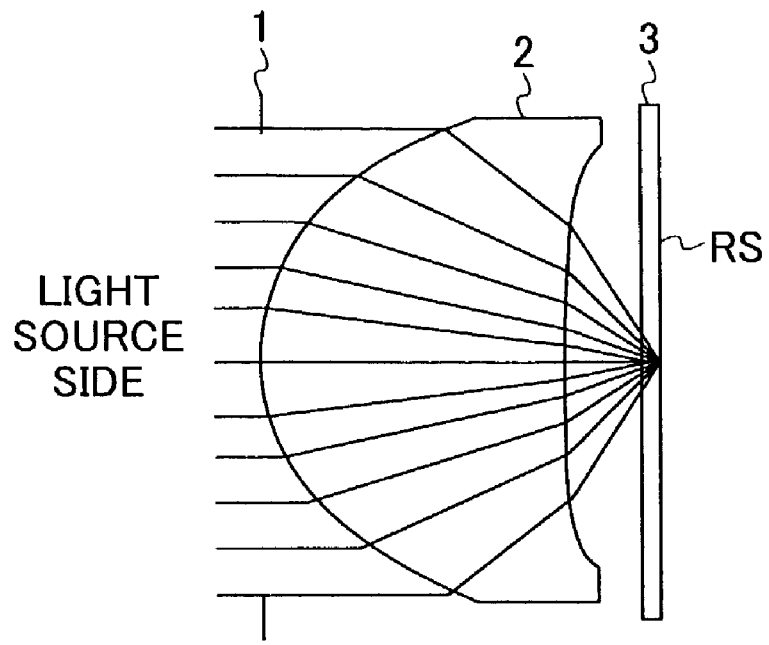
FIGS. 6A, 6B and 6C show a shape, astigmatism and spherical aberration of an embodiment 5 of the present invention.
Figure 6B:
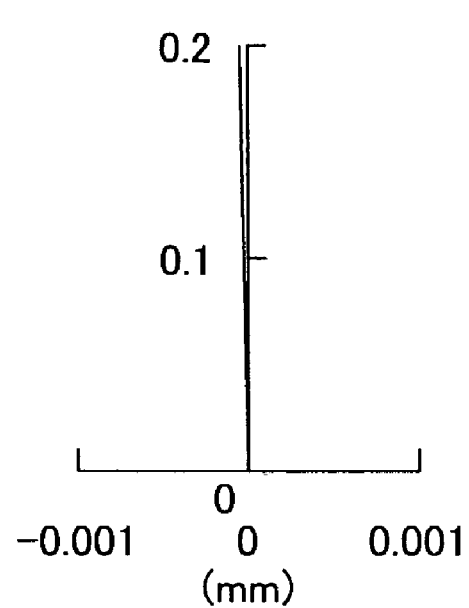
Figure 6C:
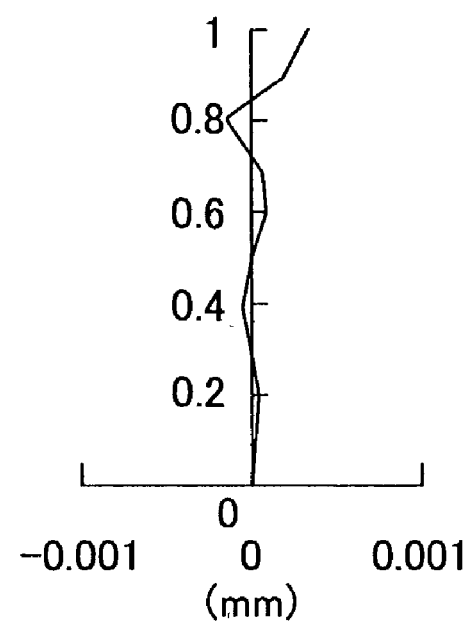

FIG. 6A shows an arrangement of the aperture 1, the object lens 2, and the incident side substrate 3 in the embodiment 5. FIGS. 6B and 6C show the astigmatism and the spherical aberration of the object lens in the embodiment 5, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 5, R1=1.2997 mm, f=1.76 mm, nd=1.743, Abbe's number: vd=49.36, and the working distance (WD)=0.465294 mm. Accordingly, R1, f, and nd satisfy the conditions expressed by the following formulas (9) and (10). Further, both the refractive index and the Abbe's number satisfy the conditions expressed by the following formulas (11) and (12):

$$R1/f \leq 1.0\ nd - 0.7 \quad (9)$$

$$WD/f \leq 0.33\ nd - 0.18 \quad (10)$$

$$30 \leq vd < 50 \quad (11)$$

$$1.65 \leq nd \leq 1.80 \quad (12)$$

Embodiment 6

An object lens for an optical pickup according to the embodiment 6 is used with the operating wavelength: 650 nm, and has the following specification: NA: 0.85, f: 1.76 mm, nd=1.69330, and vd=53.17. The other specification is shown in FIG. 19.

Figure 7A:
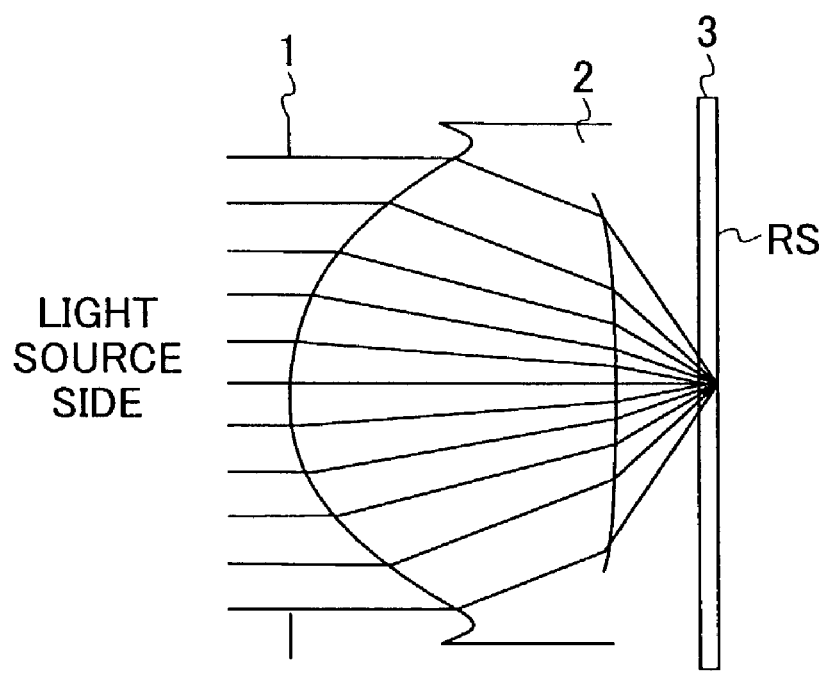
FIGS. 7A, 7B. and 7C show a shape, astigmatism and spherical aberration of an embodiment 6 of the present invention.
Figure 7B:
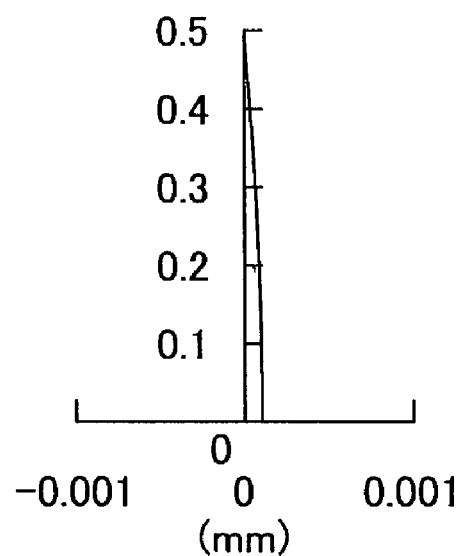
Figure 7C:
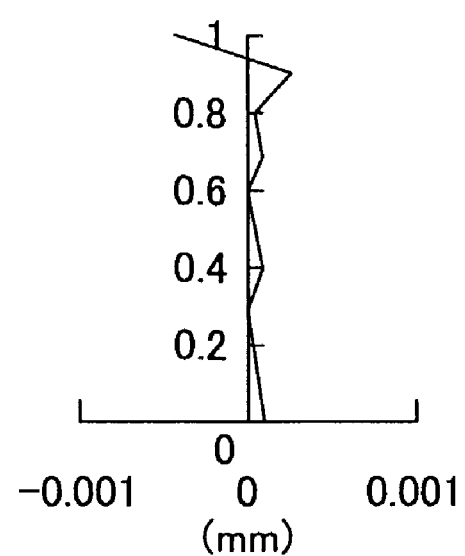

FIG. 7A shows an arrangement of the aperture 1, the object lens 2, and the incident side substrate 3 in the embodiment 6. FIGS. 7B and 7C show the astigmatism and the spherical aberration of the object lens in the embodiment 6, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 6, R1=1.2977 mm, f=1.76 mm, nd=1.69330, the Abbe's number: vd=53.17 and the working distance (WD)=0.591052 mm. Accordingly, R1, f and nd satisfy the conditions of the above-mentioned formulas (9) and (10), and also, both the refractive index and Abbe's number satisfy the conditions of the above-mentioned formulas (11) and (12).

Embodiment 7

An object lens for an optical pickup according to he embodiment 7 is used with the operating wavelength: 407 nm, and has the following specification: NA: 0.65, f: 2.31 mm, nd=1.74330, and vd=49.36. The other specification is shown in FIG. 20.

Figure 8A:
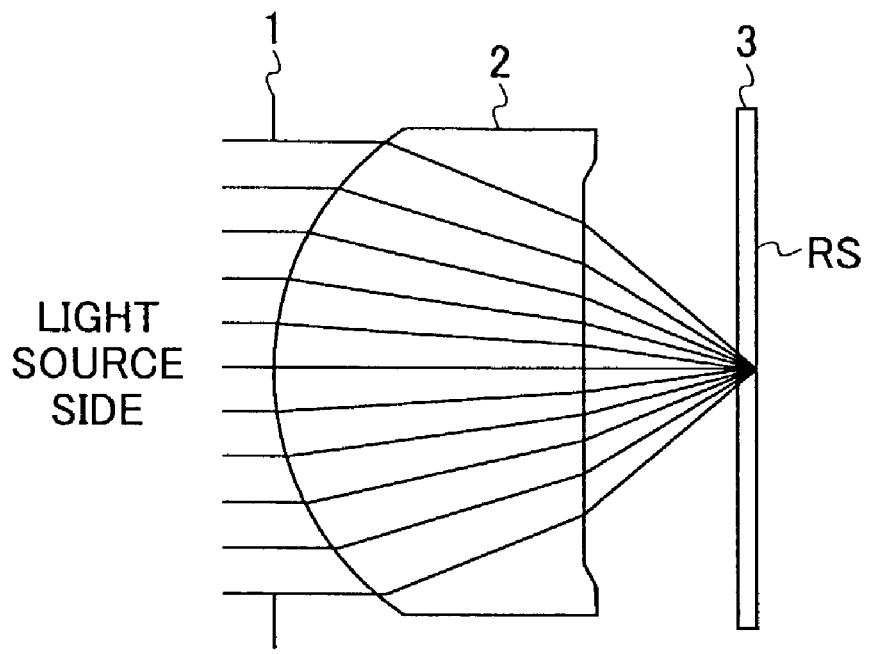
FIGS. 8A, 8B and 8C show a shape, astigmatism and spherical aberration of an embodiment 7 of the present invention.
Figure 8B:
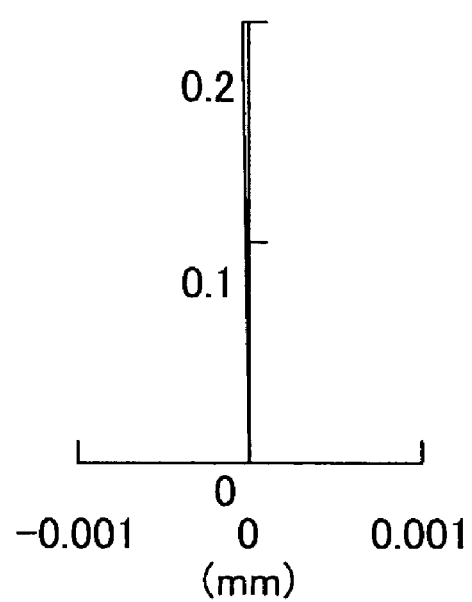
Figure 8C:
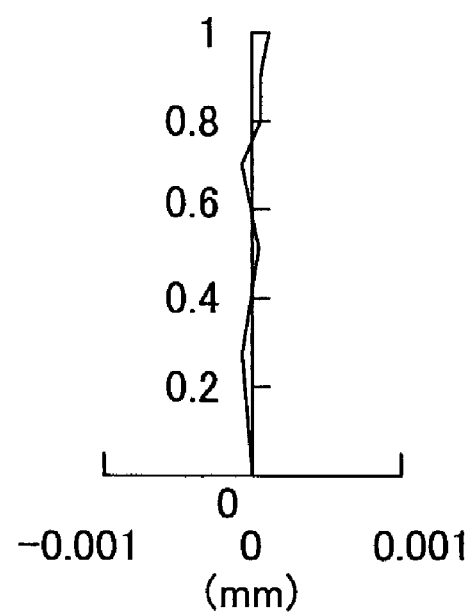

FIG. 8A shows an arrangement of the aperture 1, the object lens 2, and the incident side substrate 3 in the embodiment 7. FIGS. 8B and 8C show the astigmatism and the spherical aberration of the object lens in the embodiment 7, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 7, R1=1.71822 mm, f=2.31 mm, nd=1.74330, Abbe's number: vd=49.36, and the working distance (WD)=0.831223, as shown. Accordingly, R1, f and nd satisfy the following formulas (13) and (14), while both the refractive index and the Abbe's number satisfy the following formulas (15) and (16):

$$1.2\ nd - 1.1 \leq R1/f \leq 1.3\ nd - 1.2 \quad (13)$$

$$0.37\ nd - 0.14 < WD/f \leq 0.39\ nd - 0.04 \quad (14)$$

$$vd \leq 60 \quad (15)$$

$$1.5 \leq nd \quad (16)$$

Embodiment 8

An object lens for an optical pickup in the embodiment 8 is used with the operating wavelength: 407 nm, and has the following specification: NA: 0.65, f: 2.31 mm, nd=1.58313, and vd=59.46. The other specification is shown in FIG. 21.

Figure 9A:
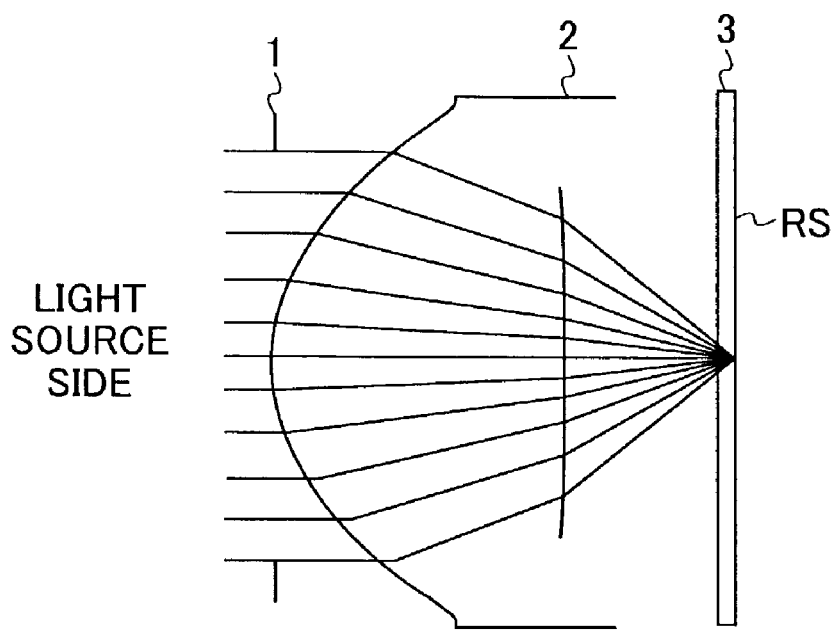
FIGS. 9A, 9B and 9C show a shape, astigmatism and spherical aberration of an embodiment 8 of the present invention.
Figure 9B:
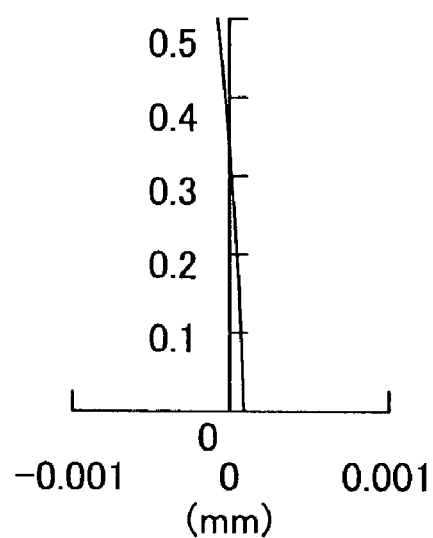
Figure 9C:
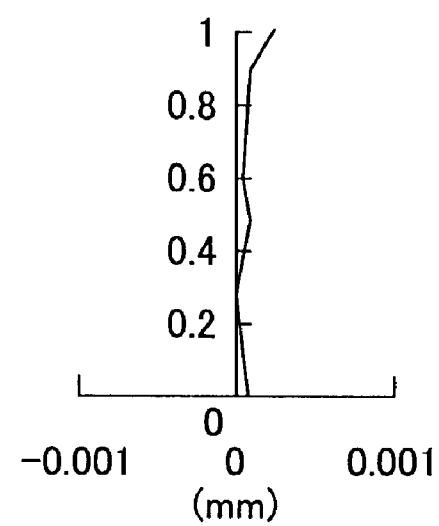

FIG. 9A shows an arrangement of the aperture 1, the object lens 2, and the incident side substrate 3 in the embodiment 8. FIGS. 9B and 9C show the astigmatism and the spherical aberration of the object lens in the embodiment 8, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 8, R1=1.52938 mm, f=2.31 mm, nd=1.58313, Abbe's number: vd=59.46, and the working distance (WD)=1.115081 mm, as shown. Accordingly, R1, f and nd satisfy the above-mentioned conditional formulas (13) and (14), and both the refractive index and the Abbe's number satisfy the above-mentioned conditional formulas (15) and (16).

Embodiment 9

An object lens for optical pickup according to the embodiment 9 is used with operating wavelength: 407 nm, and has the following specification: NA: 0.74, f: 2.00 mm, nd=1.74330, and vd=49.36. The other specification is shown in FIG. 22.

Figure 10A:
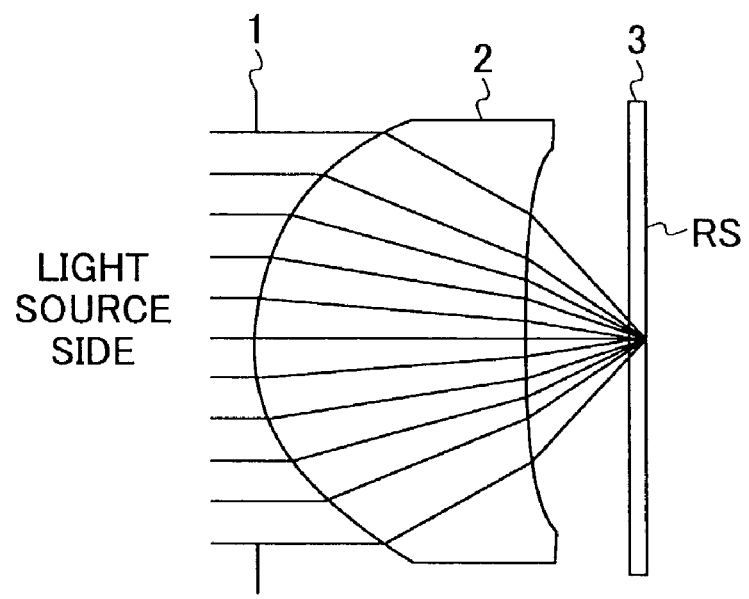
FIGS. 10A, 10B and 10C show a shape, astigmatism and spherical aberration of an embodiment 9 of the present invention.
Figure 10B:
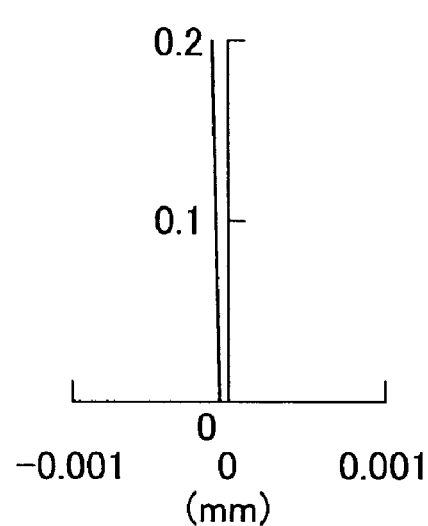
Figure 10C:
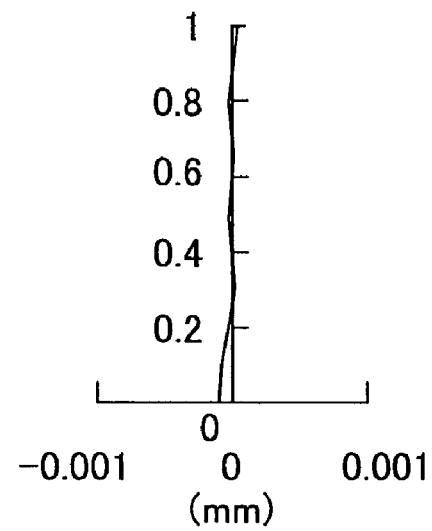

FIG. 10A shows an arrangement of the aperture 1, the object lens 2, and the incident side substrate 3 in the embodiment 9. FIGS. 10B and 10C show the astigmatism and the spherical aberration of the object lens in the embodiment 9, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 9, R1=1.48011 mm, f=2.00 mm, nd=1.74330, the Abbe number: vd=49.36 and the working distance (WD)=0.583068 mm. Accordingly, R1, f and nd satisfy the following conditional formulas (17) and (18), while both the refractive index and the Abbe number satisfy the following continual formulas (19) and (20):

$$1.0\ nd-0.7 < R1/f \leq 1.2\ nd-1.1 \tag{17}$$

$$0.33\ nd-0.18 < WD/f \leq 0.37\ nd-0.14 \tag{18}$$

$$vd \leq 60 \tag{19}$$

$$1.6 \leq nd \leq 1.8 \tag{20}$$

Embodiment 10

An object lens for optical pickup according to the embodiment 10 is used in the operating wavelength: 407 nm, and has the following specification: NA: 0.75, f: 2.00 mm, nd=1.69330, and vd=53.17. The other specification is shown in FIG. 23.

Figure 11A:
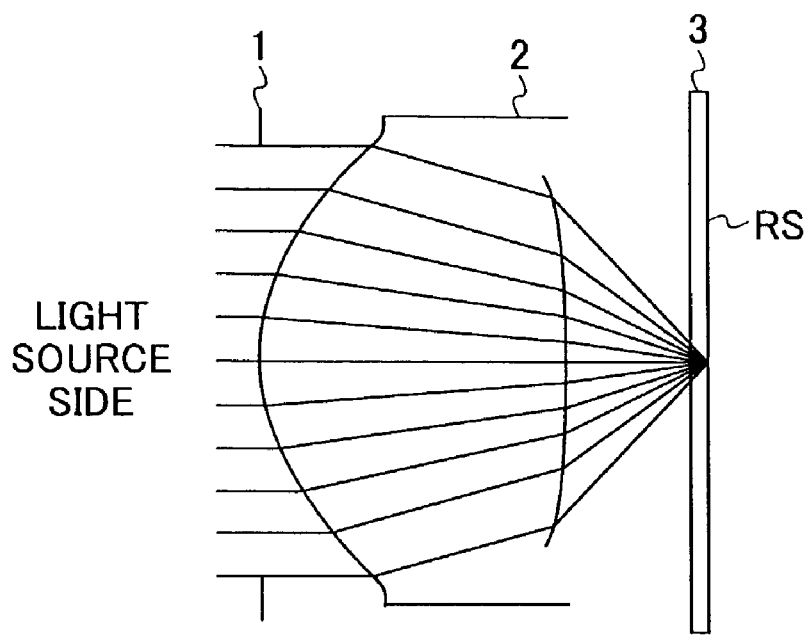
FIGS. 11A, 11B and 11C show a shape, astigmatism and spherical aberration of an embodiment 10 of the present invention.
Figure 11B:
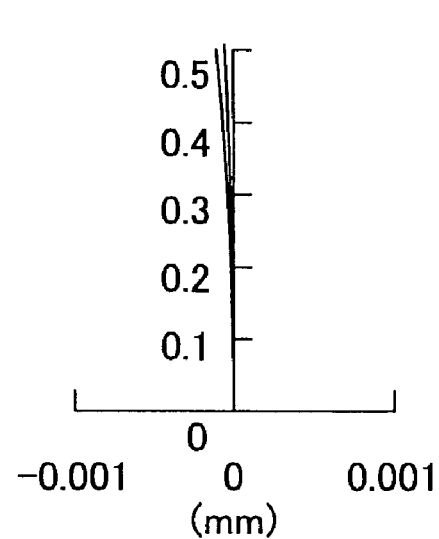
Figure 11C:
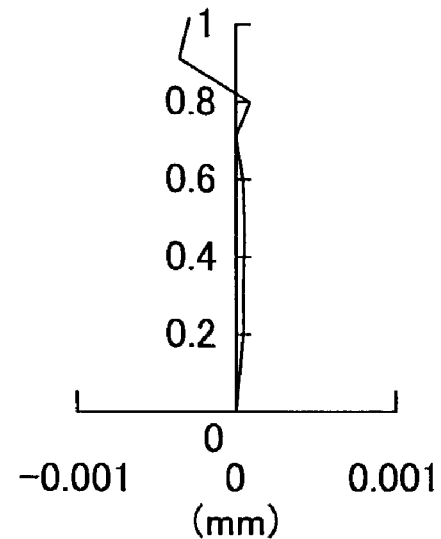

FIG. 11A shows an arrangement of the aperture 1, the object lens 2, and the incident side substrate 3 in the embodiment 10. FIGS. 11B and 11C show the astigmatism and the spherical aberration of the object lens in the embodiment 10, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 10, R1=1.56813 mm, f=2.00 mm, nd=1.69330, the Abbe's number: vd=53.17 and the working distance (WD)=0.874666 mm. Accordingly, R1, f, and nd satisfy the above-mentioned conditional formulas (17) and (18), while both the refractive index and the Abbe's number satisfy the above-mentioned conditional formulas (19) and (20).

Embodiment 11

An object lens for an optical pickup according to the embodiment 11 is used in the operating wavelength: 407 nm, and has the following specification: NA: 0.85, f: 1.76 mm, nd=1.74330, and vd=49.36. The other specification is shown in FIG. 24.

Figure 12A:
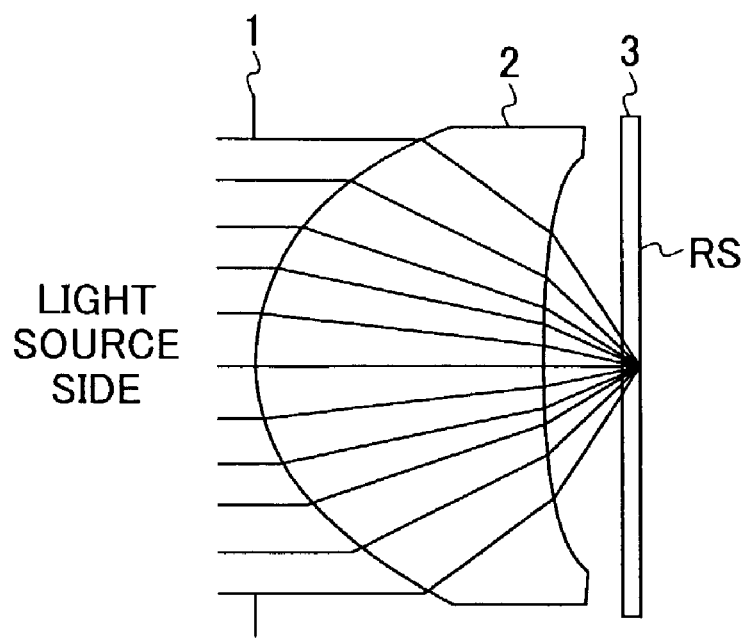
FIGS. 12A, 12B and 12C show a shape, astigmatism and spherical aberration of an embodiment 11 of the present invention.
Figure 12B:
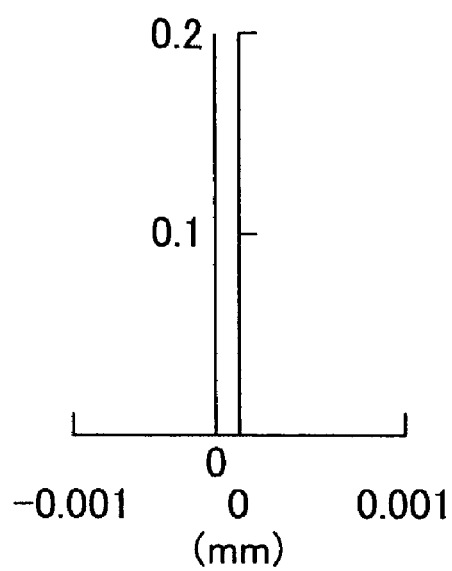
Figure 12C:
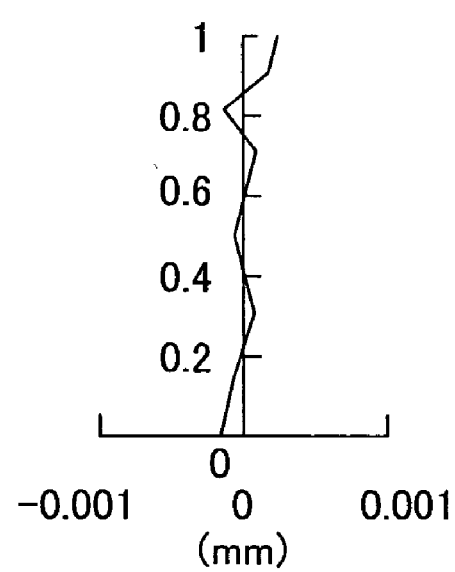

FIG. 12A shows an arrangement of the aperture 1, the object lens 2, and the incident side substrate 3 in the embodiment 11. FIGS. 12B and 12C show the astigmatism and the spherical aberration of the object lens in the embodiment 11, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 11, R1=1.33386 mm, f=1.76 mm, nd=1.74330, the Abbe's number: vd=49.36, and the working distance (WD)=0.468034 mm. Accordingly, R1, f, and nd satisfy the following conditional formulas (21) and (22). Further, as the Abbe's number satisfies the following conditional formula (23), while the refractive index nd does not satisfy the following conditional formula (24), and higher than the conditional range:

$$R1/f \leq 1.0\ nd-0.7 \tag{21}$$

$$WD/f \leq 0.33\ nd-0.18 \tag{22}$$

$$45 \leq vd \leq 55 \tag{23}$$

$$1.65 \leq nd \leq 1.72 \tag{24}$$

Thus, as the meniscus lens is used, although the performance is satisfactory as the wavefront aberration: 0.01λ according to the embodiment 11, it is possible to use the lens material having the refractive index higher than the above-mentioned conditional range of the formula (24).

Embodiment 12

An object lens for an optical pickup according to the embodiment 12 is used in the operating wavelength: 407 nm, and has the following specification: NA: 0.85, f: 1.76 mm, nd=1.69330, and vd=53.17. The other specification is shown in FIG. 25.

Figure 13A:
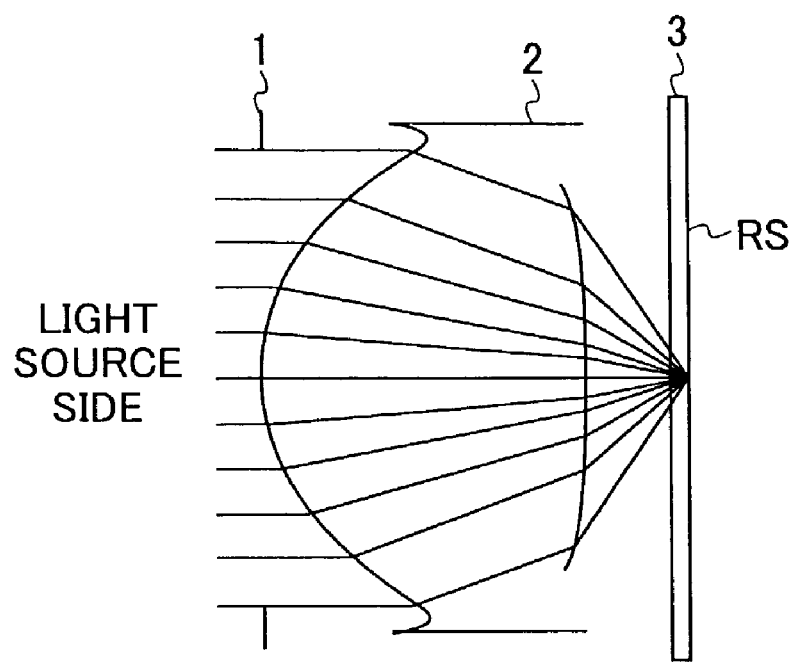
FIGS. 13A, 13B and 13C show a shape, astigmatism and spherical aberration of an embodiment 12 of the present invention.
Figure 13B:
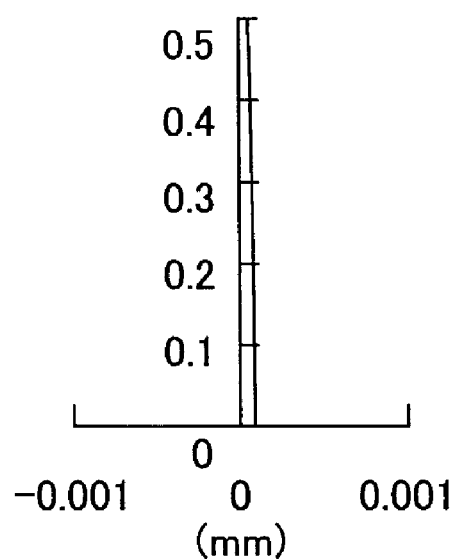
Figure 13C:
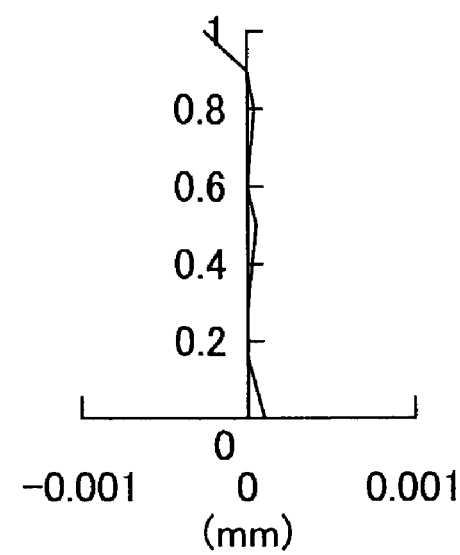

FIG. 13A shows an arrangement of the aperture 1, the object lens 2, and the incident side substrate 3 in the embodiment 12. FIGS. 13B and 13C show the astigmatism and the spherical aberration of the object lens in the embodiment 12, respectively, where the scale on the vertical axis indicates the value normalized in a manner such that the entrance pupil radius is made to be 1. As can be seen therefrom, both the aberrations are corrected very satisfactorily. In fact, "wavefront aberration" is less than 0.01λ.

According to the embodiment 12, R1=1.35305 mm, f=1.76 mm, nd=1.69330, the Abbe number: vd=53.17 and the working distance (WD)=0.615244 mm. Accordingly, R1, f, and nd satisfy the above-mentioned conditional formulas (21) and (22), while both the refractive index and the Abbe's number satisfy the above-mentioned conditional formulas (23) and (24).

Figure 26:
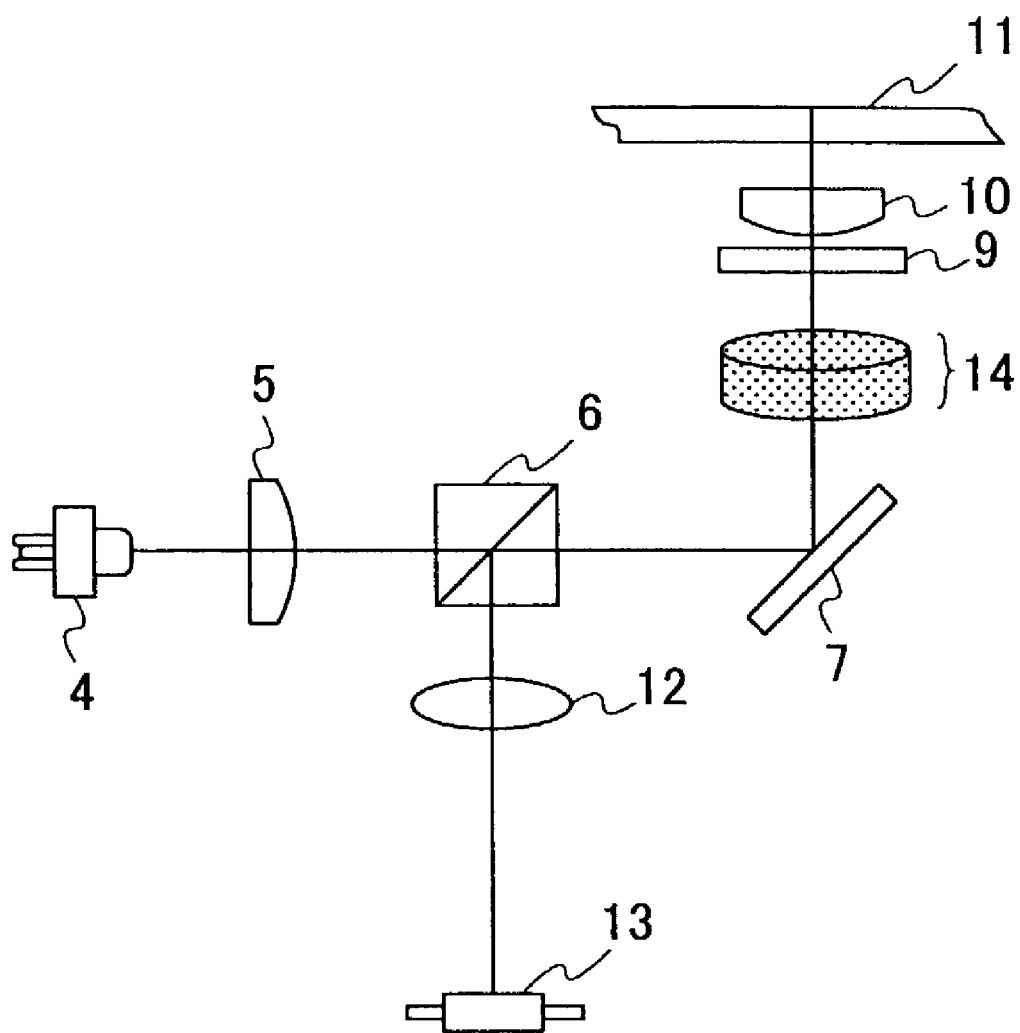
FIG. 26 illustrates an optical pickup according to one embodiment of the present invention.

Embodiments of an optical pickup according to the present invention will now be described. FIG. 26 shows one embodiment of the optical pickup which includes a chromatic aberration correcting device for correcting chromatic aberration occurring due to wavelength variation. As shown in the figure, this optical pickup includes a semiconductor laser 4, a collimator lens 5, a polarization beam splitter 6, a deflection mirror 7, a ¼-wave plate (quarter wave plate) 9, an object lens 10, a detection lens 12, a light-receiving device 13, and the chromatic aberration correcting device 14.

A laser beam emitted from the semiconductor laser 4 is changed into a substantial parallel beam by the collimator lens 5, it passes through the polarization beam splitter 6, is bent in its course by 90 degrees by means of the deflection mirror 7, and is transformed into a condensing beam through the chromatic aberration correcting device 14 and the object lens 10. After that, the beam forms a light spot on a recording surface after being incident on an optical recording medium 11 having the thickness of 0.1 mm and passing through an incident side substrate thereof.

The ¼-wave plate 9 is arranged in front of the object lens 10, and thereby, the linear polarized light coming from the light source is transformed into a circular polarized light. The beam reflected by the optical recording medium 11 is regarded as a return beam, passes through the same course reversely, and then is incident on the polarization beam splitter 6 through the object lens 10, the ¼-wave plate 9, and the deflection mirror 7.

The return beam thus incident on the ¼-wave plate 9 is the circular polarized light different from the state at the time of going process, and, is transformed into a linear polarized light by means of the ¼ wave plate 9 which is perpendicular to the polarized direction in the going process. After that, the beam is reflected by the polarization beam splitter 6. The return beam reflected by the polarization beam splitter 6 is incident on the light-receiving device 13 through the detection lens 12.

The light-receiving device 13 has a light-receiving surface appropriately divided according to a predetermined servo signal creation method. Based on the photoelectric output from each light-receiving division surface, a tracking signal and a focusing signal are generated, and, at a reproducing process, a reproduction signal is generated together with these signals. These signals are output towards a control circuit which is not shown.

The semiconductor laser 4 has the emission wavelength: 650±20 nm, or the emission wavelength: 407±10 nm. As the object lens 10, the object lens according to any one of the above-described embodiments of the present invention may be used, depending on the emission wavelength and the vignetting factor.

When the emission wavelength of the semiconductor laser 4 deviates from the standard wavelength or a wavelength shift occurs due to a mode hopping mentioned above, chromatic aberration occurs as mentioned above. The chromatic aberration correcting device 14 corrects such a chromatic aberration.

The chromatic aberration correcting device 14 in the optical pickup shown in FIG. 26 is made of a doublet lens. Specifically, a common prosaic doublet lens (achromatt lens) known as an achromatic lens, which is made up of a combination of a convex lens of a crown glass having a small dispersion and a concave lens of a flint glass having a large dispersion stick together, and controls chromatic aberration, may be used.

On the other hand, the doublet lens 14 as the chromatic aberration correcting device is used mainly for correcting chromatic aberration occurring in the object lens 10, and, for this purpose, it provides a chromatic aberration having a polarity reverse to that in the object lens 10. For this purpose, a large difference is created in Abbe's number in the optical material between the convex lens and concave lens of the doublet lens 14. Since the chromatic aberration produced by means of the doublet lens 14 can thus be appropriately enlarged, the chromatic aberration mainly generated in the object lens 10 can be satisfactorily corrected.

Figure 27A:
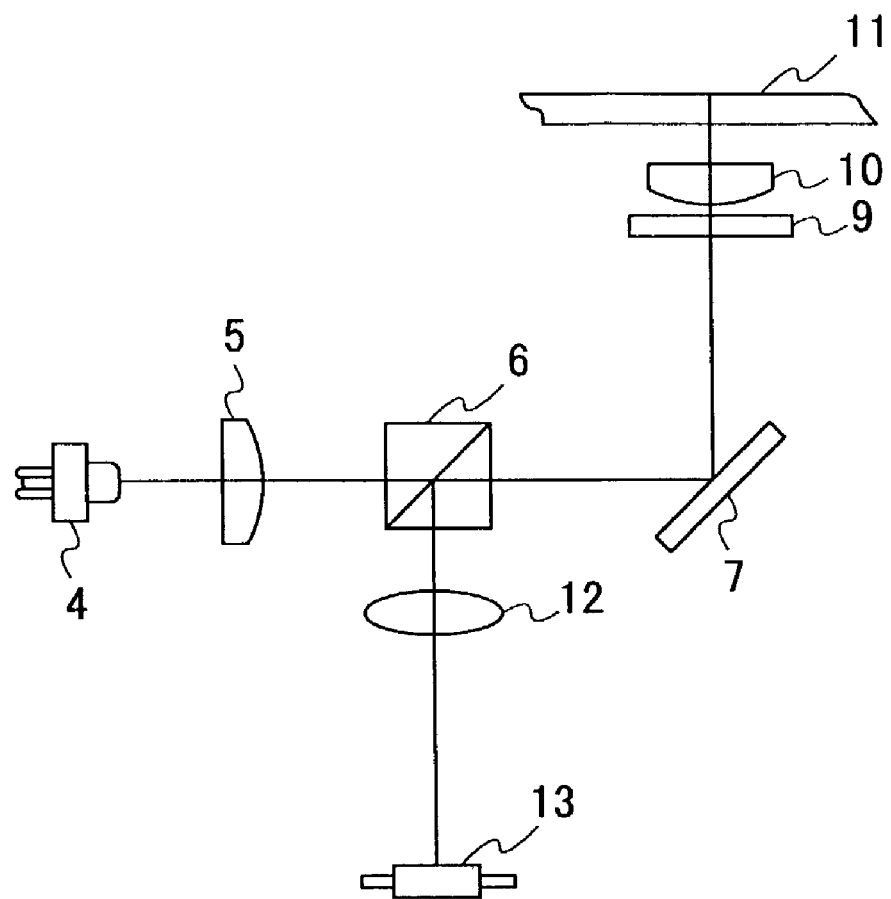
FIGS. 27A, 27B and 27C illustrate an optical pickup according to another embodiment of the present invention.

FIG. 27A shows another embodiment of the optical pickup according to the present invention which employs another type of a chromatic aberration correcting device. The same reference numerals are given to parts/components same as those shown in FIG. 26, and the duplicated description thereof is omitted. In this optical pickup, the chromatic aberration correcting device is integrated with the object lens 10.

Figure 27B:
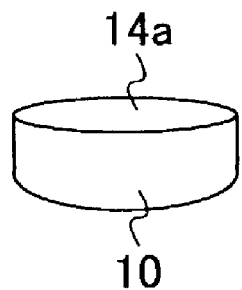

The chromatic aberration correcting device 14a is provided by a glass material, a resin, etc. which has a chromatic aberration of a polarity reverse to that in the object lens 10 and stuck to a surface of the object lens 10 in the example shown in FIG. 27B. As a resin used therein, a photo polymer used as an ultraviolet setting agent or the like may be applied.

A light spot formed on the optical recording medium 11 can be prevented from being influenced by the chromatic aberration, by positively providing an appropriately large difference in Abbe's number (10 or more) between the above-mentioned optical material (glass material or resin) stuck onto the object lens and the lens material of the object lens 10 on which the optical material is stuck.

Figure 27C:
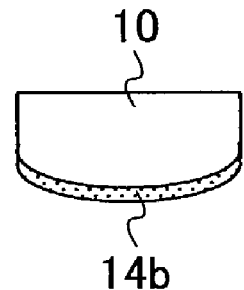

In the example shown in FIG. 27C, the chromatic aberration correcting device 14b is provided as a diffraction surface formed on the object lens 10. The power of the diffraction surface 14b formed in a resin film united with a lens surface (in this example, on the light source side) of the object lens 10 is proportional to the wavelength, and, in the thus-created positive diffraction lens, as the wavelength becomes longer, the back focus of the object lens becomes shorter. On the other hand, since the refractive index of the material falls as the wavelength becomes longer in the refraction lens (object lens 10), it has an axial chromatic aberration characteristic in which the back focus is elongated on a longer wavelength zone. The chromatic aberration correction is attained as a result of the diffraction lens and the refractive lens (object lens) having defocus characteristics reverse to one another.

Figure 28A:
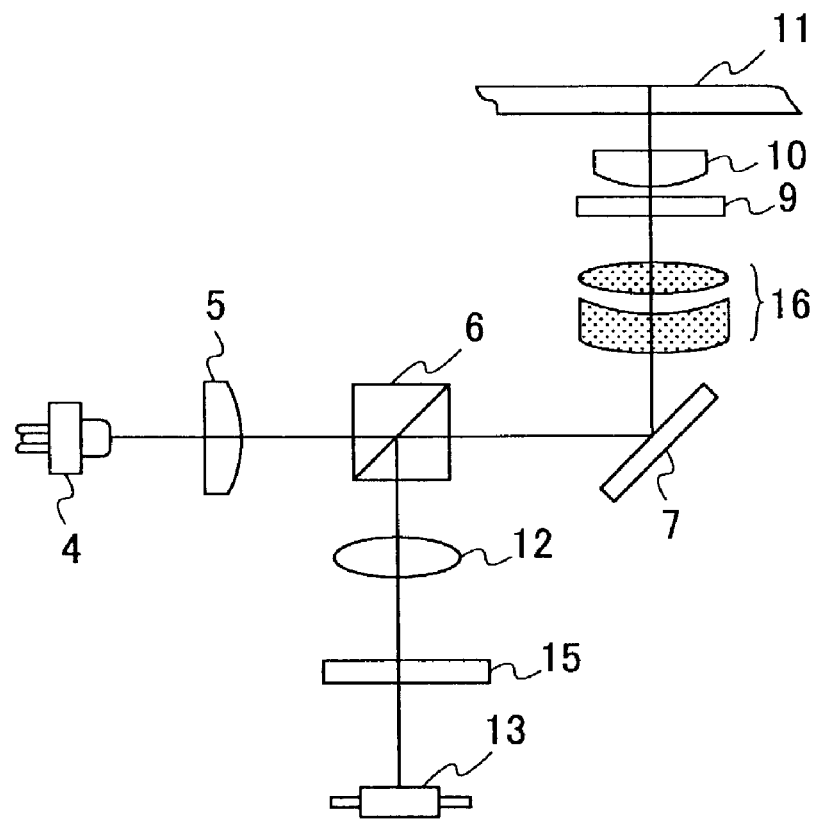
FIGS. 28A and 28B illustrate an optical pickup according to another embodiment of the present invention.

FIG. 28A shows another embodiment of the optical pickup according to the present invention including a substrate thickness error detecting device and a spherical aberration correcting device. In the figure, the same reference numerals are given to parts/components same as those shown in FIG. 26, and the duplicated description thereof is omitted.

As the semiconductor laser 4, one having the emission wavelength: 650±20 nm, or the emission wavelength: 407±10 nm is used. As the object lens 10, the object lens according to any one of the above-described embodiments of the present invention may be used, depending on the emission wavelength and vignetting factor.

As shown in FIG. 28A, this pickup includes a spherical aberration detection device 15 as a substrate thickness error detection device, and the spherical aberration correcting device 16. As mentioned above, in the optical recording medium, the standard thickness of the incident side substrate is 0.1 mm. However, there may occur 'substrate thickness error' therein in an actually manufactured optical recording medium on the order of ±10 nm.

Due to existence of such a substrate thickness error, spherical aberration occurs in a combined system of the object lens 10 and the incident side substrate, and, thereby, the shape of the light spot formed on the recording surface deteriorates. The thus-generated spherical aberration causes distortion in the wavefront in the return beam, and, thereby, causes spherical aberration in the beam directed toward the light-receiving device 13 through the detection lens 12.

Figure 28B:
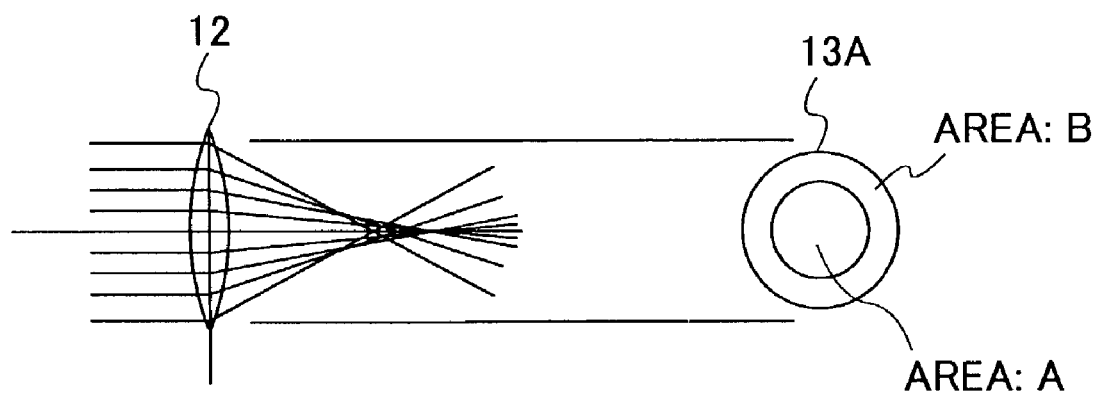

FIG. 28B illustrates this state. When spherical aberration is thus included in the return beam being incident onto the detection lens 12 from the left hand in the figure, a delay in the wavefront occurs with respect to the reference wavefront symmetrically with respect to the optical axis in the return beam. Thereby, a defocus occurs in the position at which the thus-delayed wavefront is focused with respect to the focus point at which the reference wavefront is focused.

Then, a situation of wavefront aberration can be known by taking out the difference between the delayed wavefront and the advanced wavefront, and detecting the focal state. Specifically, for example, as the spherical aberration detection device 15 shown in FIG. 28A, a course separation device such as a hologram device, a beam splitter, or a device for shifting the timing such as a liquid crystal shutter may be utilized. Further, as shown in FIG. 28B, a light-receiving device 13A divided in into a light-receiving area A and a light-receiving area B is used. Then, by appropriately processing the light-receiving outputs of these light-receiving areas A and B, the spherical aberration in the return beam can be detected.

The spherical aberration thus detected by means of the spherical aberration detecting device originates from the substrate thickness error in the incident side substrate. Accordingly, by thus detecting the spherical aberration in the return beam, the substrate thickness error can be known.

Then, based on the thus-obtained substrate thickness error data, it is possible to correct the spherical aberration occurring due to the combination of the object lens 10 and the incident side substrate of the optical recording medium, and, thereby, to form a proper light spot on the recording surface of the optical recording medium.

In the embodiment described with reference to FIGS. 28A and 28B, the spherical aberration detected by means of the spherical aberration detecting device 15 for the substrate thickness error of the incident side substrate of the optical recording medium is obtained in a form of a spherical aberration signal from a combination of the photoelectric signals from the areas A and B of the light-receiving device 13A.

The spherical aberration correcting device 16 in the embodiment shows in FIG. 28A is provided by two lenses and an interval adjustment device (not shown) to adjust the interval between these lenses. The two lenses are a positive lens and a negative lens. In the figure, the negative lens is disposed on the light source side. However, it is also possible that rather the positive lens is disposed on the light source side.

By controlling the separation between the positive lens and negative lens of the spherical aberration correcting device 16, it is possible to cause a spherical aberration in a beam which passes through the spherical aberration correcting device 16 toward the object lens 10. Accordingly, it is possible to use the thus-created spherical aberration to cancel out the spherical aberration occurring in the combined system of the object lens 10 and the incident side substrate of the optical recording medium.

Specifically, for this purpose, such a separation between the two lenses of the spherical aberration correcting device 16 that the above-mentioned spherical aberration signal becomes 0 is obtained beforehand, and is set as a reference value. Then, when a spherical aberration occurs actually, the above-mentioned reference separation set beforehand is adjusted appropriately so that the spherical aberration signal becomes 0.

Either one or each of both of the positive lens and negative lens of the spherical aberration correcting device may be made up of a plurality of lenses.

FIGS. 29A through 29E illustrate another embodiment of an optical pickup according to the present invention which has a substrate thickness error detection device and a spherical aberration correcting device. Also in these figures, the same reference numerals are given to parts/components same as those shown in FIG. 26, and the duplicated description thereof is omitted.

The spherical aberration correcting device 16A used in this embodiment includes a liquid crystal device and a voltage control device (not shown) to drive this. As shown in FIG. 29B, in the liquid crystal device, at least one transparent electrode is divided into concentric circular portions, and, has a configuration such that a voltage can be applied individually to an electrode portion of each concentric circular portion. Then, it is possible to change the refractive-index n of the liquid crystal on each electrode portion free in a range from n1 through n2, by controlling the above-mentioned voltage applied.

By thus changing the refractive index n, it is possible to provide an optical path difference $\Delta n \cdot d$ to a beam passing through each zone, where $\Delta n$ stands for the refractive index change amount, and d stands for the cell thickness of liquid crystal. That is, it is possible to provide a phase difference $\Delta n \cdot d \ (2\pi/\lambda)$ where $\lambda$ stands for the operating wavelength.

Figure 29A:
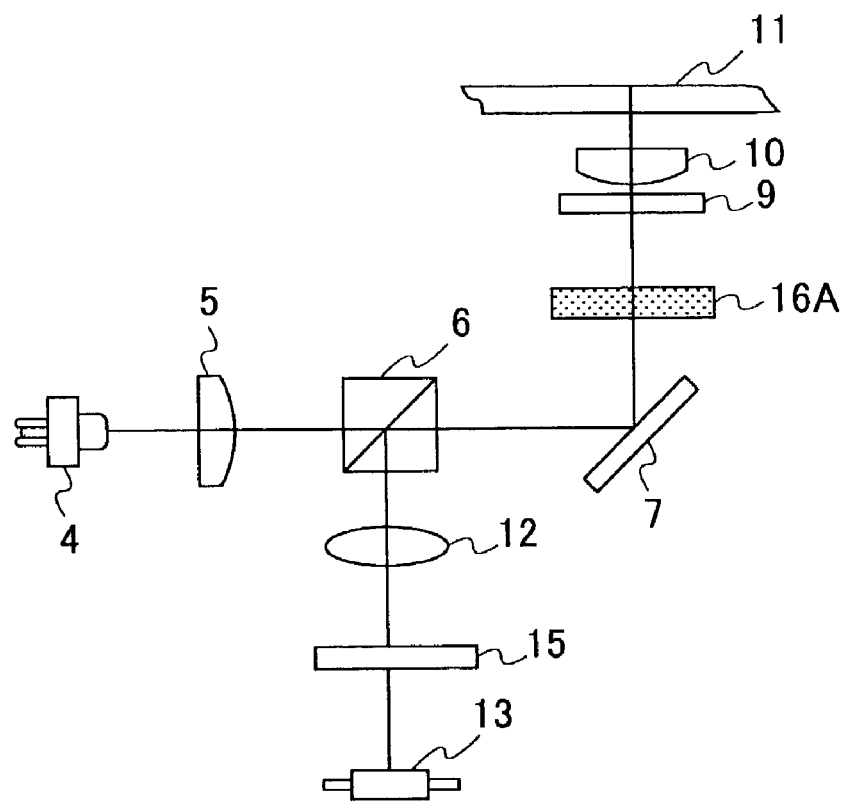
FIGS. 29A through 29E illustrate an optical pickup according to another embodiment of the present invention.
Figure 29B:
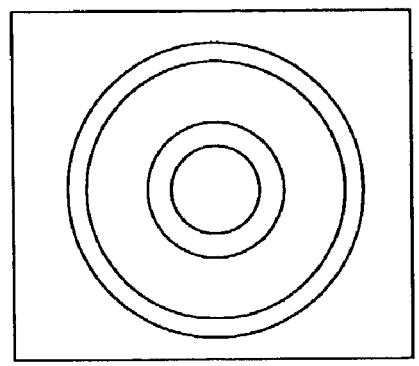
Figure 29C:
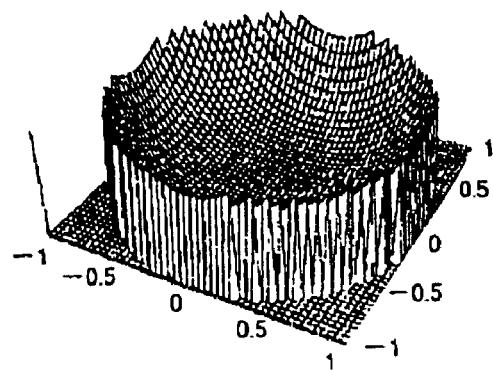
Figure 29D:
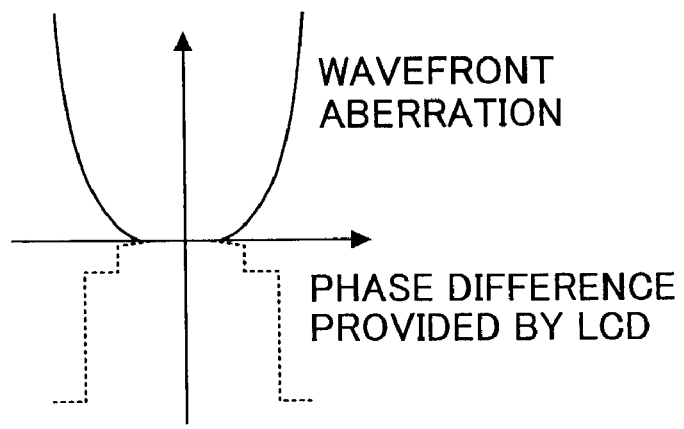

It is assumed that the wavefront aberration causes the spherical aberration generated in the object lens 10 and the incident side substrate in the optical recording medium detected by the spherical aberration detection device 15 is such as that shown in FIG. 29C. FIG. 29D shows this wavefront aberration in a form of a 2-dimensional curve.

Figure 29E:
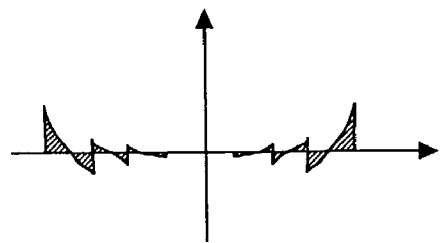

Then, by adjusting the voltages applied to the respective concentric circular zone electrodes of the liquid crystal device so that the phase differences shown in the lower half of FIG. 29D are given to the beam incident on the object lens 10 from the side of the light source, it is possible to cancel out the above-mentioned wavefront aberration, thanks to the delays created in the respective concentric parts of the beam passing through the liquid crystal device. FIG. 29E shows the sum total of the solid curve (wavefront aberration) and the dashed curve (delay in the wavefront by the liquid crystal device) in FIG. 29D, i.e., the wavefront aberration after the correction. As can be seen therefrom, the wavefront aberration (the upper half of FIG. 29D) is well corrected.

Thus, a satisfactory light spot can be formed on the recording surface of the optical recording medium through correction of the above-described spherical aberration occurring due to the substrate thickness error in the incident side substrate of the optical recording medium, by means of the spherical aberration correcting device according to each of the embodiments described above with reference to FIGS. 28A through 29E.

In addition, the spherical aberration correcting device 16 or 16A described above may preferably perform such a correction operation that:

$$\Delta W > |200NA^2 + 370NA - 170|$$

is satisfied where $\Delta W$ stands for the change amount of the wavefront aberration, and NA stands for the numerical aperture of the object lens. Thereby, the quality of the light spot formed can be improved, and thus, quality information recording and information reproduction can be performed thereby.

The recording surface of the optical recording medium is not restricted to of one layer. These days, a multilayer optical recording medium as mentioned above is being put into practical use in which many recording surfaces are provided in one optical recording medium by means of configuring a multilayer structure therein, and, for each one of the many recording surfaces, recording, reproducing or deletion of information can be made individually. The object lens according to each embodiment of the present invention described above may also be applied to an optical pickup in an infinite system applied for such a multilayer optical recording medium.

In this connection, in the multilayer optical recording medium, it is necessary to separate several 10 micrometers or more between each adjacent recording surface in order to perform properly writing and read-out of information individually to/from a plurality of recording surfaces of the multilayer optical recording medium. Then, as the distance to the recording surface on which recording or the like is performed from the front surface of the optical recording medium thus differs for recording or the like performed on a different recording surface, unique spherical aberration occurs for every recording surface.

According to an optical pickup in an embodiment according to the present invention, in order to perform recording, reproduction, and deletion of information onto a desired recording surface of the multilayer optical recording medium, a spherical aberration detection device is provided and detects a spherical aberration amount generated when a focus jump is carried out into a desired recording surface, and a spherical aberration correcting device is provided and corrects the thus detected spherical aberration.

Figure 31:
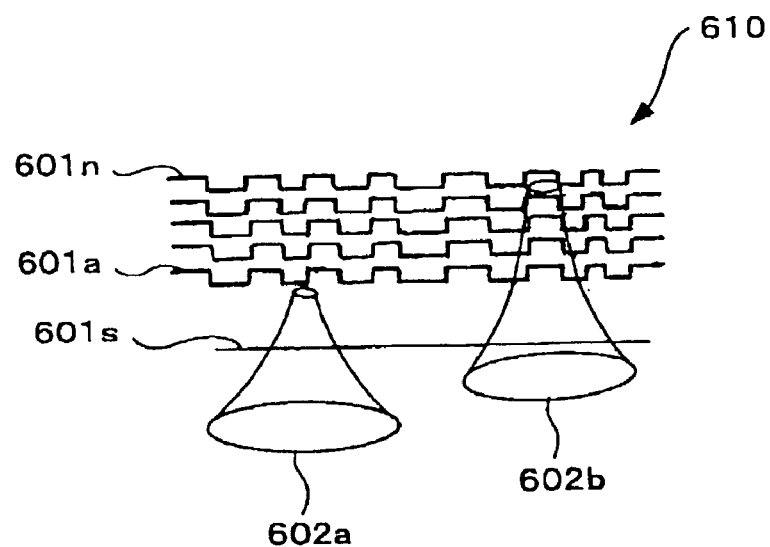
FIG. 31 illustrates an optical recording medium having a plurality of recording surfaces stacked on each other.

FIG. 31 illustrates the above-mentioned multilayer optical recording medium 610. As shown in this figure, this optical recording medium 610 has an outer surface 601s through which a beam is incident on respective recording surfaces 601a, . . . , 601n which are provided by means of a configuration of multilayer structure thereof. Then, as shown in the figure, a beam 602a is focused onto the first recording surface 601s, . . . , and a beam 602n is focused onto the n-th recording surface 601n.

Specific embodiments of an optical pickup having such a multilayer optical recording medium loaded therein may have configurations the same as those described above with reference to FIGS. 28A through 29E.

In case where the above-mentioned multilayer optical recording medium is applied as the optical recording medium 11 in each of the optical pickups shown in FIGS. 28A and 29A, the spherical aberration amount occurring when a focus jump is made to a desired recording surface is detected by the spherical aberration detecting device 15, and, then, the thus-detected spherical aberration is corrected by the spherical aberration correcting device 16 or 16A.

Figure 30:
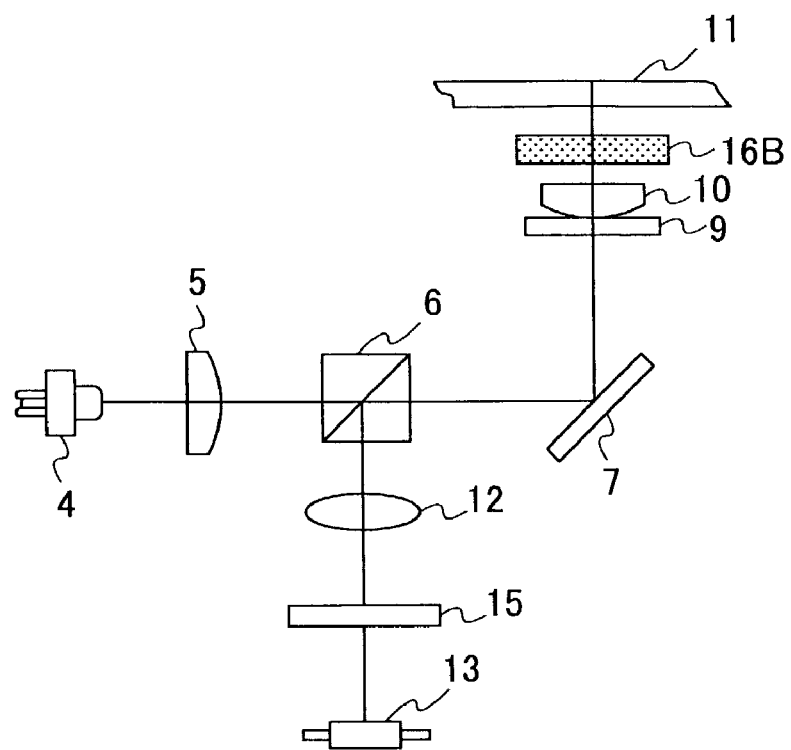
FIG. 30 shows an optical pickup according to another embodiment of the present invention.

FIG. 30 shows another embodiment of the optical pickup which uses the multilayer optical recording medium. In the figure, the same reference numerals are given to parts/components same as those shown in FIG. 26, and the duplicated description thereof is omitted. In FIG. 30, the optical recording medium 11 is the multilayer optical recording medium, and an object lens 10 is designed so that the wavefront aberration occurring when a light spot is formed on a p-th recording surface which is furthest from the outer surface of the incident side substrate of the optical recording medium 11 through which a beam after passing through the object lens 10 is incident on each recording surface becomes minimum possible, more preferably, substantially zero. Specifically, in this embodiment, the distance from the outer surface of the incident side substrate to the p-th recording surface is 0.1 mm.

In this case, since a spherical aberration occurs when a light spot is formed on a q-th recording surface different from the above-mentioned p-th recording surface, the spherical aberration detection device 15 detects this spherical aberration, and the spherical aberration correcting device 16B corrects it.

The spherical aberration correcting device 16B in this embodiment includes a transparent parallel plate having a thickness varies gradually, and a driving device (not shown) to move this transparent parallel plate so as to control the position of this plate at which the beam coming from the object lens 10 passes through this plate, and thus to control the thickness of this plate to be actually applied to the beam to be incident onto the optical recording medium through the object lens 11.

The transparent parallel plate is made up of the material same as that of the optical recording medium, and has the thickness varying stepwise each in a unit of 't' which is the distance between each adjacent recording layers in the optical recording medium. Then, for example, when recording operation or the like is performed on the q-th recording surface, the portion of the transparent parallel plate having the thickness of (p−q)t is inserted between the object lens 10 and the optical recording medium 11. By performing such a control of the thickness of the transparent parallel plate to be inserted, the total thickness of the transparent substance inserted between the object lens 10 and any recording surface of the optical recording medium 11 can be made unchanged as the transparent parallel plate compensates the difference in the distance between the outer surface 601s and any recording surface 601n. Thereby, distortion of light spot formed occurring due to spherical aberration can be prevented from occurring, and thus, optimum recording/reproducing can be achieved. The correction of spherical aberration in the case of performing information recording, etc. to the optical recording medium which has the multiple recording surfaces therein may be preferably made so as to satisfy the following formula:

$$\Delta W > |(p-1)t - 200NA^2 + 370NA - 170|$$

is satisfied where $\Delta W$ stands for the change amount of the wavefront aberration, and NA stands for the numerical aperture of the object lens. Thereby, the quality of the light spot formed can be improved, and thus, quality information recording and information reproduction can be performed thereby.

The optical pickups described above with reference to FIGS. 26 through 30 are those each of an infinite system performing recording, reproducing or deleting information on the information recording medium having the thickness of the incident side substrate of 0.1 mm. In case the operating wavelength is 650±20 nm, an object lens according to any one of the above-described embodiments 1 through 6 is applied. In case the operating wavelength is 407±20 nm, an object lens according to any one of the above-described embodiments 7 through 12 is applied.

In the optical pickups described with reference to FIGS. 26 through 27C, each has the chromatic aberration correcting device 14, 14a, or 14b for correcting the chromatic aberration resulting from wavelength change. The chromatic aberration correcting device 14 is of a doublet lens including a positive lens in the optical pickup of FIG. 26. The optical pickup of FIGS. 26A uses the resin coating 14a provided on the object lens, or the diffraction surface 14b.

The optical pickups shown in FIGS. 28A through 31 has the substrate thickness error detection device for detecting substrate thickness error in the incident side substrate of the optical recording medium, and the spherical aberration correcting device 16, 16A and 16B to correct spherical aberration resulting from the substrate thickness error based on the substrate thickness error which the substrate thickness error detection device 15 detects. In the optical pickup shown in FIG. 29A, the spherical aberration correcting device 16 is of lens separation variable, and includes the positive and negative lenses. In the optical pickup shown in FIG. 30, the liquid crystal device with concentric circular electrode patterns is utilized.

The optical pickups shown in FIGS. 29A through 30 may also be used in a case where the optical recording medium is of multilayer type, and has the thickness of incident side substrate of 0.1 mm. In such a case, the optical pickup has the spherical aberration detecting device 15 to detect spherical aberration which varies according to the separation between the outer surface of the incident side substrate and any recording surface, and the spherical aberration correcting device 16 or 16A to correct the spherical aberration detected by this spherical aberration detection device. Then, in case of the operating wavelength: 650±20 nm, the object lens which makes the beam from the light source condense as a light spot on a desired recording surface of the optical recording medium according to any one of the above-described embodiments 1 through 6 may be used. In case the operating wavelength is of 407±10 nm, the object lens according to any one of the above-described embodiments 7 through 12 may be applied for making the beam from the light source condense as a light spot on the desired recording surface of the optical recording medium.

The optical pickups shown in FIGS. 28A through 31 each may have the chromatic aberration correcting device 14, 14 or 14B correcting chromatic aberration occurring due to wavelength change such as that shown in FIG. 26 or 27A added thereto. Moreover, for example, the function as the chromatic aberration correcting device can be provided by applying a glass material having different dispersions to lenses of two groups of the spherical aberration correcting device 16 shown in FIG. 28A. That is, it is possible to achieve a single device including the functions of both the chromatic aberration correcting device and spherical aberration correcting device together.

Figure 32:
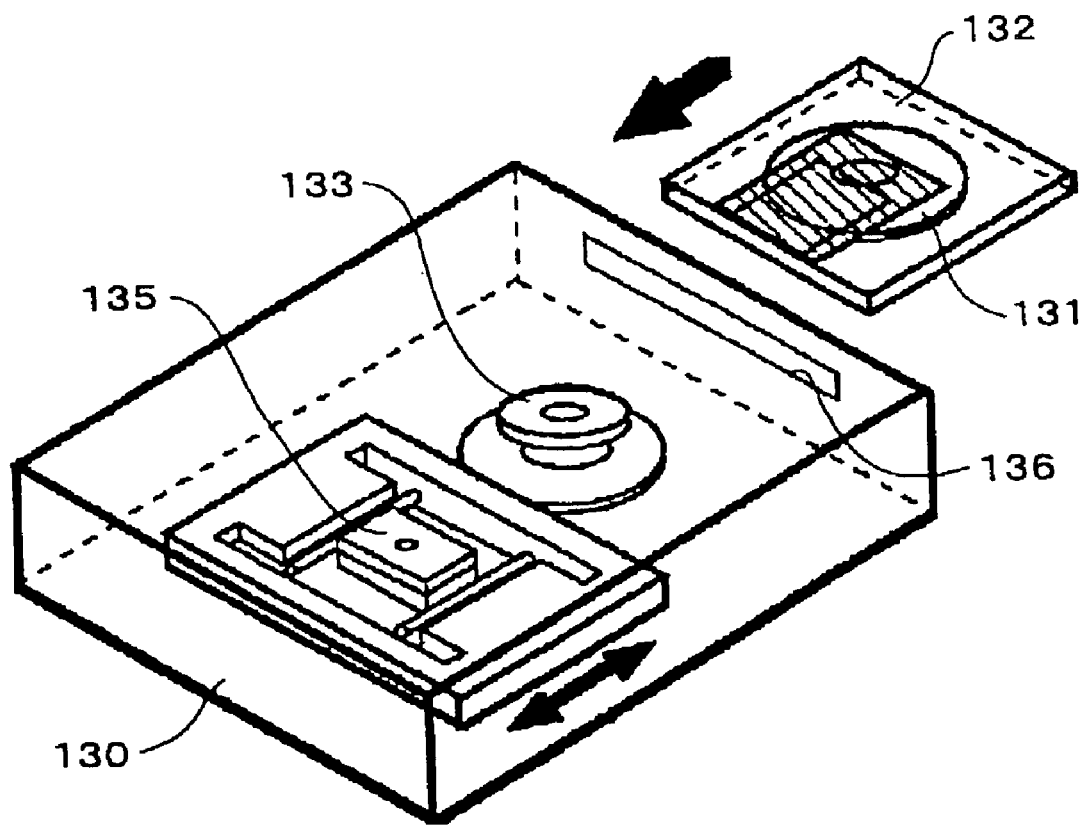
FIG. 32 shows an internal perspective view of an optical information processing device according to an embodiment of the present invention.

FIG. 32 illustrates one embodiment of an optical information processing device according to the present invention. The optical information processing device 130 performs recording, reproducing or deleting information on an optical recording medium using an optical pickup. In this embodiment, the optical recording medium 131 is of a disk, and is held by a protection case 132. The optical recording medium 131 is inserted into the processing device 130 together with the protection case 132, through an insertion mouth 136. After that, the recording medium 131 loaded onto a spindle motor 133 is rotated thereby, and, then, recording, reproducing or deleting of information is performed on the recording medium 131 by means of an optical pickup 135.

As the optical pickup 135, one according to any one of the above-described embodiments may be used.

In addition, other technologies of correcting chromatic aberration in an optical pickup is disclosed by Japanese laid-open patent applications Nos. 2000-9047, 6-14135, 62-36621, 9-138344, etc., and these well-known methods may be appropriately applied. Similarly, other spherical aberration correcting devices are disclosed by Japanese laid-open patent applications Nos. 2000-13160, 10-20263, etc., and such a spherical aberration correcting device may be appropriately utilized in this optical information processing device.

In each embodiment described above, generally, the optical recording medium applied is of a disk. The incident side substrate has the standard thickness of 0.1 mm, and the optical system of the optical pickup in an infinite system is designed based on this standard value. The object lens for the optical pickup is designed as one part of this optical system. Generally, the incident side substrate thickness in the optical recording medium actually used possibly has an error from the above-mentioned standard value.

Moreover, the above-mentioned conditions (9) through (12), and conditions (21) through (24) are effective on a range up to the order of NA=9.5 and, for a practical use, up to around NA=1.0.

The above-mentioned conditions (1) through (24) are conditions for the object lens for the optical pickup to archive the numerical aperture of the predetermined range, and desired performance. The meaning of condition (1) is the same as the meaning of conditions (5), (9), (13), (17), and (21), the meaning of condition (2) is the same as the meaning of conditions (6), (10), (14), (18), and (22), and the meaning of condition (3) is the same as the conditions (7), (11), (15), (19) and (23), and the meaning of condition (4) is the same as the meaning of conditions (8), (12), (16), (20), and (24).

The object lens for the optical pickup of an infinite system is a positive lens which makes the parallel beam incident from the light source side condense. In each embodiment described above, either a convex lens or a meniscus lens may be applied as the object lens, as it has both sides each of aspherical surface. In the case of a both-side convex lens, in terms of aberration correction, it is preferable to dispose the surface-having the small curvature radius on the light source side. In case of meniscus lens, the convex surface may be preferably made to face the light source side.

On the operating wavelength of 650±20 nm or the operating wavelength of 407±10 nm, the allowable maximum wavefront aberration is assumed as $0.01\lambda$, where $\lambda$ stands for the wavelength, in formation of a light spot having a desired diameter on the recording surface through the incident side substrate having the thickness of 0.01 mm.

When the object lens is of the meniscus lens having its convex surface face to the light source side, it is necessary that the above-mentioned conditional formulas (1), (2), (5), (6), (9), (10), (13), (14), (17) (18), (21), and (22) hold. Otherwise, it becomes not possible to archive the desired numeral aperture, and also to have the wavefront aberration fall within $0.01\lambda$.

When the object lens is of the both-side convex lens having the convex surface with smaller curvature radius face the light source side, the above-mentioned conditional formulas (1), (2), (5), (6), (9), (10), (13), (14), (17) (18), (21), and (22), and, also, conditional formulas (3), (4), (7), (8), (11), (12), (15), (16), (19), (20), (23) and (24) should preferably hold. Also, these conditional formulas (3), (4), . . . , (23) and (24) should preferably hold in case the object lens is of a meniscus lens having the convex surface facing the light source side.

The conditions (1) and (13) are the same, and, define the paraxial curvature radius R1, the refractive index nd of the lens material with respect to the d-line, and the focal length f. For example, a case is assumed in which NA is $0.65 \leq NA < 0.75$. In such a case, parameters R1 and nd for the purpose of achieving NA=0.65 will now be discussed.

Supposing the light-source-side surface of the object lens is a convex to the light source side, that the paraxial curvature radius R1 becomes larger means that the positive refraction power on this surface becomes smaller. According to the present invention, to enlarge the numeric aperture of the object lens for the optical pickup is aimed. For this purpose, it is necessary to enlarge the positive refraction power in the lens. In order to enlarge the numerical aperture NA while enlarging the paraxial curvature radius R1, it is necessary to enlarge the refractive index of the lens material itself. Accordingly, the refractive index nd of the lens material should be increased with increase in the paraxial curvature radius R1 thereof.

Figure 33:
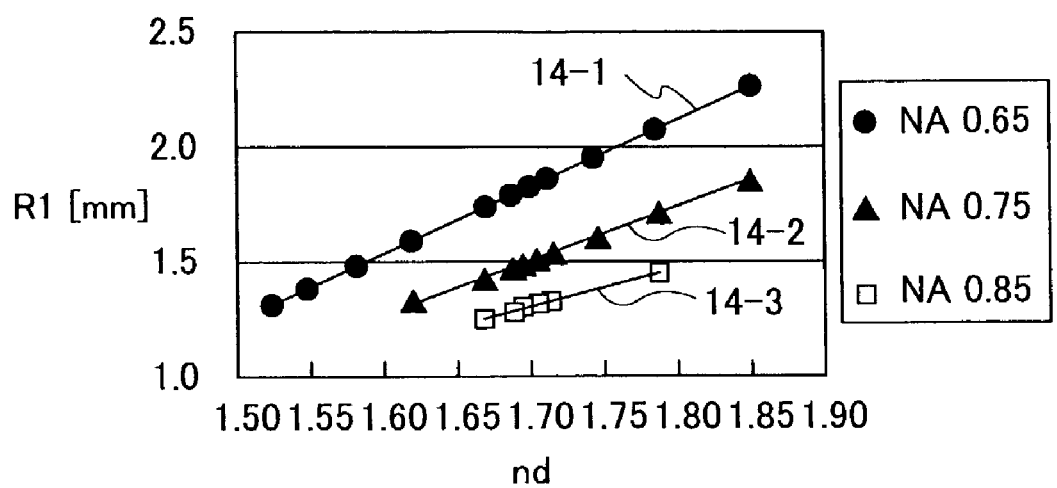
FIGS. 33, 34, and 35A through 35F illustrate conditional formulas for the object lens according to the present invention.

Black dots shown in FIG. 33 plot a relation between the paraxial curvature radius R1 and the refractive index nd of the object lens for the optical pickup to satisfy the condition that the wavefront aberration be not more than $0.01\lambda$, in the both-side-convex type having the surface with the sharper curvature face the light source side, with the effective diameter $\phi=3$ mm and the numerical aperture NA=0.65. These black dots lie on a straight line 14-1 as shown in the figure. Therefrom, it can be seen that the paraxial curvature radius R1, and the refractive index nd have a linear proportionality relation.

On the other hand, between the numerical aperture NA and the focal length f, the following relation holds:

$$f=(\phi/2)/NA$$

As $\phi=3$ mm and NA=0.65, it is found out f=2.31 mm. Then, by using this value in the focal length, the relation of the straight line 14-1 in FIG. 33 is obtained with respect to the parameter R1/f and nd as variables. Then, the following formula is obtained:

$$R1/f=1.3\ nd-1.2$$

In case the relation between R1, nd and f separates from this formula, even when the aspherical shape on the light-source side or optical-recording-medium side surface, or the lens thickness/material is appropriately adjusted, the wavefront aberration of not more than $0.01\lambda$ with the numerical aperture NA 0.65 cannot be attained.

Triangle dots shown in FIG. 33 plot the relation with the numerical aperture NA=0.75 for the wavefront aberration to be not more than $0.01\lambda$. As shown, this relation lies on a straight line 14-2. This straight line 14-2 is in the same way expressed by the following formula:

$$R1/f=1.2\ nd-1.1$$

In case the relation between R1, nd and f separates from this formula, even when the aspherical shape on the light-source-side or the optical-recording-medium-side surface, or the lens thickness/material is appropriately adjusted, the numeric aperture NA: 0.75 with the wavefront aberration of not more than $0.01\lambda$. cannot be attained.

Similarly, white squire dots shown in FIG. 33 shows the same relation with the numeric aperture NA=0.85 and the wavefront aberration of not more than $0.01\lambda$. This relation lies on a straight line 14-3, and can be expressed by the following formula:

$$R1/f=1.0\ nd-0.7$$

In case the relation between R1, nd and f separates from this formula, even when the aspherical shape on the light-source-side or optical-recording-medium-side surface of the lens, or the lens thickness/material is adjusted, the numeric aperture NA: 0.85 with the wavefront aberration of not more than $0.01\lambda$ cannot be attained.

Therefrom, it can be seen that the straight line which expresses the relation between R1 and nd has the slope that becomes less steep as the numerical aperture NA becomes larger.

Accordingly, on the object lens for the optical pickup having the wavefront aberration of not more than $0.01\lambda$, and the numeric aperture NA in such a range that $$0.65 \leq NA < 0.75,$$

the parameters R1/f and nd should satisfy the conditional formulas (1), (13) whether or not the operating wavelength is $407\pm10$ nm, or $660\pm20$ nm. Similarly, on the object lens for the optical pickup having the wavefront aberration of not more than $0.01\lambda$, and the numeric aperture NA in such a range that $$0.75 \leq NA < 0.85,$$

the parameters R1/f and nd should satisfy the conditional formulas (5), (17) whether or not the operating wavelength is $407\pm10$ nm, or $660\pm20$ nm.

Similarly, on the object lens for the optical pickup having the wavefront aberration of not more than $0.01\lambda$, and the numeric aperture NA in such a range that $$0.85 \leq NA,$$

the parameters R1/f and nd should satisfy the conditional formulas (9), (21) whether or not the operating wavelength is $407\pm10$ nm, or $660\pm20$ nm.

How to secure the working distance required in order that the object lens for the optical pickup have improved reliability in the optical pickup will now be discussed. In order to enlarge the working distance WD, the back focus (back focal distance) should be enlarged. For this purpose, the refractive index of the object lens for the optical pickup is made smaller so as to make the refraction power smaller. However, this leads to reduction in the numeric aperture. Therefore, in order to secure necessary the working distance, with securing the necessary numeric aperture, the numeric aperture and the refractive index are made to balance.

Figure 34:
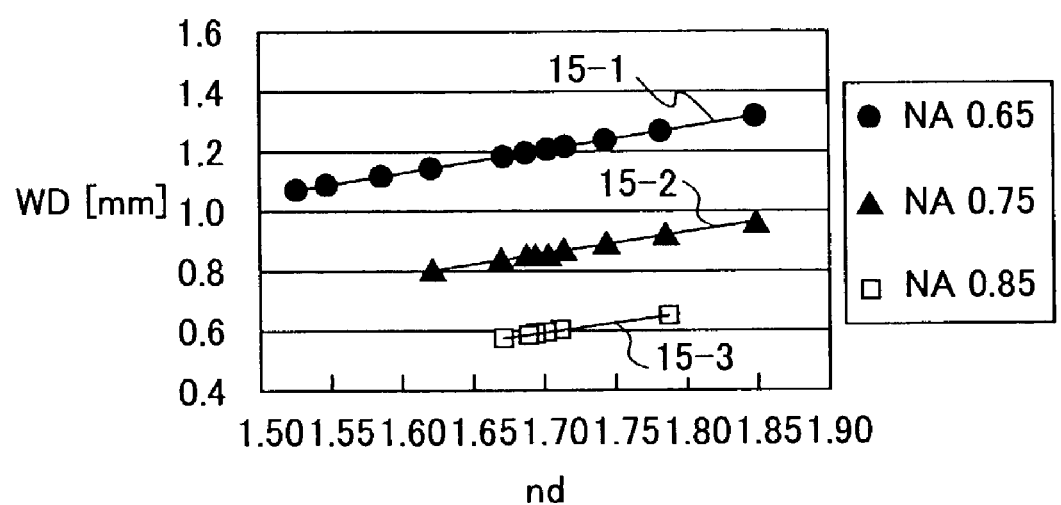

FIG. 34 shows relation of the working distance WD with respect to the refractive index nd of the lens material for the respective required numerical aperture 0.65, 0.75 and 0.85, under the condition that the wavefront aberration is controlled within $0.01\lambda$, the effective diameter is such that $\phi=3$ mm, with the both-side-convex object lens having the surface with shaper curvature toward the light source side. In FIG. 33, the curve 15-1 shows the relation for NA=0.65, the curve 15-2 shows the relation for NA=0.75, and the curve 15-3 shows the relation for NA=0.85. The curve 15-1 can be expressed by the following formula, where the parameters WD/f and nd are regarded as variables:

$$WD/f=0.39\ nd-0.04$$

In case the relation between WD, nd and f separates from this formula, even when the aspherical shape on the light-source-side or optical-recording-medium side surface of the lens, or the lens thickness/material is adjusted, the required numeric aperture of 0.65 with the wavefront aberration of not more than $0.01\lambda$ cannot be attained.

Similarly, the curve 15-2 can be expressed by the following formula, where the parameters WD/f and nd are regarded as variables:

$$WD/f=0.37\ nd-0.14$$

In case the relation between WD, nd and f separates from this formula, even when the aspherical shape on the light-source-side or optical-recording-medium side surface of the lens, or the lens thickness/material is adjusted, the required numeric aperture of 0.75 with the wavefront aberration of not more than $0.01\lambda$ cannot be attained.

The curve 15-3 can be expressed by the following formula, where the parameters WD/f and nd are regarded as variables:

$$WD/f = 0.33\, nd - 0.18$$

In case the relation between WD, nd and f separates from this formula, even when the aspherical shape on the light-source-side or optical-recording-medium side surface of the lens, or the lens thickness/material is adjusted, the required numeric aperture of 0.85 with the wavefront aberration of not more than 0.01λ cannot be attained.

Therefrom, it can be seen that the straight line which expresses the relation between WD and nd has the slope that becomes less steep as NA becomes larger.

Accordingly, on the object lens for the optical pickup having the wavefront aberration of not more than 0.01λ, the numeric aperture NA is in such a range that $$0.65 \leq NA < 0.75,$$

the parameters R1/f and nd should satisfy the conditional formulas (2), (14) whether or not the operating wavelength is 407±10 nm, or 660±20 nm.

Similarly, on the object lens for the optical pickup having the wavefront aberration of not more than 0.01λ, the numeric aperture: NA is in such a range that $$0.75 \leq NA < 0.85,$$

the parameters R1/f and nd should satisfy the conditional formulas (6), (18) whether or not the operating wavelength is 407±10 nm, or 660±20 nm.

Similarly, on the object lens for the optical pickup having the wavefront aberration of not more than 0.01λ, the numeric aperture: NA is in such a range that $$0.85 \leq NA,$$

the parameters R1/f and nd should satisfy the conditional formulas (10), (22) whether or not the operating wavelength is 407±10 nm, or 660±20 nm.

FIGS. 35A through 35F show the lens material with the refractive index nd and Abbe's number vd under the condition where the above-mentioned respective conditional formulas (1), (2), (5), (6), (9), (10), (13), (14), (17), (18), (21), and (22) are satisfied, with the both-side-convex objective lens with the surface having the shaper curvature face the light source side, with the required respective numeral aperture, and the wavefront aberration of not more than 0.01λ.

Figure 35A:
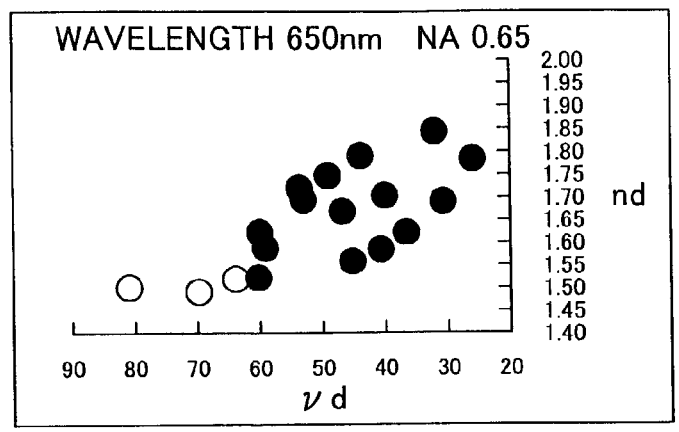
Figure 35B:
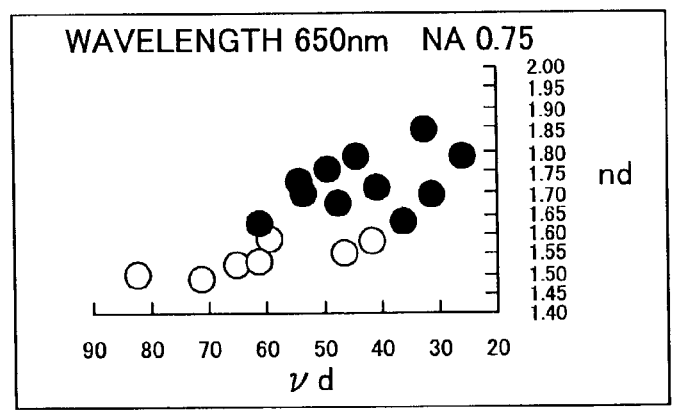
Figure 35C:
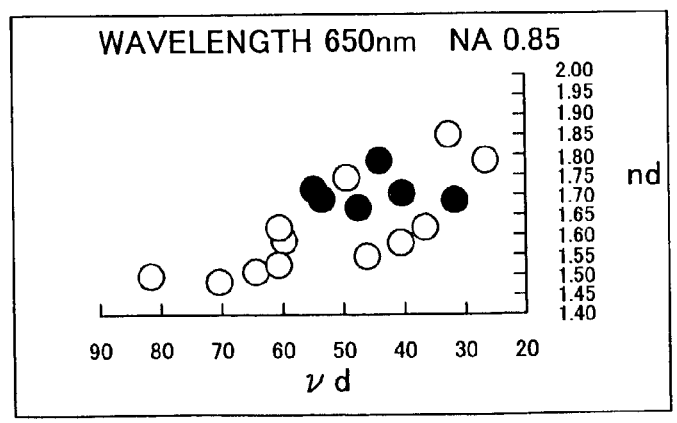
Figure 35D:
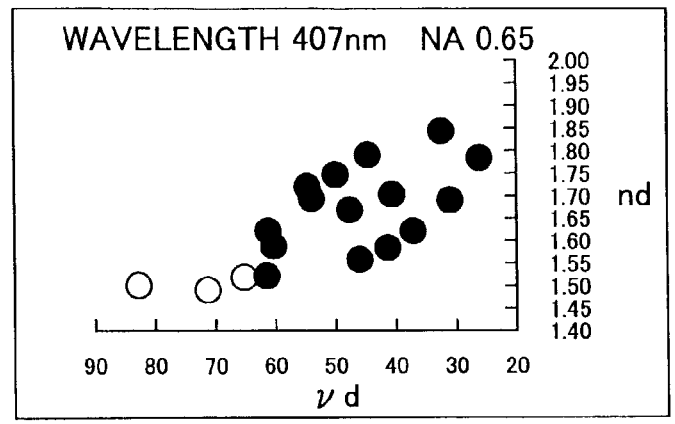
Figure 35E:
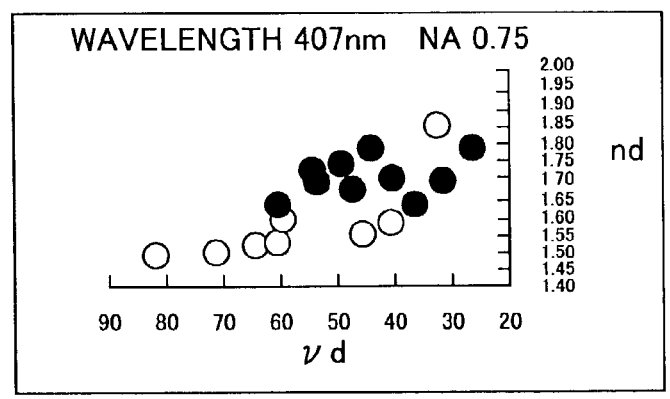
Figure 35F:
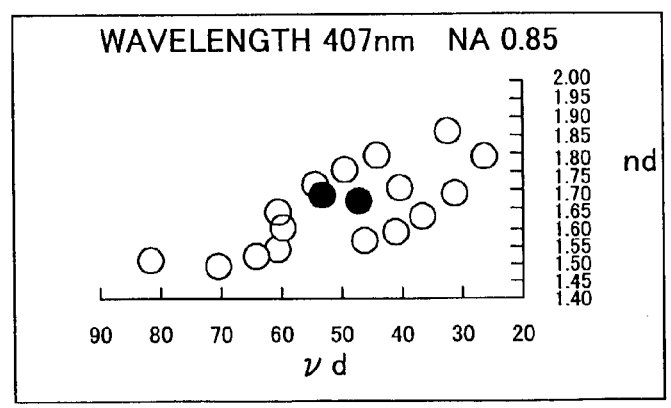

FIGS. 35A, 35B and 35C show the cases of operating wavelength of 650 nm, with the numeral aperture of 0.65, 0, 75 and 0.85, respectively. FIGS. 35D, 35E and 35F show the cases of operating wavelength of 407 nm, with the numeral aperture of 0.65, 0, 75 and 0.85, respectively. In these figures, the lens materials having the combinations of the refractive index and the Abbe's number shown by the black dots are allowable. As a general tendency, the range permitted in the refractive index and the Abbe's number narrows as the numerical aperture NA increases. This tendency is so remarkable in the operating wavelength 407 nm.

The conditional formulas (3), (4), (15), and (16) specify the tolerance level of the refractive index and the Abbe's number according to FIGS. 35A and 35D. The conditional formulas (7), (8), (19) and (20) specify the tolerance level of the refractive index and the Abbe's number according to FIGS. 35B and 35E. The conditional formulas (11), (12), (23), and (24) specify the tolerance level of the refractive index and the Abbe's number according to FIGS. 35C and 35F.

In case the conditional formulas (4), (8), (12), (16), (20) and (24) do not hold in case the object lens for the optical pickup is of a both-side-convex type having the surface of sharper curvature face the light source side, the refractive index of the object lens is too small. Accordingly, in order to achieve the desired NA, the curvature of the lens surface on the light source side in particular should be sharpened. As a result, it will become difficult to form the object lens surface at a high precision, and the cost of the object lens will become higher.

In case the conditional formulas (3), (7), (11), (15), (19), and (23) do not hold, chromatic aberration due to change of the wavelength of the light source becomes increased too much. These conditions concerning the Abbe's number and refractive index should be preferably satisfied especially in a case where the object lens for the optical pickup is of the both-side-convex type and having the surface of shaper curvature face the light source side.

As described in the description of the embodiments above, satisfactory performance having the wavefront aberration of not more than 0.01λ can be achieved also on the object lens for the optical pickup of a meniscus type having the convex surface face the light source side, by satisfying the conditions (1), (2), (5), (6), (9), (10), (13), (14), (17), (18), (21), and (22) according to the particular numeric aperture NA.

In the case of the meniscus object lens, since the surface on the side of the optical recording medium is a concave surface, the refraction power resulting from the lens surface is smaller in comparison to the case of the both-side-convex object lens. Accordingly, it is preferable to select a lens material having high refractive index so as to compensate this. Moreover, since the direction of chromatic aberration occurring is different between the surface on the light source side and the surface on the optical recording medium side, a lens material having a large dispersion and a small Abbe's number can be used. That is, in the object lens for optical pickup of meniscus type, the material of both high refractive index and low Abbe's number can be used in comparison to the case of applying the both-side-convex time type.

However, also in case of the meniscus object lens for the optical pickup having the convex surface face the light source side, by satisfying the above-mentioned conditions (3), (7), (11), (15), (19), and (23), the requirements concerning the lens shape such as lens surface shape are eased.

Thus, by configuring an object lens for an optical pickup satisfying the above-mentioned respective conditions, it is possible to realize the object lens for the optical pickup with which it has the numeric aperture falling within the required range, and the wavefront aberration of not more than 0.01λ.

Other embodiments of the present invention will now be described with reference to drawings.

Same as the above-described embodiments of the present invention, as a form of an optical recording medium, a disk-shaped one is used. Further, the incident side substrate of the optical recording medium has a thickness of a standard value of 0.1 mm. Based on this standard value, an optical system of an optical pickup is designed and the above-mentioned incident side substrate thickness may possibly have an error from the above-mentioned standard value in the optical recording medium actually used.

First, conditional formulas I, II, III, IV, and V will now be described. In these formulas, the refractive-index of material with respect to the d-line is referred to as nd, the Abbe's number of the material with respect to the d-line is referred to as vd, the lens central thickness is referred to as t, the working distance is referred to as WD, the focal length is referred to as f, the paraxial curvature radius on the surface facing the light source side is referred to as R1. The conditional formulas are shown below:

| | |
|---|---|
| $vd \leq 65$ | Conditional formula I: |
| $1.55 < nd$ | Conditional formula II: |
| $1.0\ nd-1.0 < R1/f \leq 1.0\ nd-0.8$ | Conditional formula III: |
| $1.2\ nd-0.75 \leq t/f \leq 1.2\ nd-0.5$ | Conditional formula IV: |
| $-0.35\ nd+0.77 \leq WD/f \leq -0.35\ nd+0.85$ | Conditional formula V: |

These conditional formulas I through V define conditions for the object lens for the optical pickup realizing a desired performance.

The object lens for the optical pickup used as the infinite system lens is a positive lens which makes a parallel beam incoming from the light source side condense, and, a both-side-convex lens or a meniscus lens may be applied thereto. As mentioned above, in the object lens for the optical pickup, the both sides thereof are of aspherical surfaces with a single lens configuration. However, since the light-source-side surface of the both-side-convex lens can be made less sharp in curvature, the both-side-convex lens is preferable in the viewpoint of manufacture implementability.

In the embodiments of the present invention which will be described later, the maximum value of wavefront aberration is made to fall within $0.04\lambda$ in order to form a satisfactory light spot with a desired diameter on a recording surface of an optical recording medium with the light source of predetermined wavelength, and the incident side substrate of the optical recording medium having a predetermined thickness. This wavefront aberration of $0.04\lambda$ includes a wavefront degradation occurring due to manufacture error, such as a curvature radius deviation on the first/second surfaces of the lens, a thickness deviation of the lens, a deviation of the aspherical surface shape, a shift of each surface of the lens, a tilt of each surface of the lens, and so forth. Therefore, a maximum permissible value in the amount of wavefront degradation occurring due to these manufacture errors is determined as the order of $0.015\lambda$.

Figure 36:
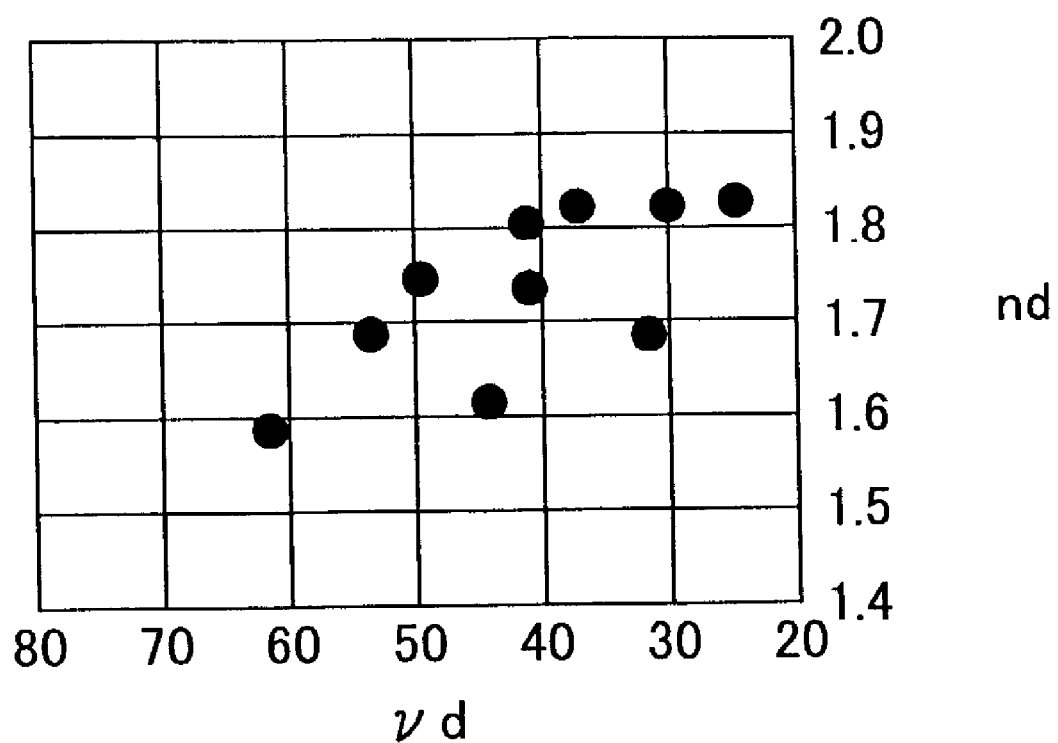
FIG. 36 shows lens materials in relation with refractive index and Abbe's number thereof.

FIG. 36 expresses the lens material permitted in order to realize the wavefront aberration not more than $0.04\lambda$ with a relation between the refractive index nd and Abbe's number vd. In case the object lens for the optical pickup is of a both-side-convex type with the surface having the shaper curvature face the light source side, but the above-mentioned condition II, i.e., $1.55 \leq nd$, cannot be satisfied, the refractive index of the object lens becomes too small. Accordingly, in order to achieve the desired NA, it is necessary to sharpen the curvature on the lens surface facing the light source side. In such a case, it becomes difficult to form the object lens surfaces at high accuracy, and, thus, the cost of the object lens increases.

Moreover, when the condition I, i.e., $vd \leq 65$, concerning the Abbe's number vd cannot be satisfied, chromatic aberration occurring due to variation in the wavelength of the light source becomes large too much.

These conditions concerning the Abbe's number and refractive index are preferably satisfied especially in the case where the object lens for the optical pickup is of both-side-convex type having the surface with shaper curvature face the light source side.

Furthermore, to control the wavefront aberration within $0.04\lambda$ with securing the necessary numerical aperture cannot be achieved unless the above-mentioned conditions III and IV are satisfied, in the case where the object lens for the optical pickup is of the both-side-convex type having the surface of shaper curvature face the light source side.

The paraxial curvature radius R1, the lens central thickness t, and the refractive index nd on the above-mentioned conditions III and IV will now be discussed. Supposing the surface on the side of the light source of the object lens for the optical pickup is convex toward the light source side, that the paraxial curvature radius R1 becomes large means decrease in the positive refraction power on this surface. On the other hand, in order to enlarge NA of the object lens for the optical pickup, it is necessary to enlarge the positive refraction power on this lens surface. Therefore, in order to enlarge NA at the same time to enlarge the paraxial curvature radius R1, it is necessary to enlarge the refractive index of the lens material as mentioned above. Accordingly, the relation is to hold in which the refractive-index nd of the lens material is made to increase with increase of the paraxial curvature radius R1.

On the other hand, when the central thickness t of the lens becomes larger, an area by which the light passes through the surface on the side of the optical recording medium becomes smaller. As mentioned above, in order to enlarge NA of the object lens for the optical pickup, it is necessary to enlarge the positive refraction power on this lens surface. Accordingly, in order to enlarge NA at the same time to increase the lens central thickness t, the relation should hold in which the refractive index nd of the lens material is made to increase with the increase of the central thickness t of the lens.

Figure 37A:
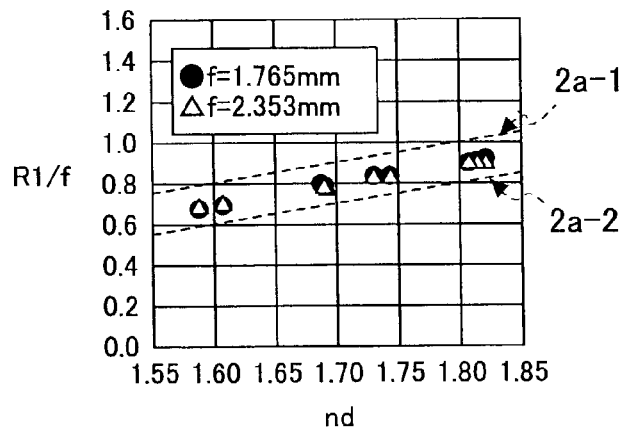
FIGS. 37A through 37C illustrate other conditional formulas of the object lens according to the present invention.

Black dots shown in FIG. 37A plot the relation which the paraxial curvature radius R1 and refractive index nd should satisfy under the condition where the wavefront aberration of not more than $0.04\lambda$ is secured, and, the focal length f of the object lens for the optical pickup of both-side-convex type having the shaper curvature surface face the light source side is set as 1.765 mm, and NA=0.85, as example. Similarly, white triangles of FIG. 37A plot another example in which f=2.235 mm and NA=0.85. That is, the required relation is included in a zone sandwiched by curves (actually, straight lines) 2a-1 and 2a-2. Since the refractive index of the lens material depends also on the Abbe's number vd in addition to the refractive-index nd of d-line, the relation between R1 and nd cannot be determined uniquely. However, it is possible to achieve the wavefront aberration not more than $0.04\lambda$ by satisfying the condition III concerning R1 and nd according to the zone between the straight lines 2a-1 and 2a-2, and, also, by satisfying the condition I concerning vd.

Figure 37B:
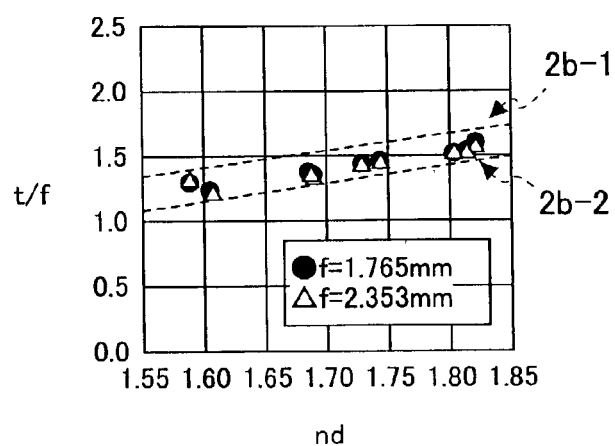

Similarly, black dots shown in FIG. 37B plot the relation which the central lens thickness t and refractive index nd should satisfy under the condition where the wavefront aberration of not more than $0.04\lambda$ is secured, and, the focal length f of the object lens for the optical pickup of both-side-convex type having the shaper curvature surface face the light source side is set as 1.765 mm, and NA=0.85, as example. Similarly, white triangles of FIG. 37B plot another example in which f=2.235 mm and NA=0.85. That is, the required relation is included in a zone sandwiched by curves (actually, straight lines) 2b-1 and 2b-2. Since the refractive index of the lens material depends also on the Abbe's number vd in addition to the refractive-index nd of d-line, the relation between t and nd cannot be determined uniquely. However, it is possible to achieve the wavefront aberration not more than 0.04λ by satisfying the condition IV concerning t and nd according to the zone between the straight lines 2b-1 and 2b-2, and, also, by satisfying the condition I concerning νd.

Next, as mentioned above, the working distance WD should be secured in order that the object lens for the optical pickup be improved in the reliability.

As mentioned above, enlargement in the working distance WD is achievable by the increase in the back focus. However, for this purpose, the refractive index in the object lens for the optical pickup should be reduced. However, reduction in the refractive index of the object lens leads to reduction in NA. Therefore, in order to secure the necessary working distance WD, while securing the necessary NA, NA and nd are made to balance.

Figure 37C:
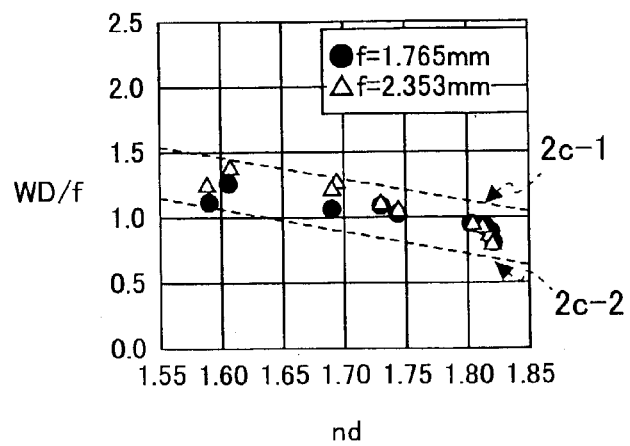

Black dots in FIG. 37C plot the relation between the working distance WD and the refractive index nd of the lens material under the condition of achievement of the wavefront aberration of not more than 0.04λ on the object lens for the optical pickup having the focal length f=1.765 and NA=0.85 of the both-side-convex type having the shaper curvature side face the light source side. Similarly, white triangles of FIG. 37C plot the relation in another example where f=.2.235, and NA=0.85. That is, the required relations are included in the zone defined between the straight lines 2c-1 and 2c-2. Since the refractive index of the lens material depends also on the Abbe's number νd in addition to the refractive-index nd of d-line, the relation between WD and nd cannot be determined uniquely. However, it is possible to achieve the wavefront aberration not more than 0.04λ by satisfying the condition V concerning WD and nd according to the zone between the straight lines 2c-1 and 2c-2, and, also, by satisfying the condition I concerning νd. In addition, the effective diameter on the light-source-side surface of the object lens should fall within a range between 3 mm and 4 mm in the viewpoints of the working distance and object lens weight.

If the relations separate from the above-mentioned conditions III, IV and V, even when aspherical shapes on the lens surfaces on the light source side and optical recording medium side are adjusted, it is not possible to achieve the wavefront aberration of not more than 0.04λ with NA: 0.85.

Thus, it is possible by satisfying the above-mentioned conditions I and II to realize the object lens for the optical pickup having the numerical aperture in the necessary range, and the wavefront aberration of not more than 0.04λ. Also, the implementability on manufacture can improve further on the object lens for the optical pickup by satisfying the above-mentioned conditions III, IV and V.

Object lenses for optical pickups according to embodiments 13 and 14 of the present invention will now be described. In the configurations shown in FIG. 38A and FIG. 39A, in order to avoid complication, the same reference numerals are given to parts/members having substantially the same functions. Specifically, as shown in the figures, a beam emitted from a light source is incident on an object lens 2 after passing through an aperture 1, and then, is incident on a recording surface RS through an incident side substrate 3 (with the thickness of 0.1 mm) both of an optical recording medium.

The laser beam from the light source side (not shown, and located in the left-hand side of the figures) passes through an opening (with the diameter φ=3 mm or 4 mm) of the wavelength selecting aperture 1 as a parallel beam, and, is incident on the object lens 2 for the optical pickup. Then, the incident beam is made a condensing beam by means of this object lens 2, passes though the incident side substrate 3 of the optical recording medium, and then, forms a light spot on the recording surface RS (i.e., the right-hand end surface of the incident side substrate 3).

The aspherical surfaces on the lens surfaces of the object lens 2 are expressed by the following well-known aspherical surface formula with coordinates X along the optical axis direction, coordinates Y along a direction perpendicular to the optical axis, a paraxial curvature radius R, a cone constant K, and high order coefficients A, B, C, D, E, F, . . . :

$$X=(Y^2/R)/[1+\sqrt{1-(1+K)Y/R^2}]+AY^4+BY^6+CY^{8\ EY12}+FY^{14}+GY^{16}+HY^{18}+JY^{20}+\ldots$$

where R, K, A, B, C, D . . . are given, and thereby, the shape is defined.

First, on the object lens for the optical pickup in the embodiment 13 of the present invention, the applied operating wavelength: 407 nm, NA: 0.85, f: 1.765 mm, nd: 1.69350, and νd: 53.2. FIG. 40 shows other specific data thereof.

In FIG. 40, "OBJ" means an object point (a semiconductor laser as the light source). The object lens 2 for the optical pickup is of an infinite system, and "INFINITY" as the curvature radius RDY and thickness THI in the table of FIG. 40 means that the light source substantially located at infinity (i.e., in the infinite system as mentioned above). Moreover, in the table, "STO" stands for the surface on the wavelength selection aperture 1, and the curvature radius RDY thereof is set "INFINITY", and the thickness THI thereof is set "0" on the design. In addition, unless any other special notice, the unit of the dimension of length is "mm."

"S1" means the light-source-side surface of the object lens for the optical pickup, while "S2" means the optical-recording-medium-side surface of the same. The thickness of the object lens 2 in the embodiment 13 is 2.381463 mm, and "0.425496 mm" in thickness indicated on the right-hand side of the curvature radius of the field on S2 shows "working distance WD", in the table.

"S3" stands for the light-source-side surface of the incident side substrate 3 of the optical recording medium, and "S4" stands for the recording surface RS of the same. The separation between these surfaces S3 and S4, i.e., the incident side substrate thickness, is 0.1 mm, nd: 1.516330, and νd: 64.1 on the same. "EPD (entrance pupil diameter)" in the table expresses the diameter (3 mm) of an opening of the wavelength selection aperture 1, and "WL:wavelength" expresses the operating wavelength (407 nm).

In addition, in the indication of the above-mentioned aspherical surface coefficients in the table, for example, the indication of "D: 0.305477E-03" means "D=0.305477×10⁻³." The same manner is applied to every table.

Figure 38A:
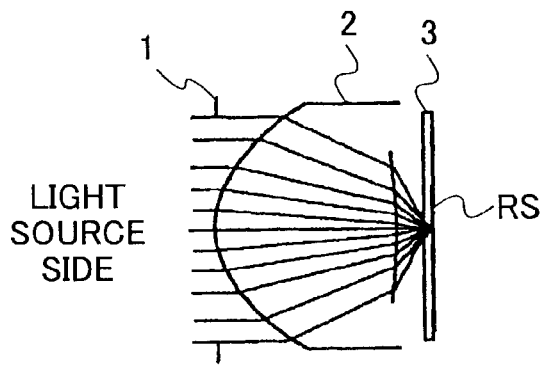
FIGS. 38A through 38D illustrate an embodiment 13 of the present invention.
Figure 38B:
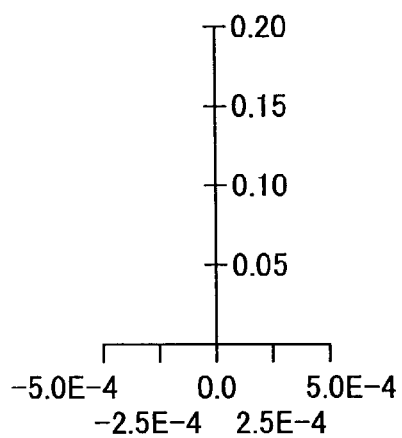
Figure 38C:
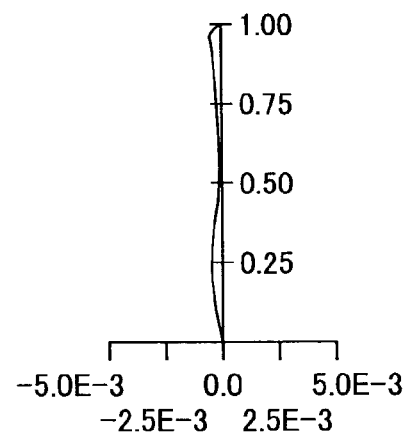

The arrangement of the wavelength selection aperture 1, the object lens 2 for the optical pickup, and the incident side substrate 3 in the embodiment 13 is shown in FIG. 38A. The astigmatism of the object lens 2 for the optical pickup and the spherical aberration of the same (the scale on the vertical axis stands for the values obtained according to normalization of the entrance pupil radius to 1) are shown in FIG. 38B and FIG. 38C, respectively. As can be seen therefrom, both the aberrations are satisfactorily corrected. In fact, the wavefront aberration of the design median is 0.0022λ on the axis.

Figure 38D:
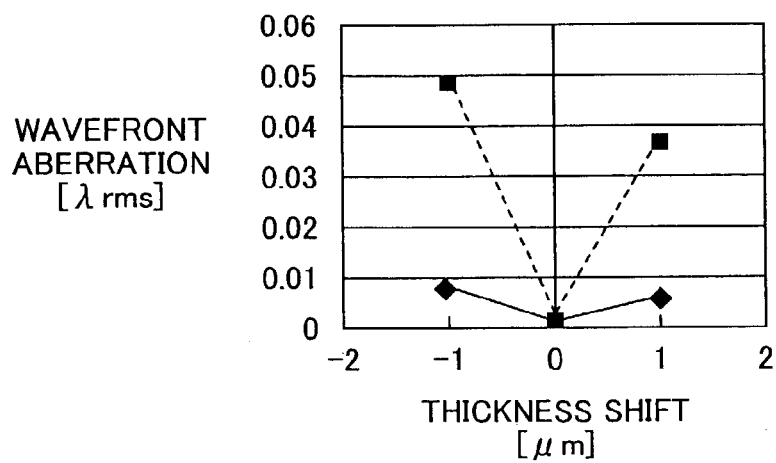

Furthermore, the amount of aberration increase when the central thickness deviation of the lens occurs is shown in FIG. 38D. In FIG. 38D, the dashed line stands for the amount of aberration increase on the operating wavelength:

650 nm, NA: 0.74, f: 2.00 mm, nd: 1.69330 and vd: 53.17, caused by the central thickness deviation in a conventional object lens, and the solid line shows the same on the embodiment 13 according to the present invention. Compared with the conventional object lens, even in case there is a thickness deviation about ±1 micrometer, the wavefront degradation is below 0.006λ, and is in the range which can sufficiently be manufactured according to the present invention.

As mentioned above, the object lens according to the thirteenth embodiment has the paraxial curvature radius: R1=1.37595 mm on the side of light source, f=1.765 mm, nd=1.69350, vd=53.2, and WD=0.425496 mm, and, as a result, R1, t, WD, f, nd and vd are within the ranges which satisfy the above mentioned conditions I through V, respectively.

Next, the focal length f in the object lens for the optical pickup according to the embodiment 14 of the present invention differs from that of the above-described embodiment 13, and, the embodiment 14 has the following specification: NA: 0.85, f=2.353 mm, nd=1.69350, and vd=53.2. FIG. 41 shows other specification.

Figure 39A:
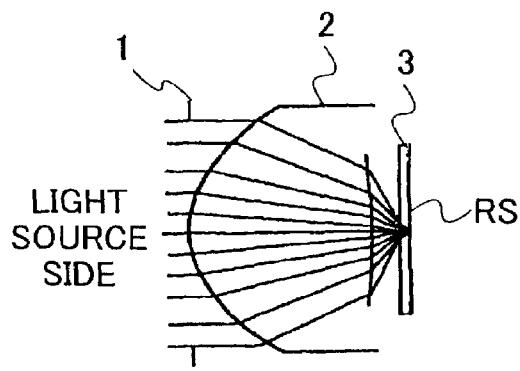
FIGS. 39A through 39D illustrate an embodiment 14 of the present invention.
Figure 39B:
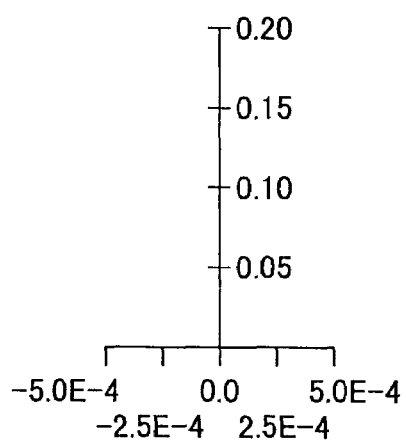
Figure 39C:
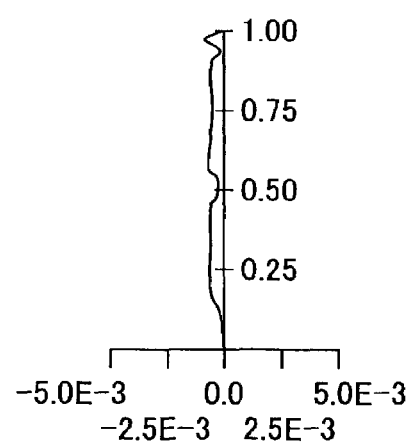
Figure 39D:
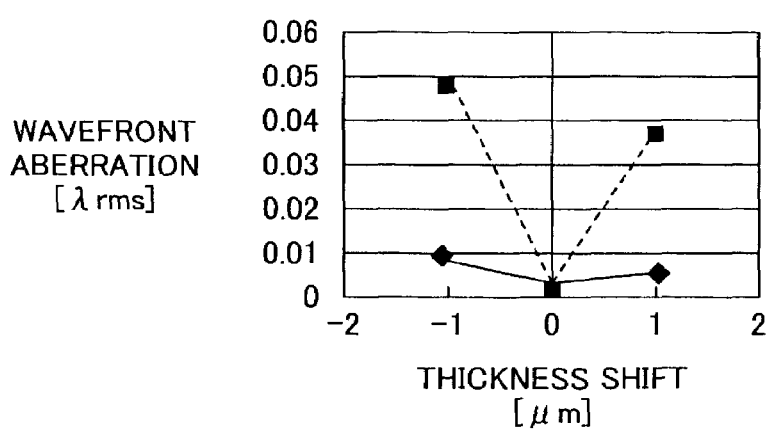

The arrangement of the wavelength selection aperture 1, the object lens 2 for the optical pickup, and the incident side substrate 3 is shown in FIG. 39A. The astigmatism of the object lens 2 for the optical pickup in the embodiment 14 and the spherical aberration thereof (the scale on the vertical axis stands for the values obtained according to normalization of the incidence pupil radius to 1) are shown in FIGS. 39B and 39C, respectively. As can be seen therefrom, both the aberrations are well corrected. In fact, the wavefront aberration of the design median is 0.0043λ on the axis.

As mentioned above, since the object lens in the embodiment 14 has the specification, i.e., R1=1.8331 mm, f=2.353 mm, nd=1.69350, vd=53.2, and WD =0.588459 mm, R1, t, WD, f, nd and vd fall within the respective ranges which satisfy the above-mentioned conditions I through V as well as in the above-described embodiment 13.

Next, conditions VI and VII to be satisfied for achieving desired performance also on a conventional optical recording medium such as DVD, CD, or the like by using the object lens for the optical pickup according to the present invention having the specification, i.e., the operating wavelength: 407±10 nm, NA: 0.85±0.05, for an optical recording medium having the incident side substrate with the thickness of 0.1 mm, will now be described:

$-0.42\ nd+0.82 \leq WD/f \leq -0.42\ nd+0.95$      Condition VI:

$-0.35\ nd+0.64 \leq WD/f \leq -0.35\ nd+0.72$      Condition VII:

The meaning of the condition VI is the same as the meaning of the condition VII.

In order to focus a beam on a DVD-type optical recording medium, the object lens applied should have the capability of focusing with an operating wavelength: 660±10 nm and NA: 0.65±0.05 onto the optical recording medium having the incident side substrate with the thickness of 0.6 mm.

Similarly, in order to focus on a CD-type optical recording medium, the object lens applied should have the capability of focusing with an operating wavelength: 780±10 nm and NA 0.50±0.05 onto the recording medium with the incident side substrate of the thickness of 1.2 mm.

In case the object lens according to the present invention is also used on the condition of the operating wavelength and substrate thickness according to the DVD or CD, the spherical aberration may occur due to difference in the substrate thickness (0.1 mm, 0.6 mm, 1.2 mm) and the difference in wavelength (407 nm, 660 nm, 780 nm). In order to control this spherical aberration, when performing recording/reproduction/deletion of information on a DVD or a CD, the incident beam onto the object lens should be of a divergent type. That is, when performing recording/reproducing/deleting of information on a DVD or a CD, the object lens is used as a finite-system object lens. Some spherical aberration remains slightly even when the incident beam onto the object lens is in a divergent type. This can be effectively reduced by inserting a coupling lens having a surface with a shaper curvature face the object lens side between the light source and the object lens. Moreover, as to the difference in NA (0.65, 0.85 and 0.50), the problem can be solved by using a device which can control the numerical aperture according to the particular operating wavelength.

Then, the object lens for the optical pickup which satisfies the above-mentioned conditions I through V with the operating wavelength: 407±10 nm and NA: 085±0.05 for the incident side substrate thickness: 0.1 mm is used as an object lens for an optical pickup (for DVD) which can focus onto an optical recording medium under the condition of the operating wavelength: 660±10 nm and NA: 0.65±0.05, for the incident side substrate thickness: 0.6 mm.

Figure 42A:
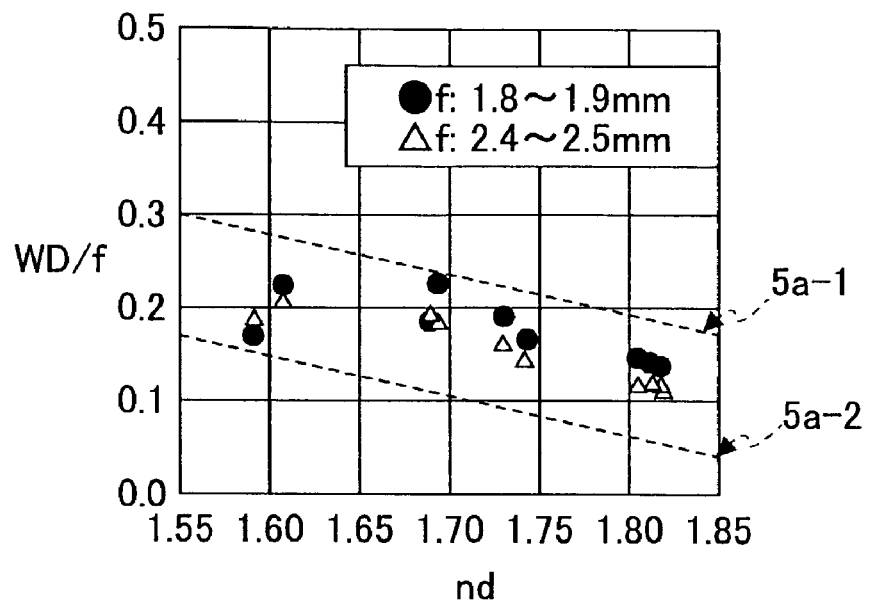
FIGS. 42A and 42B illustrate other conditional formulas according to the present invention.

Then, under the condition where the spherical aberration occurring due to the difference in the substrate thickness and operating wavelength is controlled to the minimum, relation between the working distance WD and refractive index nd has been studied. As a result, on examples in the focal length: f=1.8 through 1.9 mm, black dots shown in FIG. 42A are plotted. Similarly, for other examples in f=2.4 through 2.5 mm and NA: 0.85, white triangles are plotted in FIG. 42A. That is, the relations are included within a zone defined by the straight line 5a-1 and the straight line 5a-2. Since the refractive index depends not only on the refractive nd on the d-line but also on the Abbe's number vd, the relation between WD and nd cannot be determined uniquely. However, it is possible to control the spherical aberration occurring due to the difference in substrate thickness and operating wavelength within the minimum as a result of establishment of a configuration such as to satisfy the condition VI of WD and nd determined as the zone between the straight lines 5a-1 and 5a-2, and, also, to satisfy the condition I concerning vd.

Figure 42B:
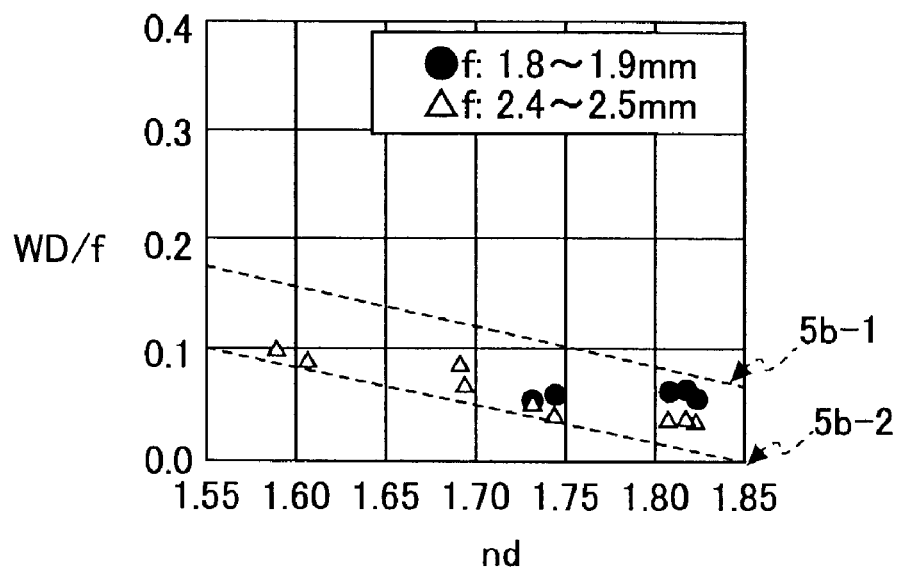

Similarly, the object lens for the optical pickup which satisfies the above-mentioned conditions I through V with the operating wavelength: 407±10 nm and NA: 085±0.05 for the incident side substrate thickness: 0.1 mm is used as an object lens for an optical pickup (for CD) which thus can focus onto an optical recording medium under the condition of the operating wavelength: 780±10 nm and NA: 0.50±0.05, for the incident side substrate thickness: 0.6 mm. Then, under the condition where the spherical aberration occurring due to the difference in the substrate thickness and operating wavelength is controlled to the minimum, relation between the working distance WD and refractive index nd has been studied. As a result, on examples in the focal length: f=1.8 through 1.9 mm, black dots shown in FIG. 42B are plotted. Similarly, for other examples in f=02.4 through 2.5 mm and NA: 0.85, white triangles are plotted in FIG. 42B. That is, the relations are included within a zone defined by the straight line 5b-1 and the straight line 5b-2. Since the refractive index depends not only on the refractive nd on the d line but also on the Abbe's number vd, the relation between WD and nd cannot be determined uniquely. However, it is possible to control the spherical aberration occurring due to the difference in substrate thickness and operating wavelength within the minimum as a result of establishing a configuration such as to satisfy the condition VII of WD and nd determined as the zone between the straight lines 5b-1 and 5b-2, and, also, to satisfy the condition I concerning vd.

Thus, by satisfying the above-mentioned condition VI or VII, it is possible to realize an optical pickup for recording/reproducing/deleing information on DVD or CD of conventional standard type by using an optical pickup in infinite system prepared for the operating wavelength of 407±10 nm and NA: 0.85±0.05, and for the incident side substrate with the thickness of 0.1 mm.

As embodiments 15 and 16 of the present invention, object lenses for optical pickups of so-called compatibility type which can perform recording/reproduction/deletion on both a large-capacity optical recording medium for the operating wavelength: 407 nm, and NA: 0.85, and conventional optical recording medium, such as a DVD or CD will now be described with reference to FIGS. 43A and 44A. Also in each of these figures, similar to the embodiments 13 and 14 described above with reference to FIGS. 38A and 39A, a beam coming from a light source passes through a wavelength selection aperture 1 and an object lens 2, and then, is incident on a recording surface RS through an incident side substrate 3 both of an optical recording medium. Furthermore, a coupling lens 5 is inserted having a concave surface. The incident side substrate 3 has the thickness of 0.6 mm on DVD and of 1.2 mm on CD.

Through the coupling lens 5, the light beam emitted from the light source 4 passes through the opening (diameter of the opening: φ=3.24570 mm) of the wavelength selection aperture 1 as a divergent beam, is incident onto the object lens 2, which then transforms the incident beam into a converging beam. The converting beam is then incident on the recording surface RS through the incident side substrate 3 of the optical recording medium, and, thus, forms a light spot on the recording surface RS.

The aspherical surface on each of the lens surfaces are expressed by the following well-known aspherical surface formula with coordinates X along the optical axis direction, coordinates Y along a direction perpendicular to the optical axis, a paraxial curvature radius R, a cone constant K, high order coefficients A, B, C, D, E, F, . . .

$$X=(Y^2/R)/[1+\sqrt{\{1-(1+K)Y/R^2\}}+AY^4+BY^6+CY^8+DY^{10}+EY^{12}+FY^{14}+GY^{16}+HY^{18}+JY^{20}+\ldots,$$

where R, K, A, B, C, D, . . . , are given, and thereby, the shape is defined.

The embodiment 15 corresponds to a case where the object lens 2 according to the above-described embodiment 13 is applied as an object lens for dealing with DVD. First, on the object lens for the optical pickup, the applied wavelength: 660 nm, NA: 0.65, f: 2.4230 mm, nd: 1.51680, and vd: 64.2. FIG. 45 shows other specific data.

In FIG. 45, "OBJ" means an object point (a semiconductor laser as the light source). The object lens 2 for the optical pickup is used as a finite system in the case of dealing with DVD. The curvature radius is referred to as RDY and the thickness is referred to as THI also in the table of FIG. 45. Moreover, in the table, "STO" stands for the surface on the wavelength selection aperture 1, and the curvature radius RDY thereof is set as "INFINITY", and the thickness THI thereof is set as "0" on the design. In addition, unless any other special notice, the unit of the dimension of length is "mm."

"S2" means the light-source-side surface of the coupling lens 5, while "S3" means the optical-recording-medium-side surface of the same. "S5" means the light-source-side surface of the object lens 2 for the optical pickup, while "S6" means the optical-recording-medium-side surface of the same. The thickness of the object lens 2 in the embodiment 15 is 3.174078 mm, and "0.501457 mm" in thickness indicated on the right-hand side of the curvature radius of the field on S6 shows "working distance WD."

"S7" stands for the light-source-side surface of the incident side substrate 3 of the optical recording medium, and "S8" stands for the recording surface of the same. The separation between these surfaces S7 and S8, i.e., the incident side substrate thickness, is 0.6 mm, nd: 1.516330, and vd: 64.1 on the same. "EPD (entrance pupil diameter)" in the table expresses the diameter (3.24570 mm) of an opening of the wavelength selection aperture 1, and "WL: wavelength" expresses the operating wavelength (660 nm).

Figure 43A:
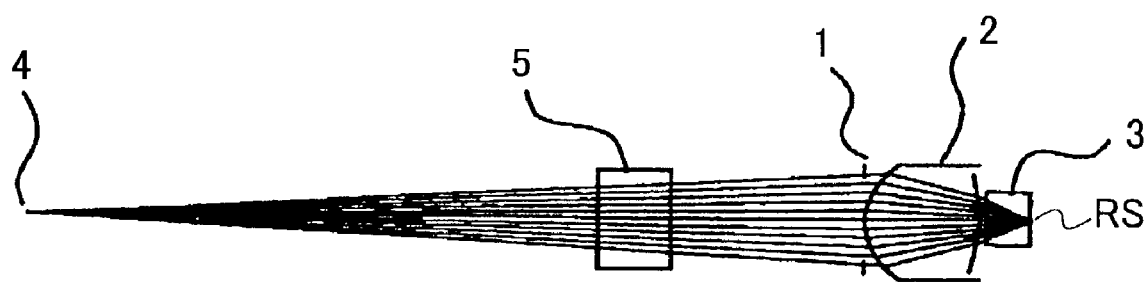
FIGS. 43A and 43B illustrate an embodiment 15 of the present invention.
Figure 43B:
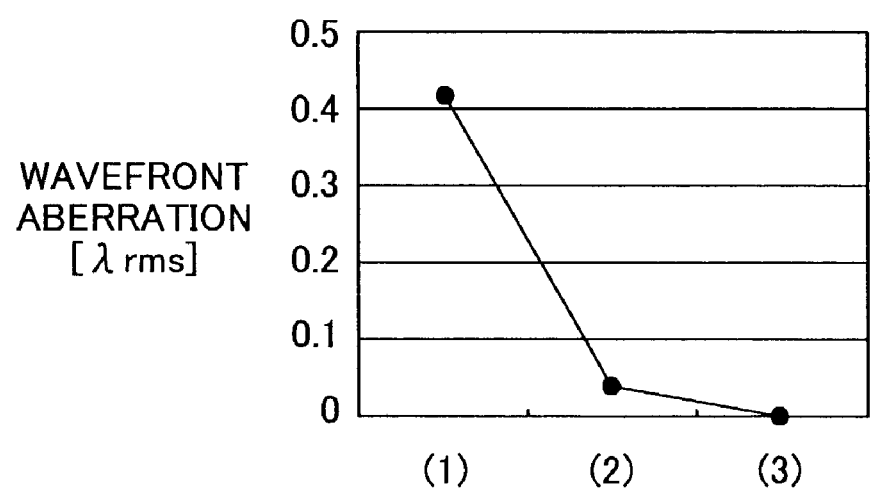

The arrangement of the wavelength selection aperture 1, the object lens 2 for the optical pickup, the incident side substrate 3, the coupling lens 5, and the light source 4 is shown in FIG. 43A. FIG. 43B shows relations between the optical system configuration and wavefront aberration in case the object lens 2 according to the above-described embodiment 13 is used for focusing in the condition of the operating wavelength: 660 nm, substrate thickness: 0.6 mm, and NA: 0.65. Specifically, the respective wavefront aberrations occurring in a case (1) of incidence in an infinite system, in a case (2) of incidence in a finite system, and in a case (3) of incidence in a finite system by using the coupling lens (corresponding to the embodiment 15 shown in FIG. 43A) are shown in the figure. As can bee seen therefrom, according to the embodiment 15, the aberration is very well corrected.

As mentioned above, since the object lens 2 according to the embodiment 15 has the specification, i.e., nd: 1.69350, vd: 53.2, f: 2.4299 mm, and WD: 0.501457 mm, WD, f, nd and vd fall within the respective ranges which satisfy the above mentioned condition I, condition II, and condition VI.

As the embodiment 16 of the present invention, the object lens for the optical pickup has the specification of the operating wavelength: 780 nm for CD, and other specification is shown in FIG. 46 in the same manner as in FIG. 45 for the embodiment 15.

Figure 44A:
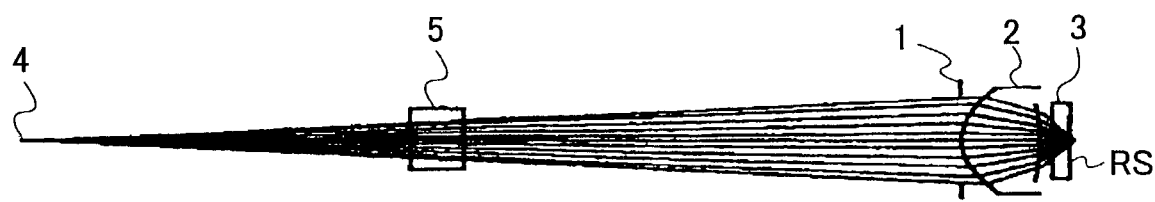
FIGS. 44A and 44B illustrate an embodiment 16 of the present invention.
Figure 44B:
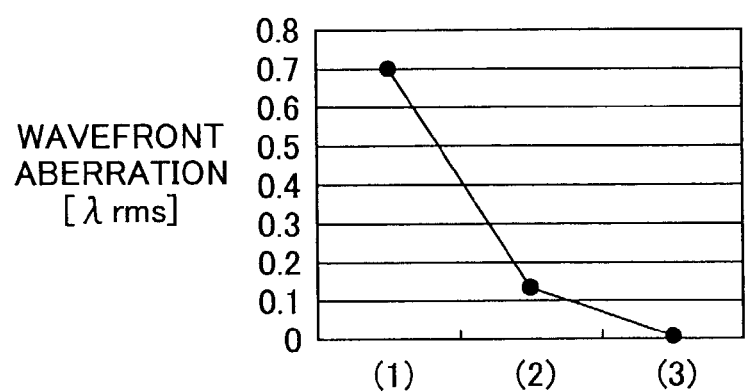

FIG. 44A shows the arrangement of the wavelength selection aperture 1, the object lens 2 for the optical pickup, the incident side substrate 3, the coupling lens 5, and the light source 4 according to the embodiment 16. FIG. 44B shows relations between the optical system configuration and wavefront aberration in case the object lens 2 according to the above-described embodiment 13 is used for focusing in the condition of the operating wavelength: 780 nm, substrate thickness: 1.2 mm, and NA: 0.50. Specifically, the respective wavefront aberrations occurring in a case (1) of incidence in an infinite system, in a case (2) of incidence in a finite system, and in a case (3) of incidence in a finite system by using the coupling lens (corresponding to the embodiment 16 shown in FIG. 44A) are shown in the figure. As can bee seen therefrom, according to the embodiment 16, the aberration is very well corrected.

As mentioned above, since the object lens 2 according to the embodiment 16 has the specification, i.e., nd: 1.69350, vd: 53.2, f: 2.4445 mm, and WD: 0.236004 mm, WD, f, nd and vd fall within the respective ranges which satisfy the above mentioned condition I, condition II, and condition VII.

Furthermore, the embodiments 15 and 16 can be embodied at the same time, i.e., in a common single optical pickup.

Figure 47:
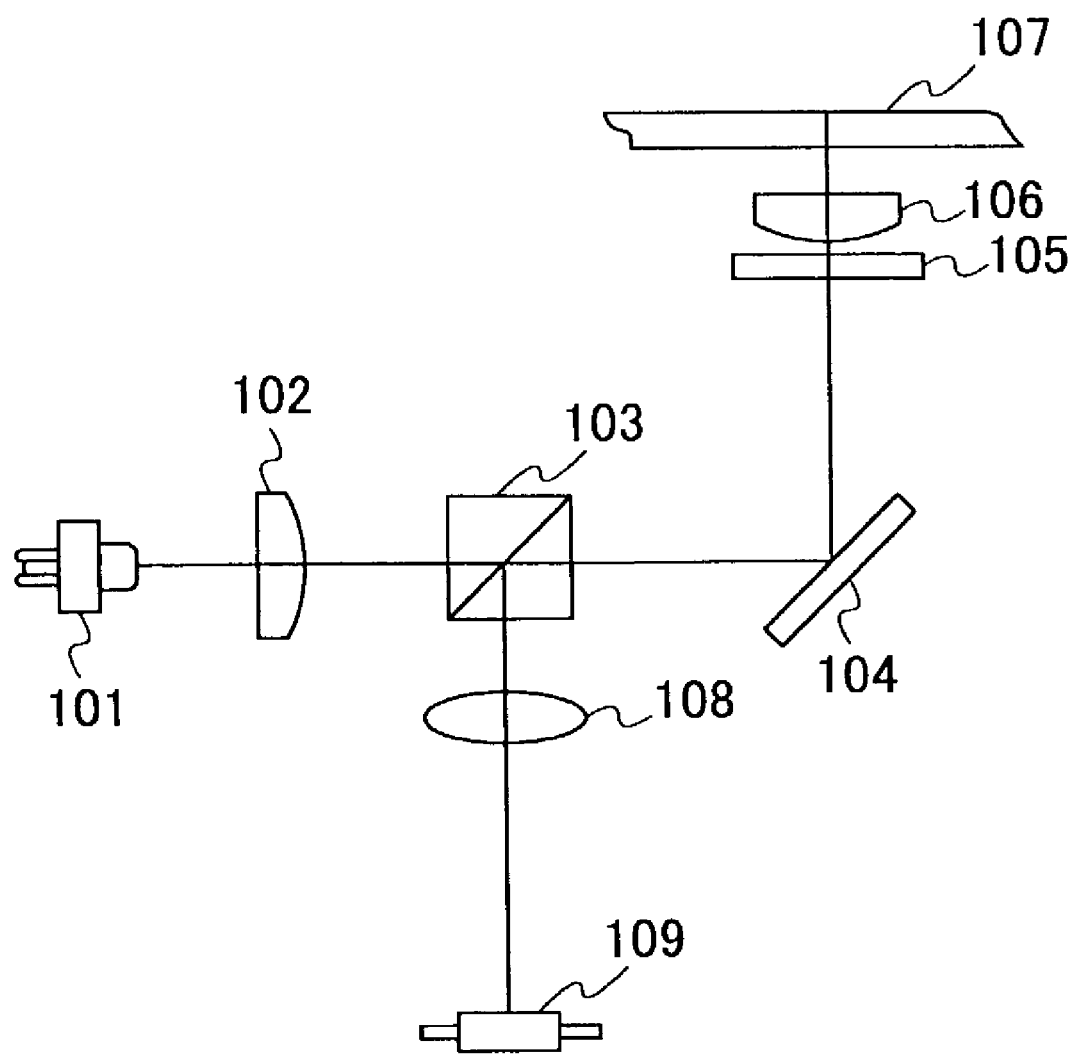
FIG. 47 illustrates an embodiment 17 of the present invention.

FIG. 47 shows a block diagram showing an outline configuration of an optical pickup according to an embodiment 17 of the present invention. In the embodiment 17, the object lens according to the embodiment(s) 13 and/or 14 described above is used.

As shown in the figure, this optical pickup includes a semiconductor laser 101 and collimator lens 102, a polarization beam splitter 103, a deflection prism 104, a ¼-wave plate 105, an object lens 106, a detection lens 108, and a light-receiving device 109.

A laser beam emitted from the semiconductor laser 101 is transformed into a substantially parallel beam by the collimator lens 102, passes through the polarization beam splitter 103, is bent its course by 90 degrees by the deflection prism 104, is transformed into a convergent beam through the object lens 106, is incident onto the optical recording medium 107 (incident side substrate thickness: 0.1 mm), passes through the incident side substrate, and forms a light spot on the recording surface of the optical recording medium.

The ¼-wave board 105 is arranged in front of the object lens 106, and thereby, linear polarization originating from the light source is transformed into circular polarization. A beam reflected by the optical recording medium 107 goes reversely as a return beam, and is incident on the polarization beam splitter 103 through the object lens 106, the ¼-wave plate 105, and the deflection prism 104.

The return beam incident on the ¼-wave plate has circular polarization different from the forward passing occasion, and is transformed therewith into a beam having a linear polarization perpendicular to the polarization direction at the time of forward passing occasion. After that, the beam is reflected by the polarization beam splitter 103. The return beam reflected by the polarization beam splitter 103 is incident on the light-receiving device 109 through the detection lens 108.

The light-receiving device 109 has a light-receiving surface suitably divided according to a relevant servo signal creation method applied. Based on the photoelectric output from each light-receiving division element; a tracking signal and a focusing signal are generated, and a reproduction signal is generated with these signals at an occasion of information reproduction. Moreover, these signals are output towards a control circuit which is not shown.

Figure 48A:
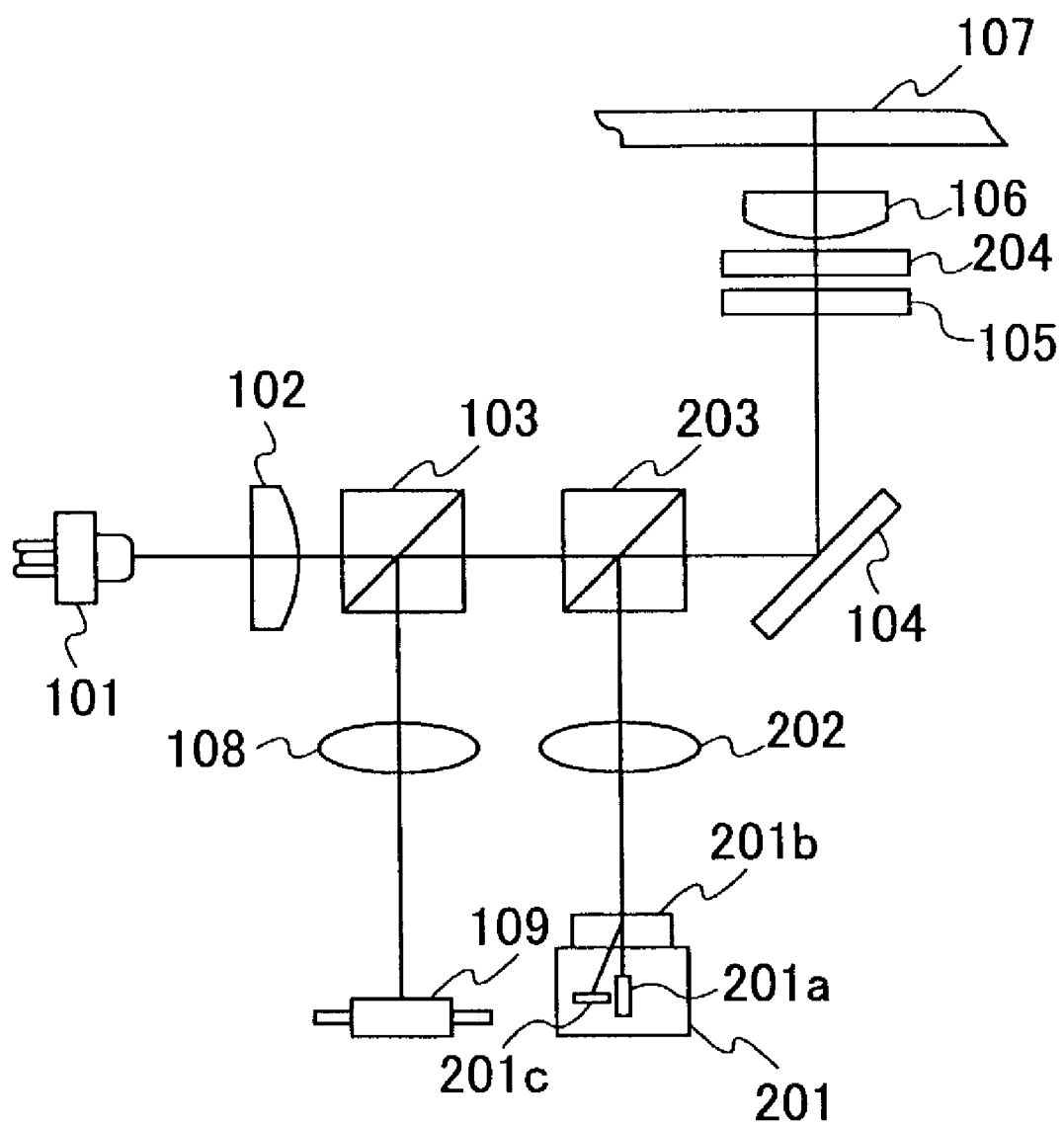
FIGS. 48A through 48C illustrate an embodiment 18 of the present invention.

FIG. 48A is a block diagram showing an outline configuration of an optical pickup according to an embodiment 18 of the present invention. The same reference numerals are given to parts/components corresponding to those or having equivalent functions to those shown in FIG. 47, and duplicated description will be omitted.

The object lens described above according to the embodiment(s) 15 and/or 16 is used in this embodiment 18. The optical pickup shown in FIG. 48A can deal with not only a large-capacity optical recording medium having the specification of the operating wavelength: 407 nm, and NA: 0.85, but also a DVD-type optical recording medium of the operating wavelength: 660 nm and NA: 0.65.

A case of dealing with the larger-capacity optical recording medium of the operating wavelength: 407 nm and NA: 0.85 will now be described first. A semiconductor laser 101 with the wavelength of 407 nm as a light source emits a divergent beam with a linear polarization which passes through a collimator lens 102 and is then transformed into an approximately parallel beam. After that, the beam passes through a polarization beam splitter 103 and a dichroic prism 203, then, after that, the beam course is deflected 90 degrees by the deflection prism 104, and, the beam is transformed into a beam of circular polarization by a ¼-wave plate 105. After that, the beam passes through a wavelength selection aperture 204, and then, is incident onto an object lens 106, and it is condensed so as to form a minute spot on an optical recording medium 107. Information recording, reproduction, or deletion is performed with this spot.

A beam reflected by the optical recording medium 107 passes through the object lens 106 and the ¼-wave plate 105, it thus has a circular polarization different from the forward passing case, and, then, is transformed again into an approximately parallel beam. After that, the beam is reflected by the polarization beam splitter 103, is transformed into a converging beam by a detection lens 108, and then reaches a light-receiving device 109. An information signal and a servo signal are detected by means of the light-receiving device 109.

Next, by using the same system shown in FIG. 48A, a case of dealing with a DVD-type optical recording medium with the operating wavelength: 660 nm and NA: 0.65 will now be described. In recent years, generally, a hologram unit has been used in an optical pickup for DVD in which light-emission/reception devices are installed into one can, and, by using the hologram unit, a beam is separated.

Figure 48B:
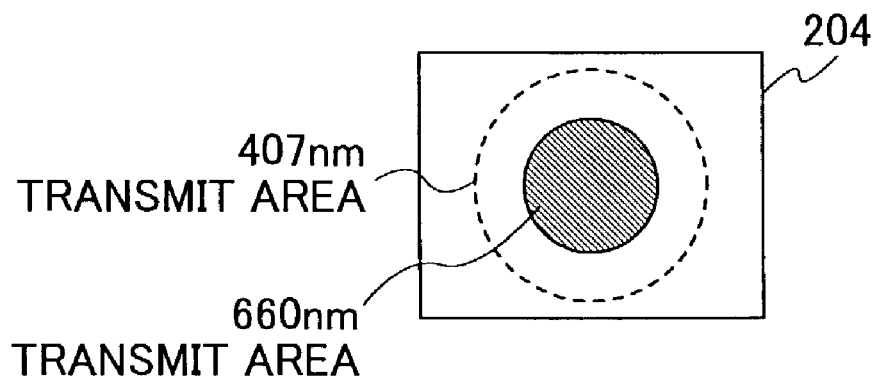
Figure 48C:
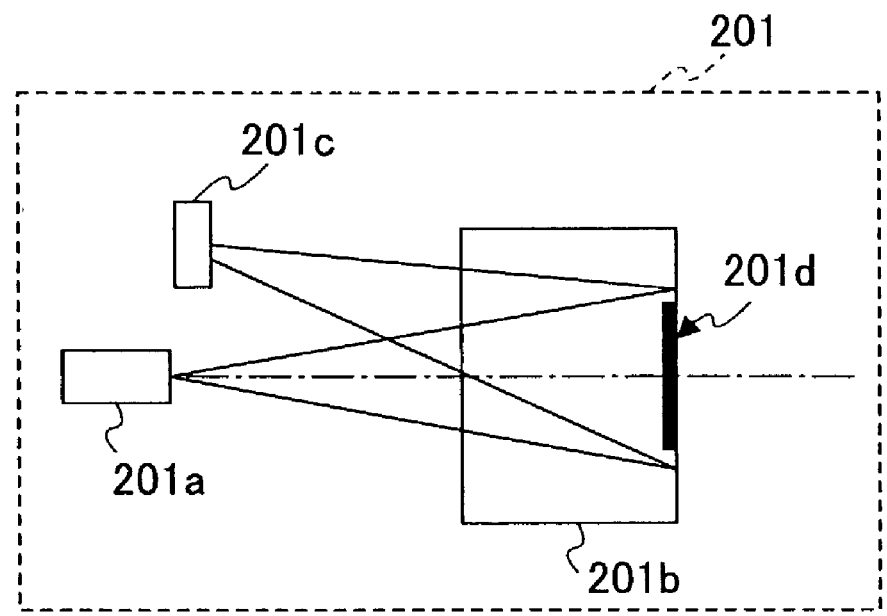

As shown in FIG. 48C, such a hologram unit 201 includes a chip of semiconductor laser 201a, a hologram device 201b, and a light-receiving device 201c, in an integrated configuration. A divergent beam with the wavelength of 660 nm emitted from the semiconductor laser 201a of this hologram unit 201 passes through the hologram device 201b. Then, as shown in FIG. 48A, the beam undergoes coupling by means of the coupling lens 202. Then, it is reflected by means of the dichroic prism 203 into the polarization prism 104, which deflects the beam course 90 degrees. After that, the ¼-wave plate transforms the beam into a beam of circular polarization, which then passes through the wavelength selection aperture 204, and is incident on the optical recording medium 107 through the object lens 106. Then, it is condensed so as to form a minute spot thereon. Information reproduction/recording/deletion is performed by this spot onto the optical recording medium 107.

In particular, the wavelength selection aperture 204 controls the passing beam into NA: 0.65 on a light with the wavelength: 660 nm. That is, as shown in FIG. 48B, the wavelength selection aperture 204 acts as an opening control device having a concentric circular shape. Then, this device does not control a light with the wavelength: 407 nm, but controls a light with the wavelength: 660 nm light so as to pass it only partially by a central part thereof for achieving NA: 0.65.

A beam reflected by the optical recording medium 107 is deflected by the deflection prism 104, is reflected by the dichroic prism 203, and is transformed into a convergent beam by means of the coupling lens 202. After that, it is diffracted by the hologram device 201b shown in FIG. 48C into the light-receiving device 201c contained in a same can containing the semiconductor laser 201a. The hologram device 201b includes a detection hologram 201d which is detected by the light-receiving device 201c. Thus, an information signal and a servo signal are detected by means of the light-receiving device 201c.

Figure 49A:
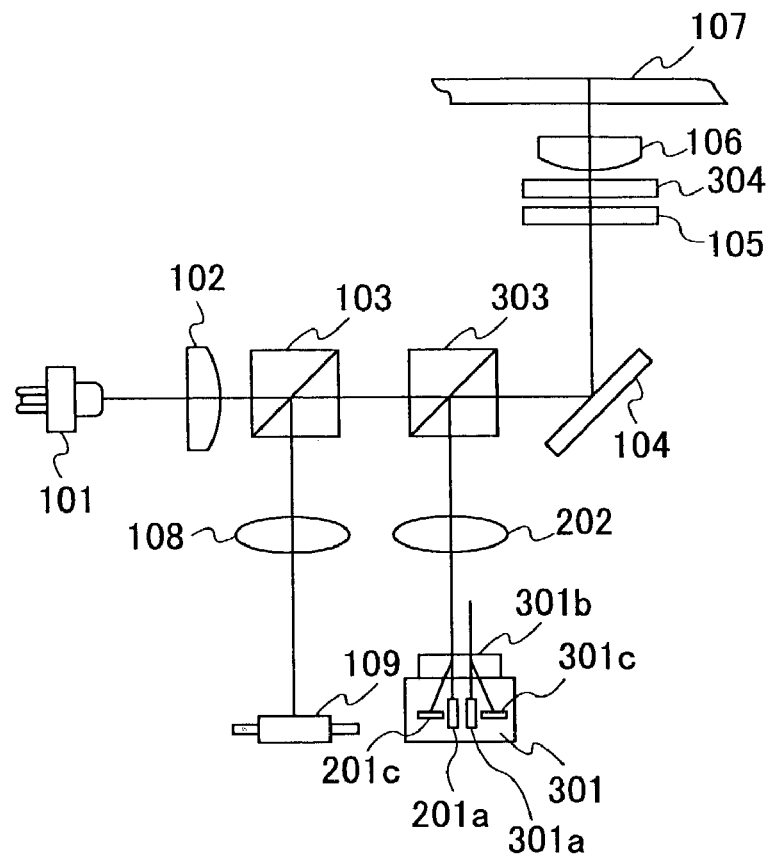
FIGS. 49A and 49B illustrate an embodiment 19 of the present invention.

FIG. 49A is a block diagram showing an outline configuration of an optical pickup in an embodiment 19 of the present invention. This optical pickup according to the embodiment 19 can deal not only with a large-capacity optical recording medium with the operating wavelength: 407 nm and NA: 0.85, but also a DVD-type optical recording medium of the operating wavelength: 660 nm and NA: 0.65, and also, a CD-type optical recording medium of the operation wavelength off 780 nm and NA: 0.50.

Figure 49B:
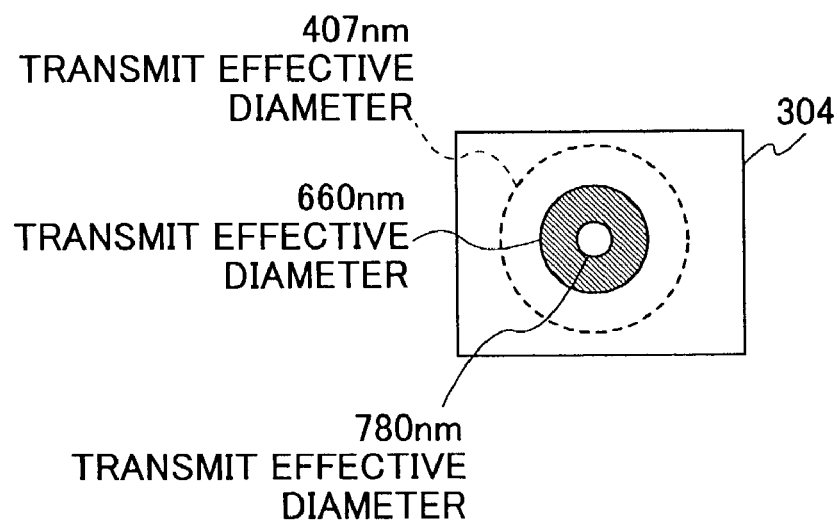

Different points from the above-described embodiment 17 will now be described. This pickup has two chips of semiconductor lasers 201a and 301a different in their wavelengths for DVD and CD, respectively. Furthermore, this pickup has two light-receiving devices, i.e., light-receiving devices 201c and 301c for receiving light reflected by the respective different optical recording media, i.e., DVD and CD. Further, a hologram unit 301 includes a hologram device 301b for focusing light reflected by the DVD and CD onto these two light-receiving devices 201c and 301c, respectively. Furthermore, a wavelength selection aperture 304 shown in FIG. 49B, which controls transmission light of the wavelengths of 660 nm and 780 nm so as to achieve NA of 0.65 and 0.50 in case of dealing with DVD and CD, respectively. The beam passing courses and so forth are the same as those in the case of the above-described embodiment 18.

Figure 50:
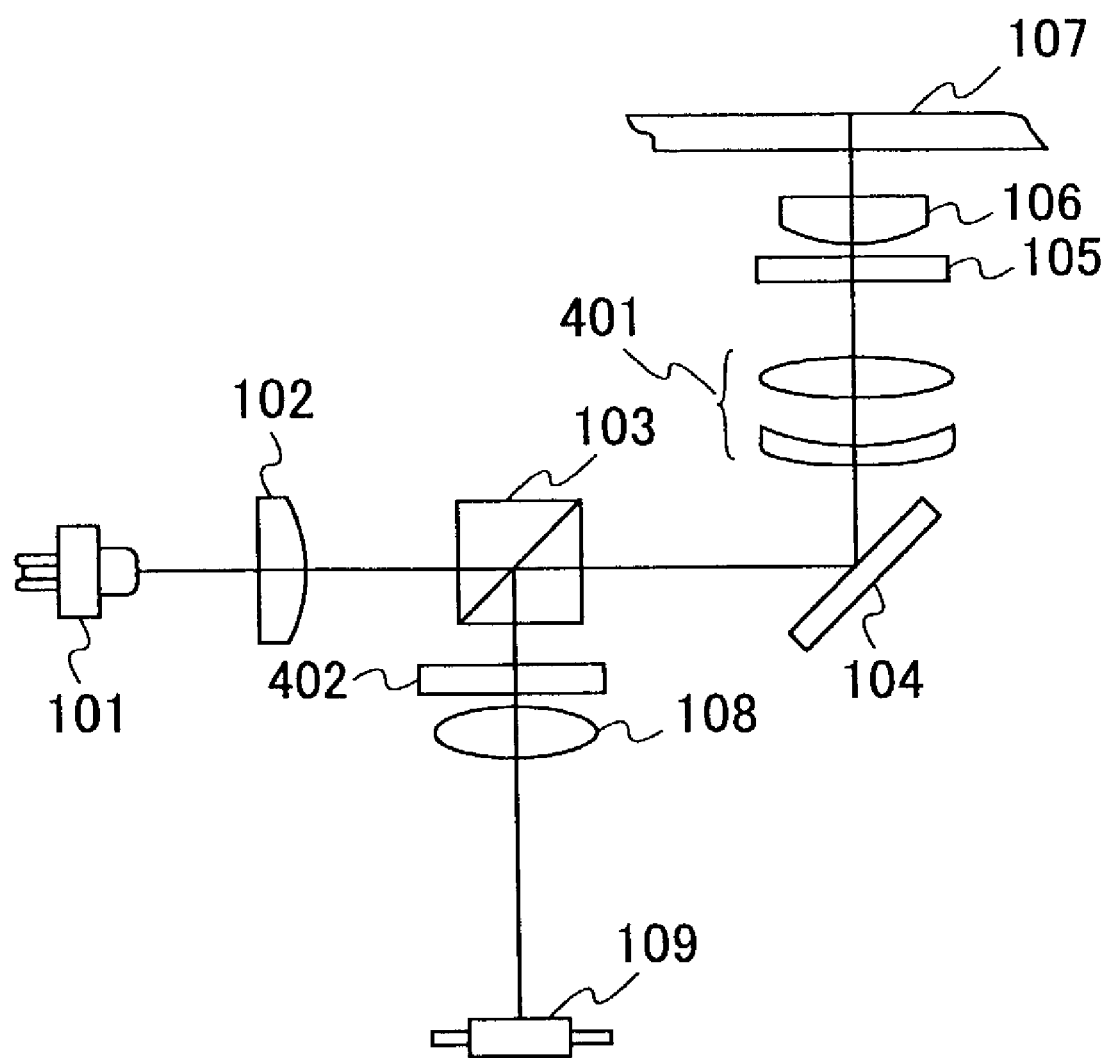
FIG. 50 illustrates an embodiment 20 of the present invention.

FIG. 50 is a block diagram showing an outline configuration of an optical pickup in an embodiment 20 of the present invention. A different point from the above-described embodiments 17 through 19 is a correction device 401 to correct even aberration component which originates in manufacture error of an object lens is provided.

As a manufacture error of a glass-mold-type lens of a both-side-aspherical type, a paraxial curvature radius deviation on each side, an aspherical shape deviation on each side, a thickness deviation, variation in the lens material, a shift between each surface, and a tilt between each side are expected. Among these, the variation in a paraxial curvature radius on each side, thickness deviation, and material variation can act as main factors of the even aberration. If there occurs such an even aberration, the shape of the light spot formed on the recording surface may deteriorate.

In the optical pickup with an even aberration detection device in the embodiment 20 of the present invention, as shown in FIG. 50, a semiconductor laser 101 having an emission wavelength: 407±10 nm is used. As an object lens 106, any one of those described above as the embodiments 13 and 14 is used.

As shown in FIG. 50, an even aberration correction device 401 corrects the even aberration, while the even aberration detraction device 402 detects a lens manufacture error.

In case a lens manufacture error occurs, the even aberration occur accordingly, and the shape of the light spot formed on the recording surface deteriorates. The thus-occurring aberration makes the wavefront of return beam distorted, and also, an aberration occurs on the beam going toward the light-receiving device 109 through the detection lens 108.

FIG. 5A shows this state, and when the even aberration occurs in the return beam incident onto the detection lens 108 from the left-hand side in the figure, delay of wavefront occurs symmetrically with respect to the optical axis to the standard wavefront of the return beam. As a result, the position at which the thus-delayed wavefront is focused is defocused with respect to the focus point of the standard wavefront. Then, it is possible to know the wavefront occurrence state by taking out the difference of the delayed wavefront and the advanced wavefront, i.e., by detecting the focal state.

Figure 51A:
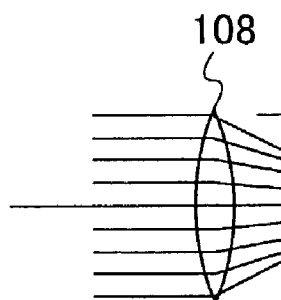
FIGS. 51A through 51E illustrate a state of wavefront aberration correction according to the embodiment 20.
Figure 51B:
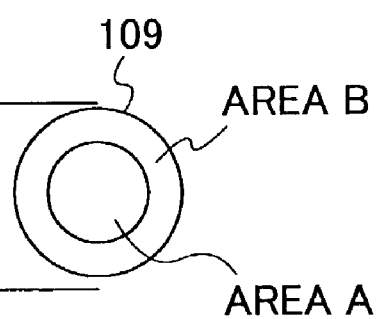

For example, as the aberration detecting device 402 shown in FIG. 50, a beam course separating device such as a hologram device, a beam splitter, or the like, or timing control device such as a light crystal shutter, and, also, a light-receiving device as shown in FIG. 51B having its light-receiving area divided into areas A and B. are used. By analyzing the photo detecting outputs of the respective areas A and B, the even aberration can be detected.

Since the even aberration detected by the aberration detection device 402 originates in the manufacture error of the lens, the lens manufacture error can be known by detecting the aberration on the return beam as mentioned above. It becomes then possible to correct the even aberration based on the thus-detected lens manufacture error, and thus to form a proper light spot on the recording surface. According to the embodiment 20, the aberration detected is given as an aberration signal acquired by appropriately combining the photoelectric output signals from the respective areas A and B of the light-receiving device 109.

Moreover, the aberration correction device 401 in the embodiment 20 includes two lenses and separation adjustment device (not shown) to adjust the separation between these lenses. Two lenses are a positive lens and a negative lens. Although the negative lens is arranged at the light source side in the example shown in the figure, the positive lens may instead be disposed at the light source side.

By changing the separation between the positive and negative lenses of the aberration correcting device 401, it is possible to cause an even aberration to occur in the beam passing through the aberration correcting device 401 toward the object lens 106. Then, the thus-created even aberration is used for canceling out the even aberration occurring due to the manufacture error of the object lens 106.

Figure 51C:
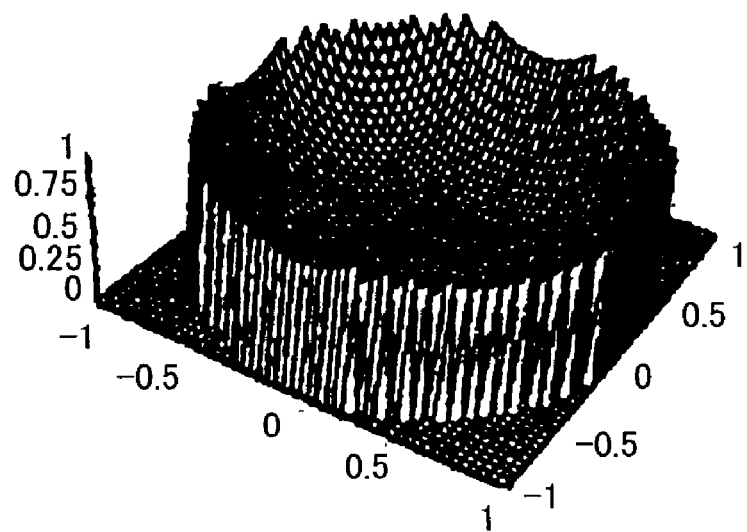
Figure 51D:
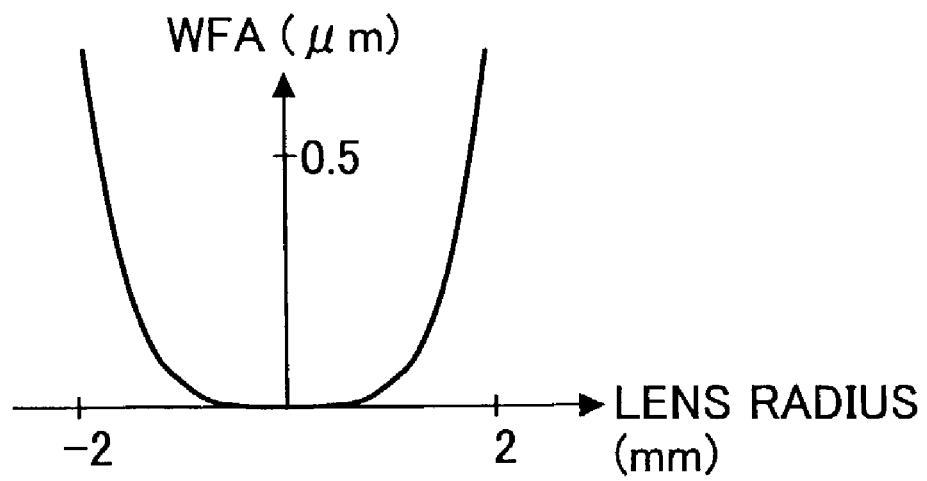
Figure 51E:
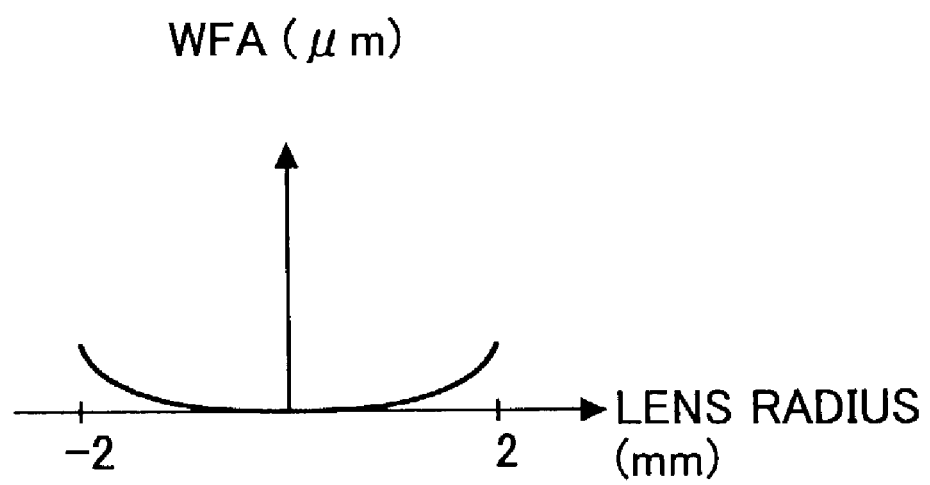

It is assumed that the wavefront aberration which gives the even aberration which originates in the manufacture error of the object lens 106 detected by the aberration detection device 402 is as shown in FIG. 51C. FIG. 51D shows this wavefront aberration as a 2-dimensional curve. The separation between the positive and negative lenses is controlled on the beam incident onto the object lens 106 from the light source side so that the divergent state in the beam be controlled appropriately. Thereby, as shown in FIG. 51E, the wavefront aberration is remarkably corrected.

Specifically, for this purpose, beforehand the separation between the two lenses in the aberration correction device 401 is set so that the above-mentioned aberration signal becomes 0 in case the object lens 106 has an approximately design median. Then, in case an aberration occurs on the actual object lens 106 assembled, the lens separation should be controlled so that the aberration signal become 0.

In addition, either one of each of both of the positive lens and the negative lens of the aberration correction devices 401 may have a configuration of a plurality of lenses.

Figure 52A:
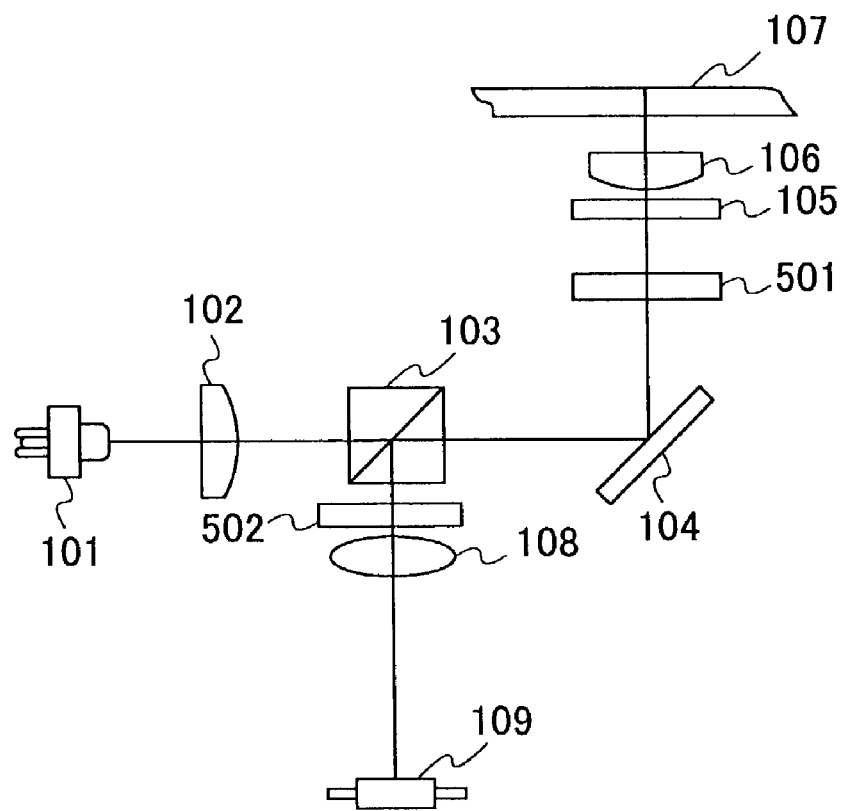
FIGS. 52A and 52B illustrate an embodiment 21 of the present invention.

FIG. 52A is a block diagram showing an outline configuration of an optical pickup in an embodiment 21 of the present invention. A point in that the embodiment 21 differs from the above-descried embodiment 20 is a point that an even aberration correction device 501 includes a liquid crystal device and a voltage control device (not shown) to drive this.

Figure 52B:
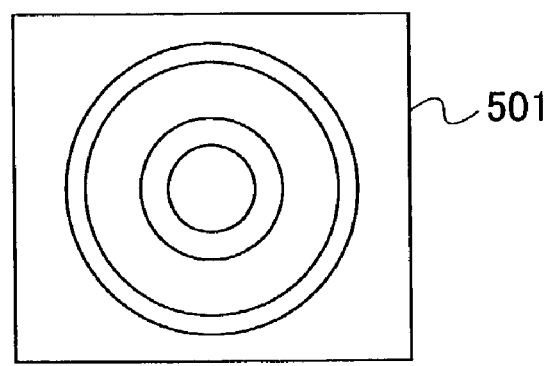

As shown in FIG. 52B, in the liquid crystal device, at least one transparent electrode is divided into concentric circular zones, and a configuration is made therein such that a voltage can be applied independently between the electrode portion of each concentric circular zone and a common electrode. Thereby, the refractive index n of the liquid crystal of each electrode portion can be freely controlled in a range from n1 to n2 by controlling this voltage.

By controlling the refractive index n, it is possible to create a beam path length difference: $\Delta n \cdot d$ ($\Delta n$ stands for refractive index difference, and d stands for the cell thickness of the liquid crystal) for the beam part passing through each zone of the liquid crystal device. Thus, it is possible to create phase difference: And ($2\pi/\lambda$), where $\lambda$ stands for the operating wavelength.

It is assumed that wavefront aberration which gives the even aberration which originates in the manufacture error of the object lens 106 detected by the aberration detection device 502 is as shown in FIG. 51C. The solid line of the upper portion of FIG. 53A shows this wavefront aberration as a 2-dimensional curve.

Figure 53A:
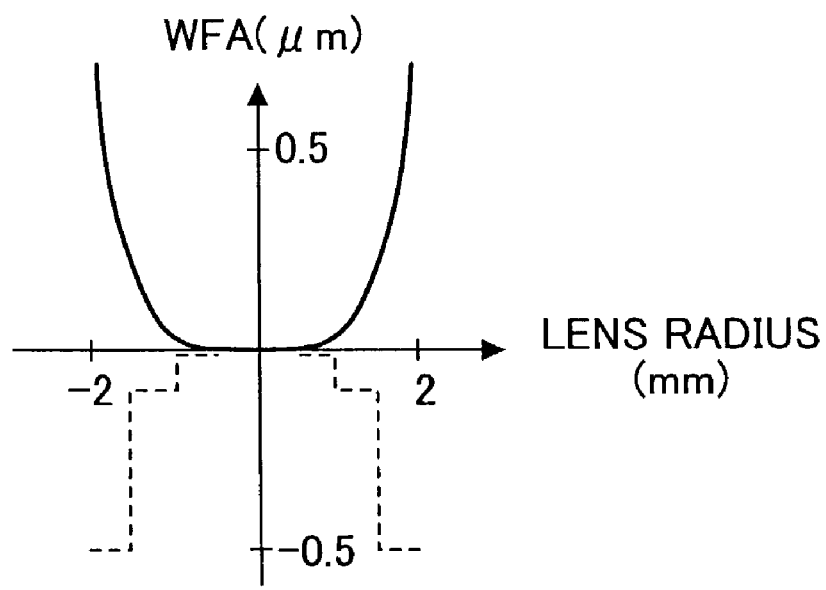
FIGS. 53A and 53B illustrate a state of wavefront aberration correction according to the embodiment 21.
Figure 53B:
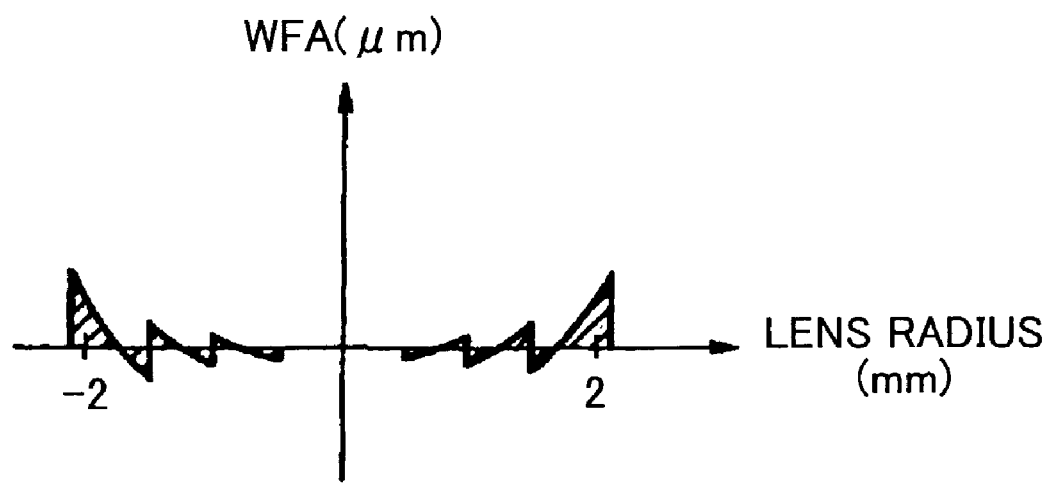

Then, with respect to this wavefront aberration, the voltage applied to each concentric circular zone electrode portion of the liquid crystal device is adjusted so that the phase difference shown in the dashed line of the lower portion of FIG. 53A be given to the beam incident onto the object lens 106 from the light source side. Thereby, the above-mentioned wavefront aberration can be cancelled out by the thus-created delay in the wavefront on each portion of the beam which passes through the liquid crystal device. FIG. 53B shows the sum total of the solid line (wavefront aberration) and the dashed line (delay in the wavefront by the liquid crystal device) shown in FIG. 53A, i.e., the wavefront aberration after the correction. As can be seen clearly therefrom, the wavefront aberration is remarkably corrected.

In addition, a spherical aberration may occur accompanying a deviation of the substrate thickness of an optical recording medium in an optical pickup which carries out recording, reproduction, or deletion on an optical recording medium with the operating wavelength: 407±10 nm and NA: 0.85. That is, the spherical aberration accompanying a deviation of the substrate thickness becomes large in proportion to the first power of the wavelength and to the forth power of NA, while controlling manufacture error within ±10 micrometers in the substrate thickness is unrealistic on the actual optical pickup. Accordingly, it is necessary to correct the aberration accompanying a thickness deviation in the optical recording medium. Japanese patent No. 2502884, Japanese laid-open patent application No. 2000-131603, Japanese patent No. 3067665, Japanese laid-open patent application No. 9-128785, etc. disclose devices to perform correction on such an aberration due to substrate thickness deviation. Then, with utilization of such a known scheme, it is possible to correct the even aberration resulting from the above-mentioned lens manufacture error, together with applying a spherical aberration correction device for performing the above-mentioned substrate thickness error correction.

In the above-described embodiments 20 and 21, the configuration is described in which the aberration detection signal is created from the light-receiving device and is used as a feedback signal for the aberration correction devices 401, 501, respectively. However, it is also possible to create a configuration in which an ideal setting in the aberration correction device is determined appropriately with observation of a beam transmitted by the object lens beforehand at a time of assembling work.

Moreover, a timing of correction of aberration resulting from a lens manufacture error may be determined such as that this correction operation is performed at a time of a power supply start, or is performed together with correction on the spherical aberration accompanying a thickness deviation of an optical recording medium at a time of loading of an optical recording medium. Alternatively, the correction operation may be performed at any time during recording, reproducing, or deleting operation performed on an optical recording medium.

Moreover, the above-mentioned aberration correcting device may also be inserted in a beam course in an optical pickup having compatibility with DVD or CD shown in FIG. 48A or 49A.

Figure 54:
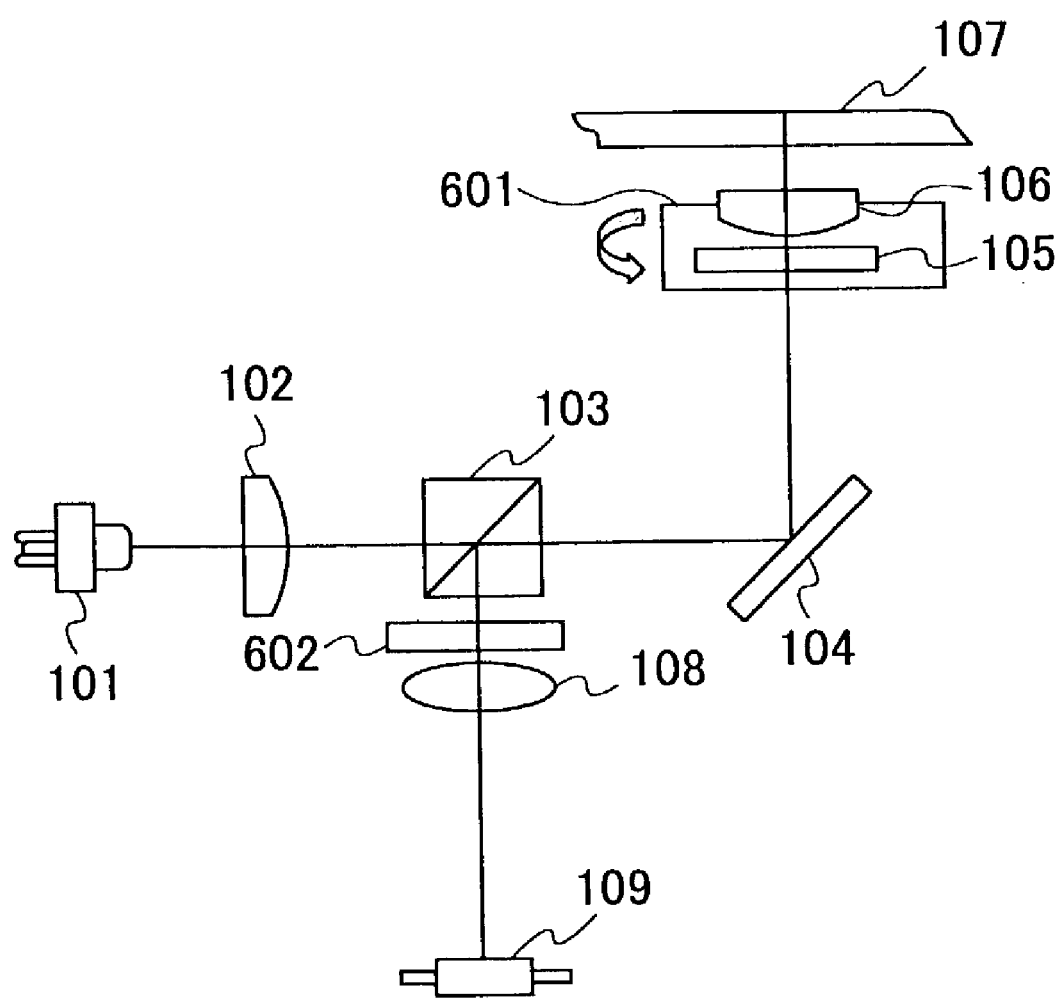
FIG. 54 illustrates an embodiment 22 of the present invention.

FIG. 54 is a block diagram showing an outline configuration of an optical pickup in an embodiment 22 of the present invention. A different point of the embodiment 22 from the above-described embodiments 17-19 is a point of including a correction device 601 to correct an odd aberration component which originates in manufacture error in an object lens.

As a manufacture error of a glass mold lens with double-side aspherical surfaces, a paraxial curvature radius deviation on each side, an aspherical surface shape deviation on each side, a thickness deviation, variation in the lens material, a shift in distance between both sides, and tilt between both sides are expected. Among these, the shift in distance between both sides and tilt between both sides may become main factors of the odd aberration. When there is the odd aberration, the shape of the light spot formed on the recording surface may deteriorate.

In the embodiment 22, as shown in FIG. 54, a semiconductor laser 101 has an emission wavelength: 407±10 nm, and the object lens 106 described above used in either of the embodiments 13 and 14 is used.

In FIG. 54, there are provided with an odd aberration detection device 601, and an odd aberration correction device 602 which detects a lens manufacture error.

As mentioned above, when a lens manufacture error exists, the odd aberration occurs, and the shape of the light spot formed on the recording surface deteriorates. Thus, thus-occurring aberration distorts the wavefront of the return beam, and an aberration occurs in a beam directed toward the light-receiving device 109 through the detection lens 108.

FIG. 55A shows this state, and when the odd aberration occurs in the return beam incident onto the detection lens 108 from the left-hand side in the figure, "delay in wavefront" occurs reverse-symmetrically with respect to the optical axis from the reference wavefront of the return beam. Further, imbalanced side robes occur at positions at which the delayed wavefront is focused with respect to the positions at which the reference wavefront is focused. Then, it is possible to detect the situation of wavefront aberration by detecting the difference between the delayed wavefront and the advanced wavefront, i.e., by detecting the focal state.

For example, aberration included in the return beam is detectable by analyzing the light-receiving output of each area A and B shown in FIG. 55B, by using a beam separating device such as a hologram device, a beam splitter, or a device to shift an incidence timing such as a liquid crystal shutter, together with a light receiving device 109 having divided light-receiving areas A and B as shown in the figure.

Since the odd aberration detected by the aberration detection device 502 originates in the manufacture error of the lens, it is possible to know the lens manufacture error by detecting the aberration on the return beam. This is because of a correspondence relation thus occurring between the lens manufacture error and the thus-detected aberration on the return beam. It becomes possible to correct the odd aberration based on this lens manufacture error, and to form a proper light spot on the recording surface. According to the embodiment 22, the aberration detected is given as an aberration signal acquired by combining suitably the photoelectric output signals from respective areas A and B of the light-receiving device 109.

The aberration correction device 601 in the embodiment 22 shown in FIG. 54 includes an object lens orientation adjustment device of a 4-axis actuator for controlling the orientation/inclination of the optical axis of the object lens with respect to the optical-axis of the other optical systems controllable in 2-axis tilt control in addition to 2-direction control for focus and tracking.

An odd aberration is created in the beam transmitted by the aberration correction device 601 toward the object lens 106 as a result of the 4-axis actuator of the aberration correction device 601 changing the orientation of the object lens. Then, what is necessary is to cancel out the odd aberration occurring in connection with the manufacture error of the object lens by the thus-created odd aberration.

Figure 55D:
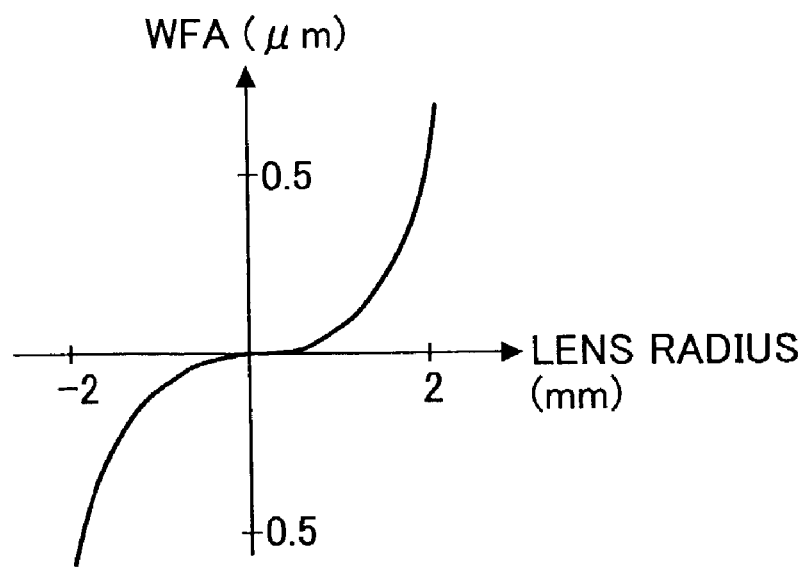

It is assumed that a wavefront aberration which gives the odd aberration which originates in the manufacture error of the object lens 106 detected by the aberration detection devices 602 is such as that shown in FIG. 55C. FIG. 55D shows this wavefront aberration as a 2-dimensional curve.

Figure 55E:
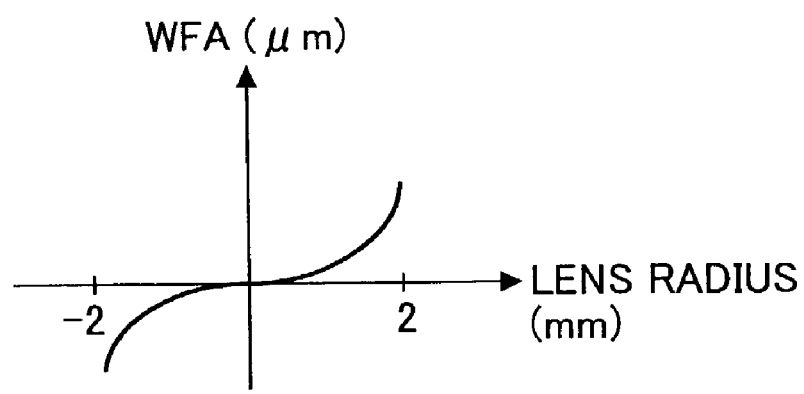

Then, the orientation of the object lens is changed with respect to the beam incident from the light source side toward the object lens 106. Thereby, the wavefront aberration on the beam is well corrected as shown in FIG. 55E.

Specifically, for this purpose, beforehand the orientation of the object lens is set so that the above-mentioned aberration signal becomes 0 in case the object lens 106 has an approximately design median. Then, in case an aberration occurs on the actual object lens 106 assembled, the object lens orientation should be controlled so that the aberration signal become 0.

The aberration correction device may be, instead, of a 3-axis actuator of focus, tracking and another one axis. In this case, the correction performance may be degraded in comparison to the case of employing the 4-axis actuator.

Figure 56A:
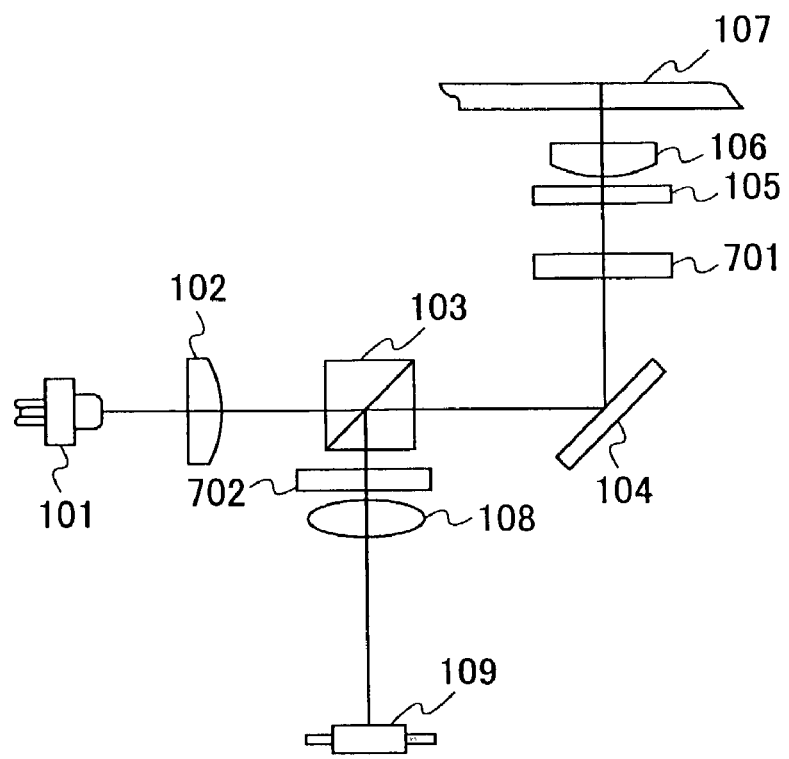
FIGS. 56A and 56B illustrate an embodiment 23 of the present invention.

FIG. 56A is a block diagram showing an outline configuration of an optical pickup in an embodiment 23 of the present invention. A point that the embodiment 23 differs from the above-described embodiment 22 is a point that an odd aberration correction device 701 includes a liquid crystal device and a voltage control device (not shown) to drive this.

Figure 56B:
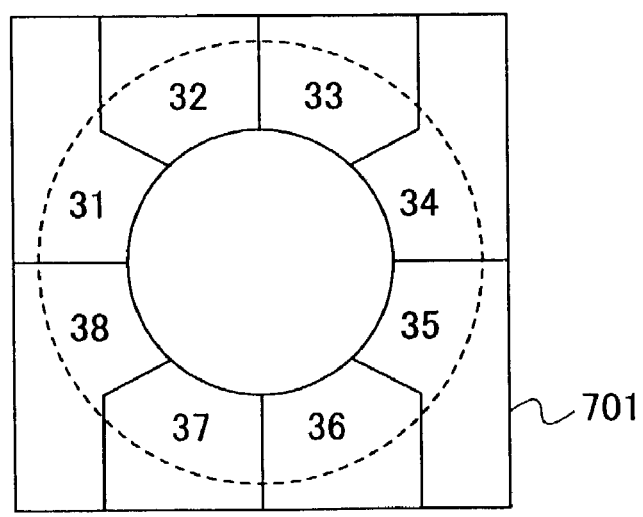

As shown in FIG. 56B, the liquid crystal device can change the refractive-index n of the liquid crystal of each electrode portion free in a range from n1 through n2. Specifically, at least one transparent electrode is divided rotational-symmetrically into the electrode portions 31-38. Then, by controlling the voltage applied thereto, the refractive index of each portion can be controlled as mentioned above.

As the refractive index n is changed, phase difference: $\Delta n \cdot d$ ($2\pi/\lambda$) can be created on a beam part which passes through each zone where $\lambda$ stands for the operating wavelength, by creating the beam path difference: $\Delta n \cdot d$ ($\Delta n$ stands for a refractive-index change amount, and d stands for the cell thickness of the liquid crystal).

It is assumed that a wavefront aberration which gives the odd aberration which originates in the manufacture error of the object lens 106 detected by the aberration detection devices 602 is such as that shown in FIG. 55C. FIG. 55D shows this wavefront aberration as a 2-dimensional curve.

Figure 57A:
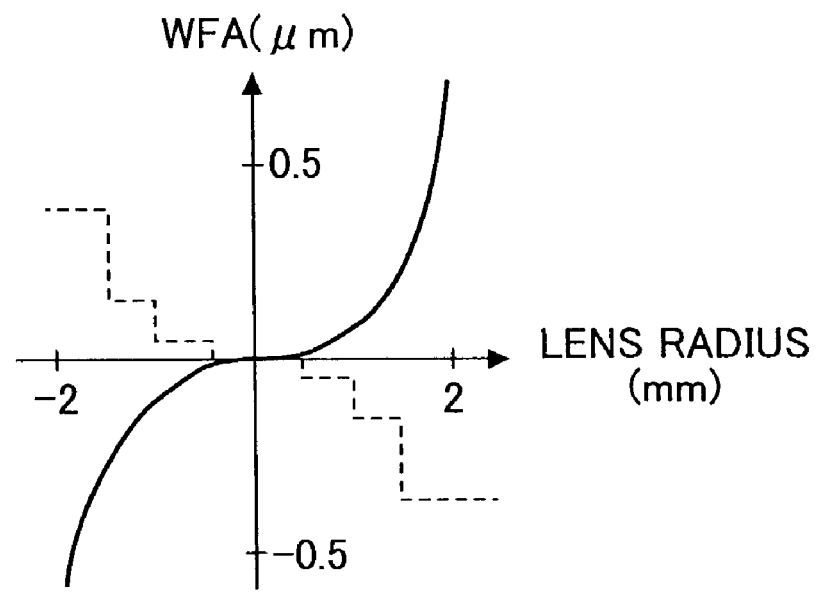
FIGS. 57A and 57B illustrate a state of wavefront aberration correction according to the embodiment 23.
Figure 57B:
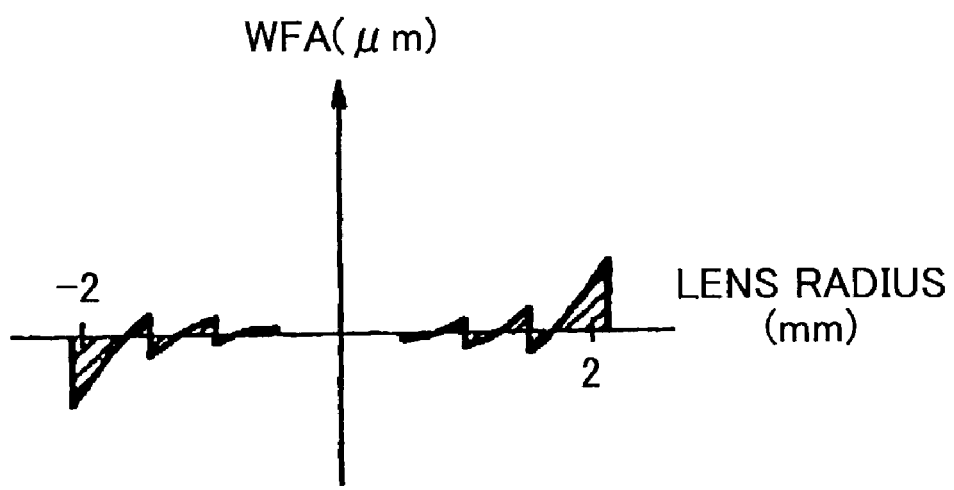

Then, the voltage applied to each portion of the liquid crystal electrode is controlled so that the phase difference shown by a broken curve shown in FIG. 57A is created in the beam incident from the light source side toward the object lens 106. Thereby, it is possible to cancel out the above-mentioned wavefront aberration thanks to the thus-created delay on a beam part passing through each zone of the liquid crystal device. Then, the wavefront aberration on the beam is well corrected as shown in FIG. 57B in comparison to the original one indicated by the solid curve shown in FIG. 57A.

There may occur a coma aberration accompanying a tilt deviation of an optical recording medium in an optical pickup. Generally, it is necessary to expect around ±1 degrees as a tilt occurring at a time of operation in the substrate of the optical recording medium. However, such a tilt may cause the coma aberration which cannot be allowed. Accordingly, it is necessary to correct the coma aberration accompanying such a tilt of the optical recording medium. Japanese laid-open patent applications Nos. 10-91990 and 2001-110075, Japanese patent No. 3142251, Japanese laid-open patent application No. 9-128785, etc. disclose devices to correct such a coma aberration accompanying the tilt. Therefore, it is possible that such a known coma aberration correcting device is incorporated into the optical pickup together with the above-mentioned odd aberration correcting device to correct the above-mentioned odd aberration resulting from the lens manufacture error.

In the above-described embodiments 22 and 23, the configuration is described in which the aberration detection signal is created from the light-receiving device and is used as a feedback signal for the aberration correction devices 601, 701, respectively. However, it is also possible to create a configuration in which an ideal setting in the aberration correction device is determined with observation of a beam transmitted by the object lens beforehand at a time of assembling work.

Moreover, a timing of correction of aberration resulting from a lens manufacture error may be determined such as that this correction operation is performed at a time of a power supply start, or is performed together with correction on the spherical aberration accompanying a thickness deviation of an optical recording medium at a time of loading of an optical recording medium. Alternatively, the correction operation may be performed at any time during recording, reproducing, or deleting operation performed on an optical recording medium.

Moreover, the above-mentioned aeration correcting device may also be inserted in a beam course in an optical pickup having compatibility with DVD or CD shown in FIG. 48A or 49A.

Especially, the coma aberration accompanying a tilt on the substrate of an optical recording medium becomes larger in proportion to the −1st power of the operating wavelength, to the 1st power of the substrate thickness, and to the 3rd power of NA. However, the above-mentioned coma aberration correcting device is not necessary for CD, but is necessary for DVD, generally. Then, there is a possibility that it becoming unnecessary in the case of "operating wavelength: 407 nm, substrate thickness: 0.1 mm, and NA: 0.85" as the coma aberration may not cause series problem in comparison to the case of DVD.

In order to provide a configuration suitable to the above-mentioned situation, in the configuration shown in FIG. 48A which can deal not only with DVD but also with a new optical recording medium of operating wavelength: 407 nm, substrate thickness; 0.1 mm and NA: 0.85, the aberration correcting device is configured such that it functions as the coma aberration correcting device for correcting a coma aberration occurring due to a tilt of the substrate of the optical recording medium in dealing with DVD while it functions as the lens-manufacture-error-originating aberration correcting device in case of dealing with the new optical recording medium of operating wavelength: 407 nm, substrate thickness:0.1 mm, and NA: 0.85.

Figure 58:
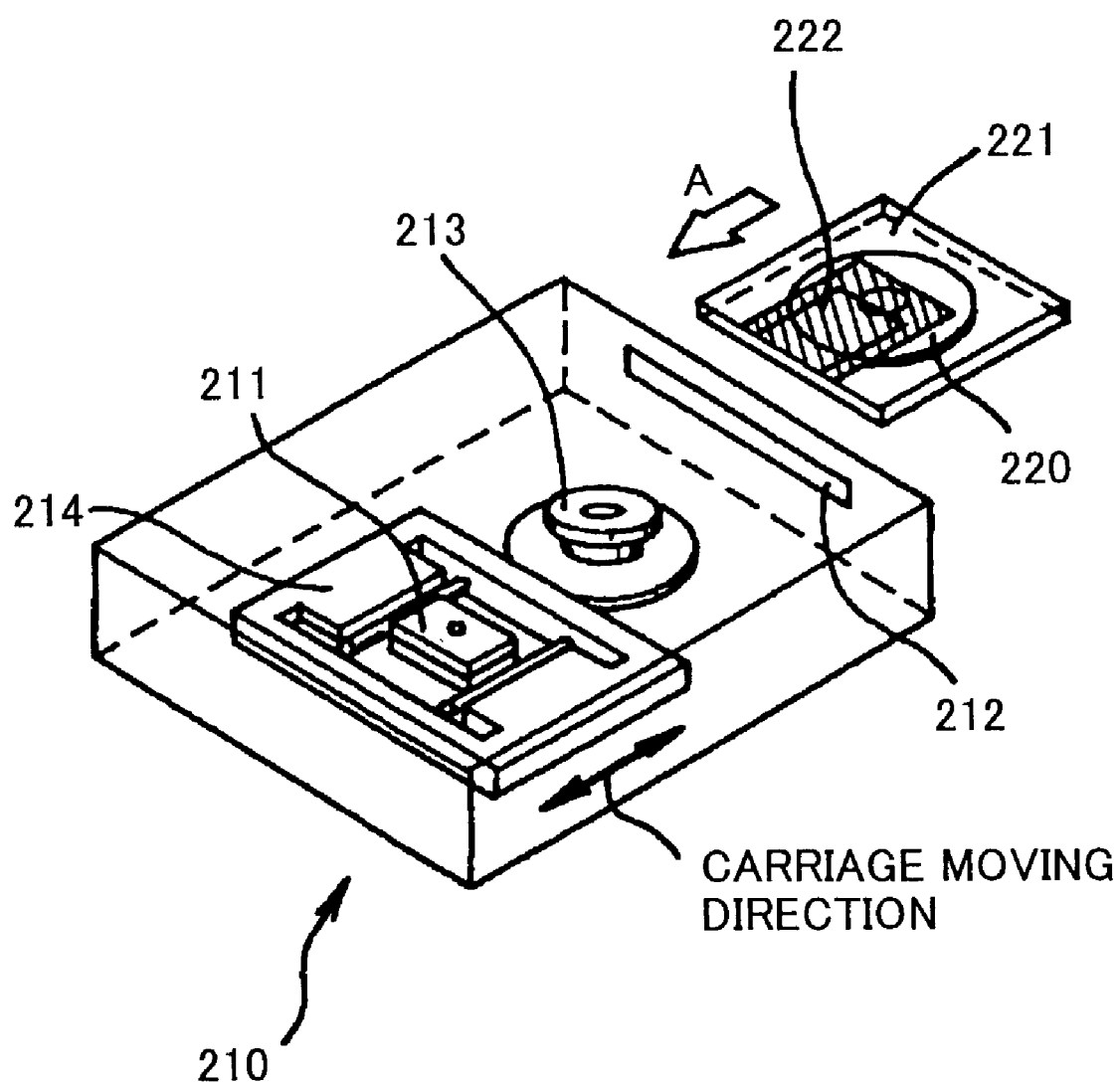
FIG. 58 illustrates an internal perspective view of an information processing device in another embodiment of the present invention.

FIG. 58 is an internal perspective view showing an outline configuration of an optical information processing device in another embodiment of the present invention. The optical information processing device 210 performs information recording, reproduction, or deletion on an optical recording medium 220 using an optical pickup 211. The optical recording medium 220 is of a disk shape, and is held by a cartridge 221 as a protection case. The optical recording medium 220 is loaded into the optical information processing device 210 together with the cartridge 221 according to the arrow A. Then, it is rotated by a spindle motor 213, and then, the optical pickup 211 performs information recording, reproduction, or deletion.

As the optical pickup 211, any one of the above-described embodiments 1 through 23 is used. Thereby, it is possible to achieve satisfactory performance of processing the optical recording media with the respective operating wavelengths.

Further, the present invention is not limited to the above-described embodiments, and variations and modifications may be made without departing from the basic concepts of the present invention.

The present application is based on Japanese priority applications Nos. 2001-317913, 2002-051697 and 2001-308716, filed on Oct. 16, 2001, Feb. 27, 2002 and Oct. 4, 2001, respectively, the entire contents of which are hereby incorporated by reference.

What is claimed is:

1. An object lens for an infinite-type optical pickup which performs recording, reproducing or deletion of information on an optical recording medium having an incident side substrate with a thickness of 0.1 mm with a beam having a wavelength of 407±10 nm, wherein:

said object lens is used for focusing the beam onto a recording surface of the optical recording medium through the incident side substrate thereof so as to form a light spot on said recording surface so as to perform the information recording/reproducing/deletion;

said object lens has a configuration of a single lens, with aspherical surface on each of both sides thereof, and has a numerical aperture NA falling within a range of $0.85 \leq NA$; and said object lens has a configuration satisfying the following conditional formulas:

$$R1/f \leq 1.0\ nd-0.7 \quad (21)$$

$$WD/f \leq 0.33\ nd-0.18 \quad (22)$$

where:

R1 denotes a paraxial curvature radius of the surface on the light source side;

WD denotes a working distance;

nd denotes a refractive index of the lens material with respect to the d-line; and f denotes the focal length.

2. The object lens as claimed in claim 1, wherein:

said object lens has a configuration further satisfying the following conditional formulas:

$$45 \leq vd \leq 55 \quad (23)$$

$$1.65 \leq nd \leq 1.72 \quad (24)$$

where vd denotes an Abbe's number of the lens material with respect to the d-line.

3. The object lens as claimed in claim 2, wherein:

said object lens has a configuration of a both-side convex lens with the surface having the sharper curvature facing toward the light source side.

4. The object lens as claimed in claim 1, wherein:

said object lens has a configuration of a meniscus lens with the convex surface facing toward the light source side.

5. An optical pickup for performing at least one of recording, reproducing, and deleting of information on an optical recording medium having an incident side substrate with a thickness of 0.1 mm, comprising:

an information processing device, the information processing device comprising:

a light source emitting a laser beam having a wavelength of 407±20 nm;

a collimator lens transforming the beam into a parallel form;

an object lens as claimed in claim 1 for focusing the beam, thus transformed into the parallel form, onto the optical recording medium; and a light receiving device receiving the beam reflected by the optical recording medium.

6. The optical pickup as claimed in claim 5 further comprising:

a chromatic aberration correcting device for correcting a chromatic aberration occurring due to a wavelength variation.

7. The optical pickup as claimed in claim 6, wherein:

said chromatic aberration correcting device comprises one of a doublet lens, a resin coating provided on the object lens and a diffraction surface provided on the object lens.

8. The optical pickup as claimed in claim 6, further comprising a spherical aberration correcting device, said chromatic aberration correcting device and said spherical aberration correcting device being integrated together.

9. The optical pickup as claimed in claim 5, further comprising:

a substrate thickness error detecting device which detects a substrate thickness error of the incidence side substrate of the optical recording medium loaded; and a spherical aberration correcting device which corrects a spherical aberration occurring due to the substrate thickness error based on the detection result of said substrate thickness error detecting device.

10. The optical pickup as claimed in claim 9, wherein:

said spherical aberration correcting device comprises one of a pair of positive and negative lenses with a changeable separation thereof and a liquid crystal device having concentric electrode patterns.

* * * * *